US012673484B2

(12) United States Patent
Ochiai et al.

(10) Patent No.: US 12,673,484 B2
(45) Date of Patent: Jul. 7, 2026

(54) SHEET PROCESSING APPARATUS, SHEET LAMINATOR, IMAGE FORMING APPARATUS, AND IMAGE FORMING SYSTEM

(71) Applicants: Takaya Ochiai, Kanagawa (JP);
Satoshi Kuno, Kanagawa (JP);
Hirofumi Horita, Kanagawa (JP)

(72) Inventors: Takaya Ochiai, Kanagawa (JP);
Satoshi Kuno, Kanagawa (JP);
Hirofumi Horita, Kanagawa (JP)

(73) Assignee: Ricoh Comopany, Ltd., Tokyo (JP)

( * ) Notice: Subject to any disclaimer, the term of this patent is extended or adjusted under 35 U.S.C. 154(b) by 63 days.

(21) Appl. No.: 18/794,442

(22) Filed: Aug. 5, 2024

(65) Prior Publication Data

US 2025/0051116 A1      Feb. 13, 2025

(30) Foreign Application Priority Data

Aug. 7, 2023      (JP) ................................. 2023-128640

(51) Int. Cl.
| | |
|---|---|
| *B32B 38/18* | (2006.01) |
| *B32B 37/14* | (2006.01) |
| *B32B 37/00* | (2006.01) |

(52) U.S. Cl.
CPC ........ *B32B 38/1833* (2013.01); *B32B 37/142* (2013.01); *B32B 2037/0061* (2013.01);
(Continued)

(58) Field of Classification Search
CPC ........ B32B 2037/0061; B32B 38/1833; B32B 2301/4422; B32B 37/142; B32B 37/185; B65H 9/00; B65H 9/002; B65H 9/10; B65H 9/12; B65H 2404/1523; B65H 2404/1424; B65H 2601/272
See application file for complete search history.

(56) References Cited

U.S. PATENT DOCUMENTS

| | | | | |
|---|---|---|---|---|
| 12,240,731 B2 * | 3/2025 | Kawakami | ............ | B32B 38/145 |
| 12,473,164 B2 * | 11/2025 | Haraguchi | .............. | B65H 7/20 |

(Continued)

FOREIGN PATENT DOCUMENTS

| | | |
|---|---|---|
| JP | 2008-297076 A | 12/2008 |
| JP | 2020-179584 A | 11/2020 |

*Primary Examiner* — Jeremy R Severson
(74) *Attorney, Agent, or Firm* — Harness, Dickey & Pierce, P.L.C.

(57)      ABSTRACT

A sheet processing apparatus includes a sheet separator, a position detector, a position adjuster, a take-up roller, and a take-up assembly. The sheet separator separates a two-ply sheet, and inserts a sheet medium into the two-ply sheet. The position detector detects respective amounts of positional deviations of the two-ply sheet and the sheet medium. The position adjuster adjusts the positional deviation of the two-ply sheet, before a sheet separating operation, based on the amount of the positional deviation of the two-ply sheet. The take-up roller takes up the two-ply sheet subjected to the sheet separating operation. The take-up assembly moves the take-up roller in a width direction. The position adjuster causes the positional deviation of the two-ply sheet to be adjustable based on the amount of the positional deviation of the sheet medium. The take-up assembly causes the take-up roller to be movable in sync with the position adjuster.

28 Claims, 38 Drawing Sheets

(52) U.S. Cl.
CPC ................ *B65H 2301/4422* (2013.01); *B65H 2301/44324* (2013.01)

(56) References Cited

U.S. PATENT DOCUMENTS

| | | | |
|---|---|---|---|
| 2008/0296828 | A1 | 12/2008 | Shoji et al. |
| 2020/0338877 | A1 | 10/2020 | Takahashi et al. |
| 2021/0325808 | A1 * | 10/2021 | Morinaga ............... B32B 38/18 |
| 2023/0244164 | A1 | 8/2023 | Kidoura et al. |
| 2023/0256726 | A1 | 8/2023 | Kunieda et al. |
| 2023/0264461 | A1 | 8/2023 | Kuno et al. |
| 2023/0264491 | A1 | 8/2023 | Horita et al. |
| 2023/0264909 | A1 | 8/2023 | Kawakami et al. |
| 2023/0303352 | A1 | 9/2023 | Akaishi et al. |

* cited by examiner

S (+P1)    S (+P2)

VERTICAL DIRECTION

CONVEYANCE DIRECTION

WIDTH DIRECTION

FIG. 24

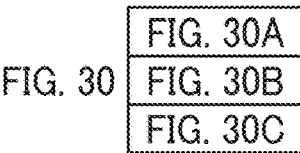

START

S01

MULTIPLE SHEET INSERTION MODE SELECTED?

NO →

S03

DETERMINE THAT SINGLE SHEET INSERTION MODE IS SELECTED WITH ONE INNER SHEET

YES

S02

SELECT NUMBER OF INNER SHEETS

S11

START FEEDING SHEET S

S12

HAS LEADING END OF SHEET S REACHED SENSOR C3?

NO

YES

S13

HAS SHEET S BEEN CONVEYED BY SPECIFIED AMOUNT FROM SENSOR C3?

NO

YES

S14

OPEN SHEET GRIPPER 110

S15

CONVEY SHEET S IN REVERSE

S16

HAS SHEET S BEEN CONVEYED BY SPECIFIED AMOUNT?

NO

YES

START

DETECT LATERAL REGISTRATION OF SHEET S — S130

ADJUST LATERAL REGISTRATION OF SHEET S — S131

SEPARATE SHEET S — S132

DETECT LATERAL REGISTRATION OF INNER SHEET P — S133

ADJUST LATERAL REGISTRATION OF SHEET S AGAIN — S134

INSERT INNER SHEET P INTO SHEET S — S135

END

SHEET POSITION ADJUSTMENT SETTING

| | |
|---|---|
| FILM POSITION ADJUSTMENT SETTING (MAIN SCANNING DIRECTION) | +2.0mm |
| INNER SHEET INSERTION POSITION ADJUSTMENT AMOUNT (MAIN SCANNING DIRECTION) | −1.0mm |

SETTING COMPLETED

Figures 39A, 39B:
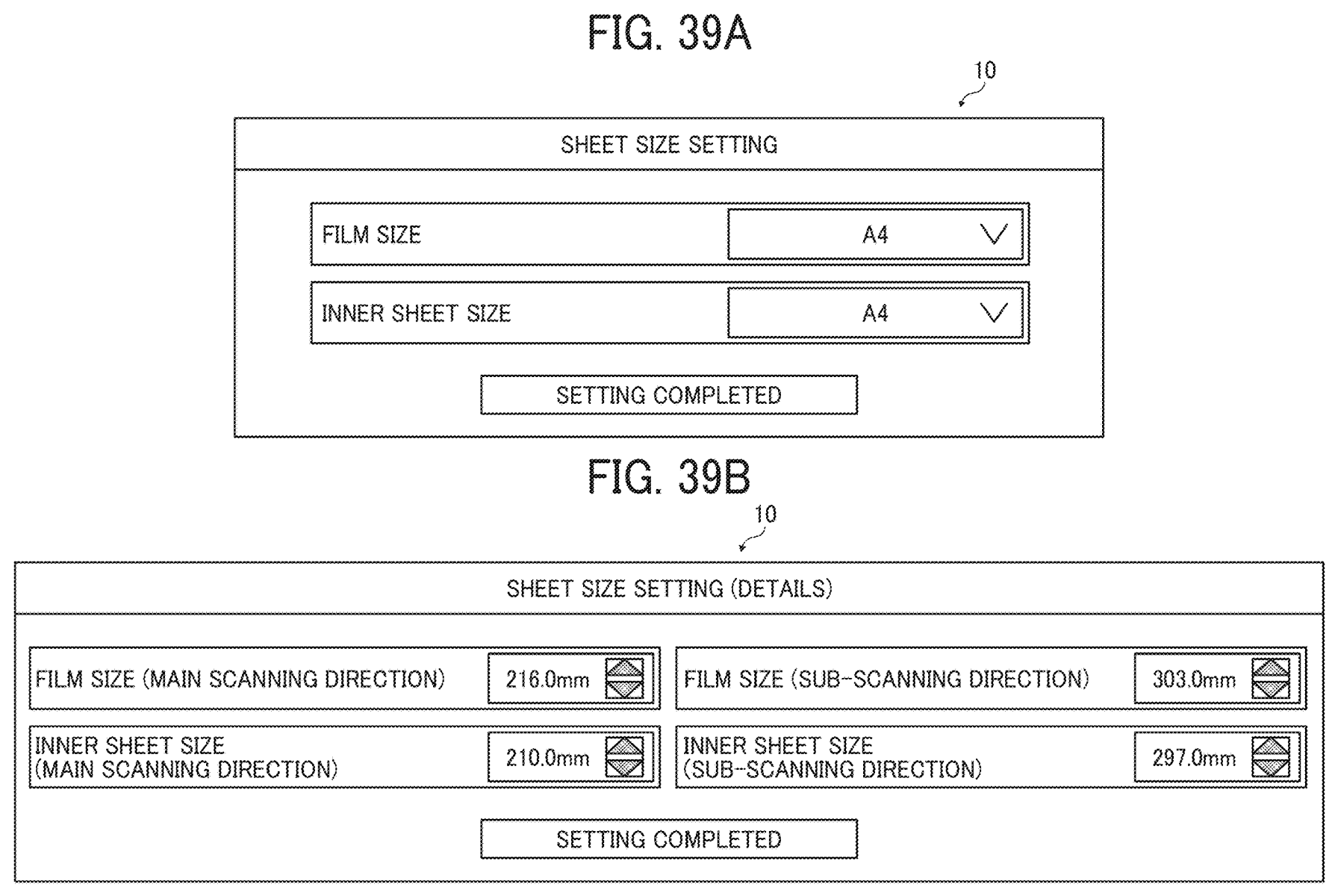

SHEET SIZE SETTING

FILM SIZE     | A4   ∨ |

INNER SHEET SIZE     | A4   ∨ |

| SETTING COMPLETED |

SHEET SIZE SETTING (DETAILS)

FILM SIZE (MAIN SCANNING DIRECTION)    | 216.0mm |    FILM SIZE (SUB-SCANNING DIRECTION)    | 303.0mm |

INNER SHEET SIZE (MAIN SCANNING DIRECTION)    | 210.0mm |    INNER SHEET SIZE (SUB-SCANNING DIRECTION)    | 297.0mm |

| SETTING COMPLETED |

FIG. 40B

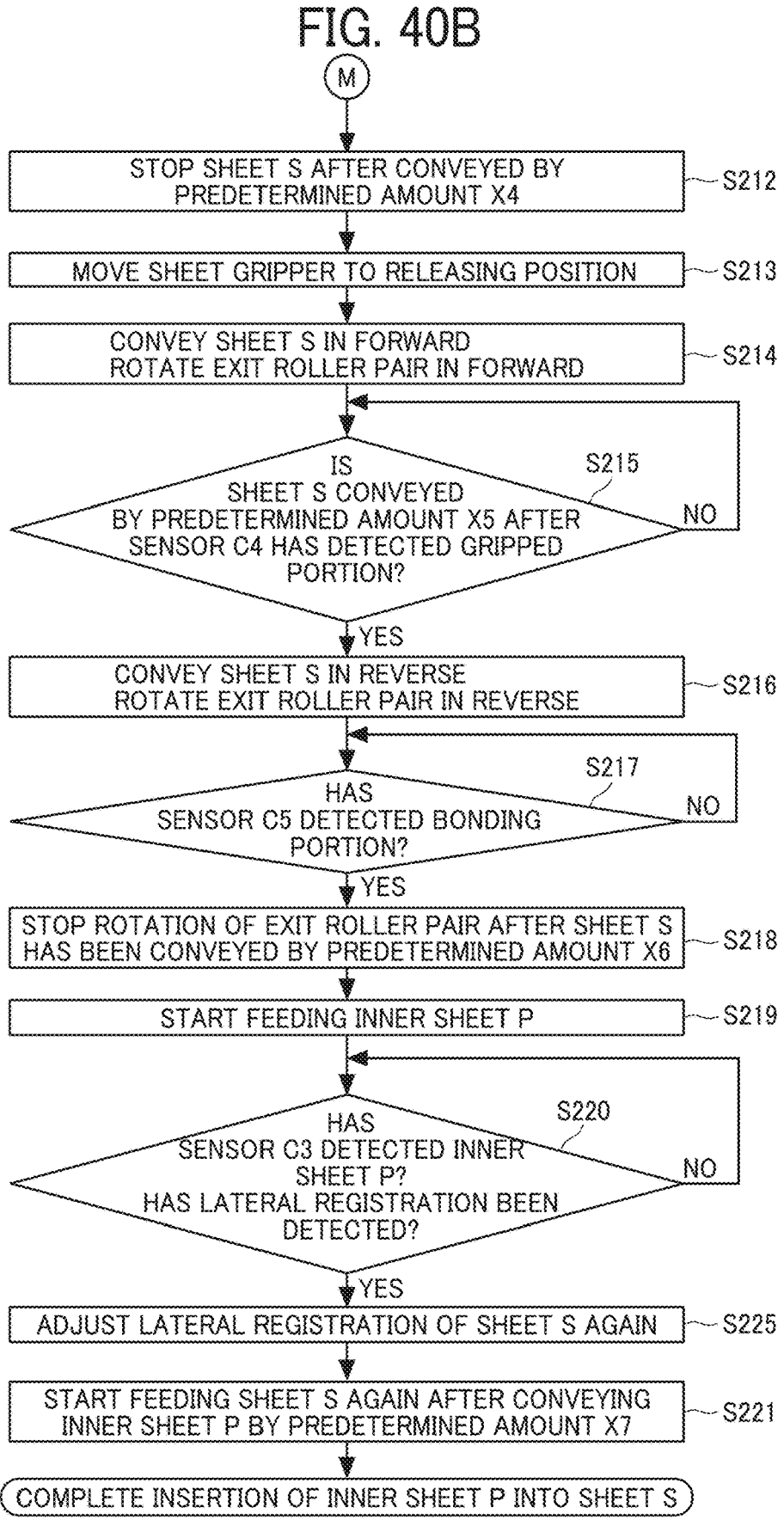

Ⓜ

STOP SHEET S AFTER CONVEYED BY PREDETERMINED AMOUNT X4 — S212

MOVE SHEET GRIPPER TO RELEASING POSITION — S213

CONVEY SHEET S IN FORWARD ROTATE EXIT ROLLER PAIR IN FORWARD — S214

IS SHEET S CONVEYED BY PREDETERMINED AMOUNT X5 AFTER SENSOR C4 HAS DETECTED GRIPPED PORTION? S215 — NO

YES

CONVEY SHEET S IN REVERSE ROTATE EXIT ROLLER PAIR IN REVERSE — S216

HAS SENSOR C5 DETECTED BONDING PORTION? S217 — NO

YES

STOP ROTATION OF EXIT ROLLER PAIR AFTER SHEET S HAS BEEN CONVEYED BY PREDETERMINED AMOUNT X6 — S218

START FEEDING INNER SHEET P — S219

HAS SENSOR C3 DETECTED INNER SHEET P? HAS LATERAL REGISTRATION BEEN DETECTED? S220 — NO

YES

ADJUST LATERAL REGISTRATION OF SHEET S AGAIN — S225

START FEEDING SHEET S AGAIN AFTER CONVEYING INNER SHEET P BY PREDETERMINED AMOUNT X7 — S221

COMPLETE INSERTION OF INNER SHEET P INTO SHEET S

SHEET PROCESSING APPARATUS, SHEET LAMINATOR, IMAGE FORMING APPARATUS, AND IMAGE FORMING SYSTEM

CROSS-REFERENCE TO RELATED APPLICATION

This patent application is based on and claims priority pursuant to 35 U.S.C. § 119 (a) to Japanese Patent Application No. 2023-128640, filed on Aug. 7, 2023, in the Japan Patent Office, the entire disclosure of which is hereby incorporated by reference herein.

BACKGROUND

Technical Field

Embodiments of the present disclosure relate to a sheet processing apparatus, a sheet laminator, an image forming apparatus, and an image forming system.

Background Art

Lamination technologies are known in the art that insert an inner sheet (e.g., paper or photo) between a two-ply sheet (e.g., a lamination sheet or a lamination film) and apply heat and pressure to the two-ply lamination sheet to bond the two-ply sheet. The two-ply lamination sheet is made of two sheets (plies) bonded (sealed) on one side as if one sheet is folded.

Further, a sheet separation device in the related art has the configuration in which two sheets of a two-ply sheet are separated so that an inner sheet is inserted between the two sheets of the two-ply sheet. The sheet separation device in the related art includes a sheet separation unit including a winding roller that separates the two sheets of the two-ply sheet to insert the inner sheet between the two sheets of the two-ply sheet.

When a two-ply sheet is positionally deviated in the width direction of the two-ply sheet in a conveyance passage, such a sheet separation device (sheet processing apparatus) in the related art is not likely to perform a good sheet separating operation or cause a positional deviation on an inner sheet with respect to the two-ply sheet before the inner sheet is inserted into the two-ply sheet.

In contrast, a sheet conveyance device in the related art is disclosed that a sheet (recording medium) is nipped by registration rollers and is separated from a roller upstream from the registration rollers in the sheet conveyance direction and is shifted in the main scanning direction (lateral registration correction).

However, the above-described technique (configuration) is based on the premise that the rollers other than the registration rollers are separated from the sheet at the time of the lateral registration correction, and is likely to cause a two-ply sheet to be twisted in the sheet processing apparatus that grips the two-ply sheet at two positions in the sheet conveyance direction.

SUMMARY

Embodiments of the present disclosure described herein provide a novel sheet processing apparatus including a sheet separator, a position detector, a position adjuster, a take-up member, and a take-up assembly. The sheet separator separates two sheets of a two-play sheet, in which the two sheets are overlapped and bonded together at a bonding portion, to perform a sheet separating operation, and inserts a sheet medium between the two sheets separated from each other to perform a sheet inserting operation, the sheet medium to be conveyed in a given conveyance direction toward the sheet separator. The position detector is detectable an amount of a positional deviation of the two-ply sheet in a width direction orthogonal to the conveyance direction, and detectable an amount of a positional deviation of the sheet medium in the width direction. The position adjuster adjusts the positional deviation of the two-ply sheet in the width direction, before the sheet separating operation, based on the amount of the positional deviation of the two-ply sheet detected by the position detector. The take-up roller takes up one of the two sheets of the two-ply sheet subjected to the sheet separating operation. The take-up assembly moves to move the take-up roller in the width direction. The position adjuster is capable of adjusting the positional deviation of the two-ply sheet in the width direction based on the amount of the positional deviation of the sheet medium. The take-up assembly is capable of moving the take-up member in sync with a movement of the position adjuster.

Further, embodiments of the present disclosure described herein provide a sheet laminator including the above-described sheet processing apparatus, and a thermal presser disposed downstream from the sheet processing apparatus in a sheet conveyance direction to heat and press the two-ply sheet.

Further, embodiments of the present disclosure described herein provide an image forming apparatus including an image former to form an image on a sheet, and the above-described sheet processing apparatus or the above-described sheet laminator.

Further, embodiments of the present disclosure described herein provide an image forming system including an image forming apparatus to form an image on a sheet, and the above-described sheet processing apparatus or the above-described sheet laminator.

Further, embodiments of the present disclosure described herein provide an image forming system including an image forming apparatus to form an image on a sheet, and the above-described sheet processing apparatus or the above-described sheet laminator, detachably attached to the image forming apparatus.

BRIEF DESCRIPTION OF THE SEVERAL VIEWS OF THE DRAWINGS

Exemplary embodiments of this disclosure will be described in detail based on the following figures, wherein:

FIG. 24 is a diagram illustrating an overall configuration of a sheet laminator including the sheet processing apparatus according to an embodiment of the present disclosure;

FIG. 30 including FIGS. 30A, 30B, and 30C is a flowchart of a series of operations performed by the sheet laminator from feeding a lamination sheet, inserting an inner sheet, and completing lamination of the lamination sheet with the inner sheet being inserted;

FIG. 38 is a diagram illustrating a display screen of a control panel, according to Modification 4 of an embodiment of the present disclosure;

FIGS. 39A and 39B are diagrams, each illustrating another display screen of the control panel;

FIGS. 40A and 40B are the first and second parts of a flowchart of the control process to adjust a lateral registration of the sheet when separating the lamination sheet and inserting the inner sheet;

Figure 1:
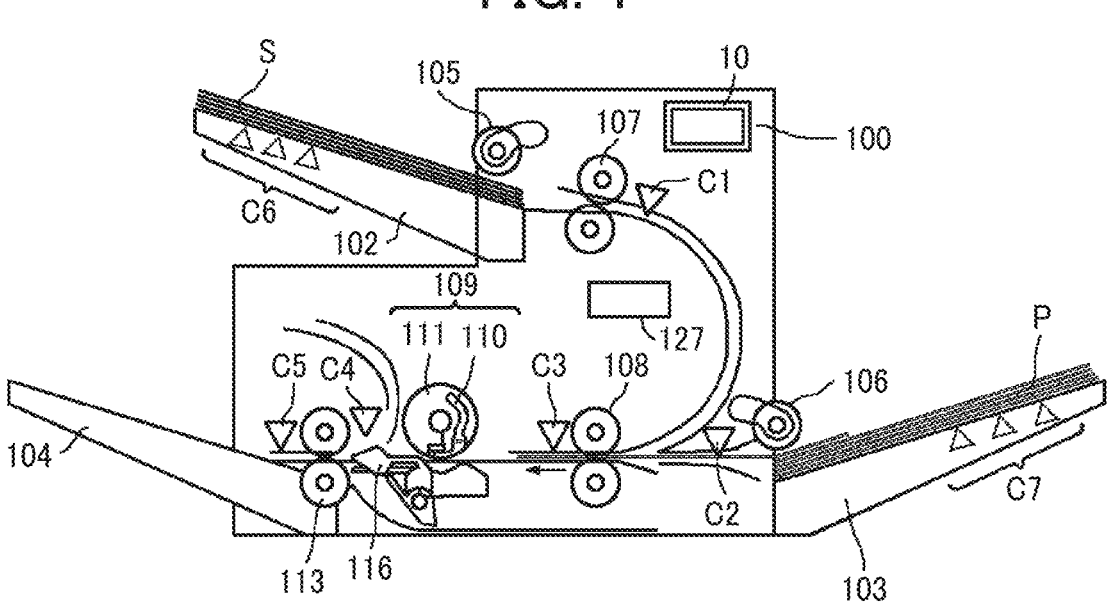
FIG. 1 is a diagram illustrating an overall configuration of a sheet processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below in detail with reference to the drawings. In the drawings, the same or corresponding parts are denoted by the same reference numerals, and redundant description thereof are simplified or omitted as appropriate.

FIG. 1 is a diagram illustrating an overall configuration of a sheet processing apparatus according to an embodiment of the present disclosure.

A sheet processing apparatus 100 according to the present embodiment is to separate two sheets (plies) of a two-ply sheet (referred to as a lamination sheet S) and to insert and sandwich an inner sheet P (an example of a sheet medium) between the separated sheets of the two-ply sheet.

The lamination sheet S is a two-ply sheet constructed of two overlapping sheets (plies) and bonded (or joined) at one portion (or on one side). For example, a two-ply sheet has two sheets (two sides). A first side of the two-ply sheet functions as a transparent sheet such as a transparent polyester sheet, a second side of the two-ply sheet functions as a transparent or opaque sheet disposed facing the first side, and the first and second sides are bonded at one side of the two-ply sheet. The two-ply sheet also includes a lamination film.

The inner sheet P is an example of a sheet medium to be inserted into the two-ply sheet. Examples of the sheet medium include thick paper, postcards, envelopes, plain paper, thin paper, coated paper, art paper, tracing paper, and overhead projector (OHP) transparencies.

As illustrated in FIG. 1, a sheet processing apparatus 100 includes a sheet tray 102 as a first stacker on which the lamination sheets S are placed, a pickup roller 105 that feeds the lamination sheet S from the sheet tray 102, and a conveyance roller pair 107. The sheet processing apparatus 100 further includes a sheet tray 103 as a second stacker on which the inner sheet P is placed, and a pickup roller 106 that feeds the inner sheet P from the sheet tray 103.

The sheet tray 102 includes a sheet size sensor C6 that serves as a sheet size detector to detect the size of the lamination sheet S, in other words, the length of the lamination sheet S in the sheet conveyance direction. The sheet tray 103 includes a sheet size sensor C7 that serves as a medium size detector to detect the size of the inner sheet P, in other words, the length of the inner sheet P in the sheet conveyance direction.

Each of the sheet size sensor C6 and the sheet size sensor C7 includes multiple sensors aligned side by side in the conveyance direction. Since the detection results of the sensors change depending on the size of the stacked lamination sheets S (or the inner sheets P), the sheet size sensors C6 and C7 can detect the length of the lamination sheet S (or the inner sheet P) in the sheet conveyance direction.

A conveyance sensor C1 is disposed downstream from the conveyance roller pair 107 in the sheet conveyance direction to detect the sheet conveyance position of the lamination sheet S.

A conveyance sensor C2 is disposed downstream from the pickup roller 106 in the sheet conveyance direction to detect the sheet conveyance position of the inner sheet P.

The sheet conveyance sensors C1 and C2 may be used to detect the length of the lamination sheet S (or the inner sheet P) in the sheet conveyance direction.

The sheet processing apparatus 100 further includes an entrance roller pair 108 as a first conveyor, a winding roller 109 as a rotary member, an exit roller pair 113 as a second conveyor, and a sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing apparatus 100 further includes separation members 116 between the winding roller 109 and the exit roller pair 113. Each of the separation members 116 is movable in the width direction of the lamination sheet S.

A sheet conveyance sensor C3 is disposed downstream from the entrance roller pair 108 in the sheet conveyance direction to detect the sheet conveyance position of the lamination sheet S and the sheet conveyance position of the inner sheet P.

An abnormal condition detection sensor C4 is disposed downstream from the winding roller 109 in the sheet conveyance direction to detect the condition of the lamination sheet S. A conveyance sensor C5 that detects the position of the lamination sheet S being conveyed is disposed downstream from the exit roller pair 113 in the sheet conveyance direction.

The pickup roller 105, the conveyance roller pair 107, the entrance roller pair 108, and the winding roller 109 are examples of a first feeder to feed a lamination sheet. The pickup roller 106, the entrance roller pair 108 and the winding roller 109 are examples of a second feeder.

A control panel 10 is provided on the exterior of the sheet processing apparatus 100. The control panel 10 serves as an operation device or a display-operation device to display information of the sheet processing apparatus 100 and receives input of the operation of the sheet processing apparatus 100. The control panel 10 also functions as a notification device to output a perceptual signal to a user. As an alternative, a notification device other than the control panel 10 may be separately disposed in the sheet processing apparatus 100.

The sheet processing apparatus 100 according to the present embodiment stores the lamination sheet S and the inner sheet P on separate trays. The sheet processing apparatus 100 opens the lamination sheet S and inserts the inner sheet P therein while conveying the lamination sheet S.

The exit roller pair 113 ejects and stacks the lamination sheet S, in which the inner sheet P has been inserted, onto the sheet ejection tray 104.

Figure 2:
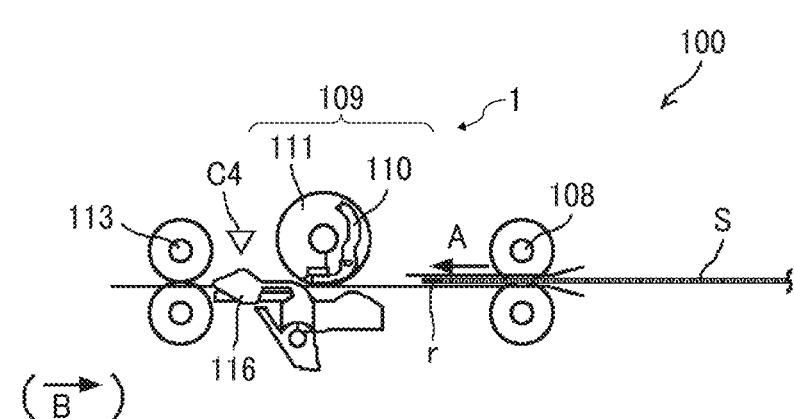
FIG. 2 is a schematic view of a main part of the sheet processing apparatus of FIG. 1.
Figure 11:
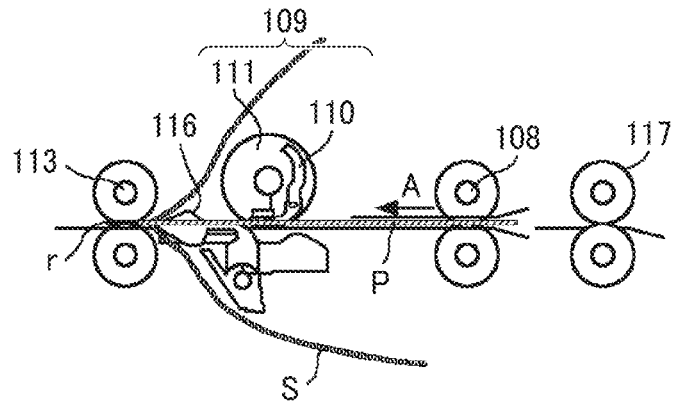
FIG. 11 is a diagram illustrating the sheet processing apparatus performing an operation in the single sheet insertion mode, subsequent to the operation illustrated in FIG. 10.

FIG. 2 is a schematic view of a main part of the sheet processing apparatus of FIG. 11.

As illustrated in FIG. 2, each of the entrance roller pair 108 and the exit roller pair 113 is, for example, two rollers paired with each other and driven by a driver such as a motor. Specifically, the entrance roller pair 108 is driven and rotated by an entrance roller pair motor 108a serving as a driver (see FIG. 29), and the exit roller pair 113 is driven and rotated by an exit roller pair motor 113a (see FIG. 29). The entrance roller pair 108 rotates in one direction. The exit roller pair 113 rotates in forward and reverse directions, thereby nipping and conveying the lamination sheet S and the inner sheet P.

The entrance roller pair 108 conveys the lamination sheet S and the inner sheet P toward the exit roller pair 113.

The sheet conveyance direction indicated by arrow A in FIG. 2 is referred to as a "forward conveyance direction" or a sheet conveyance direction A.

The exit roller pair 113 can switch the direction of rotation between the forward direction and the reverse direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (in other words, the direction opposite to the forward conveyance direction) indicated by arrow B in FIG. 2 is referred to as a reverse conveyance direction or a sheet conveyance direction B.

The sheet processing apparatus 100 further includes a sheet separation device 1 as a sheet separator between the entrance roller pair 108 and the exit roller pair 113. The sheet separation device 1 includes the winding roller 109 functioning as a rotary member or a rotator and the separation members 116. The winding roller 109 is driven by a winding roller motor 109a (see FIG. 29) to rotate in the forward and reverse conveyance directions. The direction of rotation of the winding roller 109 is switchable between the forward conveyance direction (clockwise direction) and the reverse conveyance direction (counterclockwise direction).

The winding roller 109 includes a roller 111 and a sheet gripper 110 that is movable and is disposed on the roller 111 to grip the lamination sheet S. The sheet gripper 110 is driven by a sheet gripper motor 110a (see FIG. 29) to be rotatable with the roller 111. The sheet gripper 110 is movable and grips the leading end of the lamination sheet S with the roller 111. In the present embodiment, the sheet gripper 110 and the roller 111 are separate units. However, the sheet gripper 110 may be formed on the outer circumference of the roller 111 as a single unit.

A description is given of a series of operations performed in the sheet processing apparatus 100, with reference to FIGS. 1 to 17. In other words, the series of operations that is performed by the sheet processing apparatus 100 indicates the operations from separating the lamination sheet S to inserting the inner sheet P into the lamination sheet S.

Figure 3:
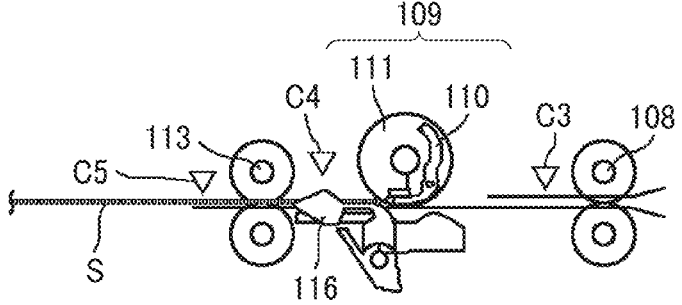
FIG. 3 is a schematic view illustrating the main part of the sheet processing apparatus, subsequent to the state illustrated in FIG. 2.

Specifically, FIG. 3 is a schematic view illustrating the main part of the sheet processing apparatus, subsequent to the state illustrated in FIG. 2.

FIGS. 4 to 9 and 17 are schematic views of the series of the operations subsequent to the state illustrated in FIG. 3.

Figure 10:
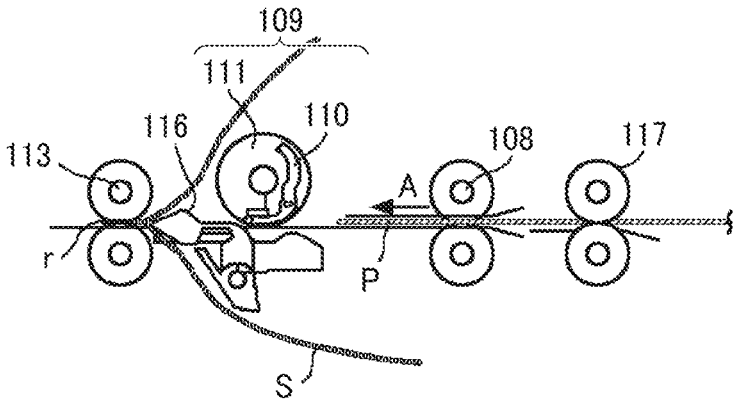
FIG. 10 is a diagram illustrating the sheet processing apparatus performing an operation in a single sheet insertion mode.
Figure 12:
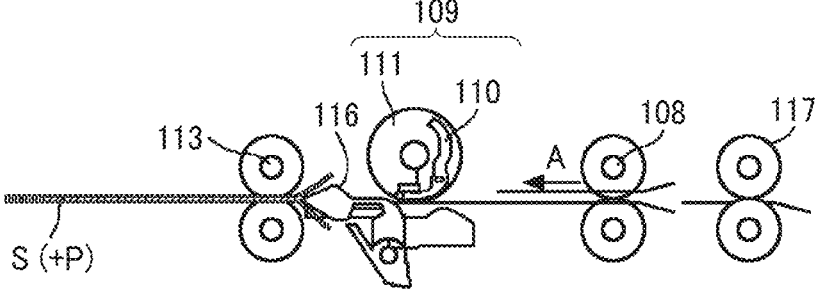
FIG. 12 is a diagram illustrating the sheet processing apparatus performing an operation in the single sheet insertion mode, subsequent to the operation illustrated in FIG. 11.

FIGS. 10 to 12 are diagrams illustrating the sheet processing apparatus performing the series of operations in a single sheet insertion mode.

FIGS. 13 to 16 are diagrams illustrating the sheet processing apparatus performing the series of operations in a multiple sheet insertion mode.

In FIGS. 3 to 17, elements identical to those illustrated in FIG. 1 or 2 are given identical reference numerals, and the descriptions thereof are omitted.

In FIG. 1, the lamination sheets S are stacked on the sheet tray 102 such that the bonded side is on the downstream side in the direction of feeding (conveyance direction) of the pickup roller 105. In the sheet processing apparatus 100, the pickup roller 105 picks up the lamination sheet S from the sheet tray 102, and the conveyance roller pair 107 conveys the lamination sheet S toward the entrance roller pair 108.

As illustrated in FIG. 2, the entrance roller pair 108 conveys the lamination sheet S toward the winding roller 109. In the sheet processing apparatus 100, the entrance roller pair 108 conveys the lamination sheet S with the bonded end, which is one of four sides of the lamination sheet S, as the downstream side in the forward conveyance direction A as indicated by arrow A in FIG. 2.

Subsequently, as illustrated in FIG. 3, the sheet processing apparatus 100 temporarily stops conveyance of the lamination sheet S when the trailing end of the lamination sheet S in the forward conveyance direction has passed the winding roller 109. These operations are performed by conveying the lamination sheet S from the conveyance sensor C3 by a designated amount in response to the conveyance sensor C3 detecting the leading end of the lamination sheet S.

Figure 4:
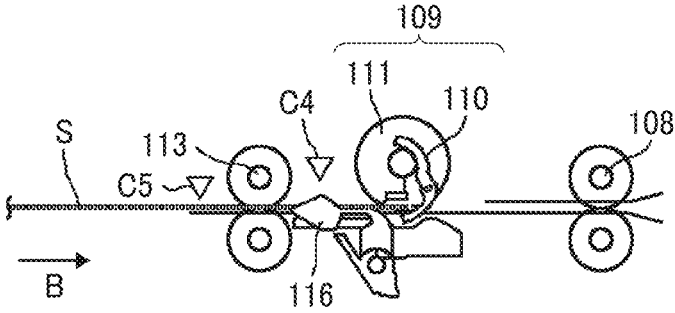
FIG. 4 is a schematic view of the main part of the sheet processing apparatus, subsequent to the state illustrated in FIG. 3.

As illustrated in FIG. 4, the sheet processing apparatus 100 causes the sheet gripper 110 to open and the exit roller pair 113 to rotate in the reverse direction to convey the lamination sheet S in the reverse conveyance direction (i.e., the direction B) toward an opening portion of the sheet gripper 110.

Figure 5:
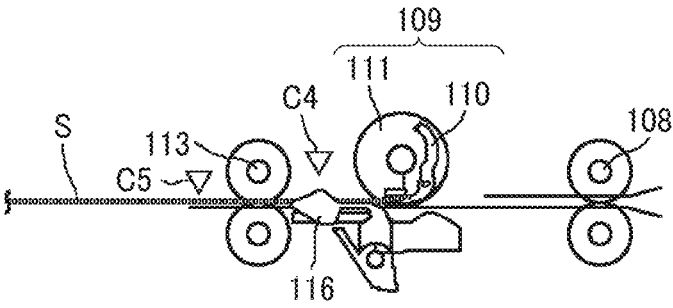
FIG. 5 is a schematic view of the main part of the sheet processing apparatus, subsequent to the state illustrated in FIG. 4.

Subsequently, as illustrated in FIG. 5, the sheet processing apparatus 100 causes the exit roller pair 113 to stop rotating and conveyance of the lamination sheet S when the trailing end of the lamination sheet S is inserted into the opening portion of the sheet gripper 110, and causes the sheet gripper 110 to close and grip the trailing end of the lamination sheet S. These operations are performed when the lamination sheet S is conveyed by the designated amount.

Figure 6:
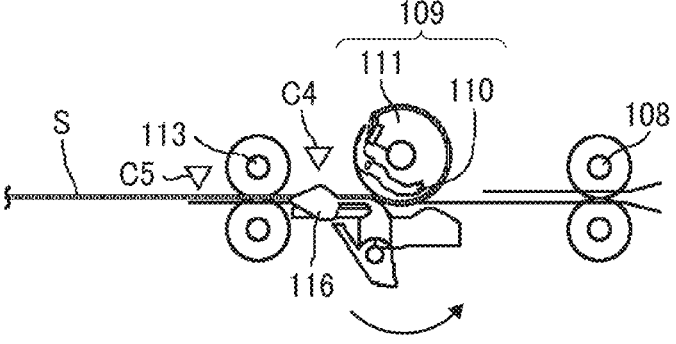
FIG. 6 is a schematic view of the main part of the sheet processing apparatus, subsequent to the state illustrated in FIG. 5.

Then, as illustrated in FIG. 6, the sheet processing apparatus 100 causes the driver to rotate the winding roller 109 in the counterclockwise direction in FIG. 6 to wind the lamination sheet S around the winding roller 109. The lamination sheet S is wound around the winding roller 109 from the side where the two overlapping sheets of the lamination sheet S are not bonded.

Figure 7:
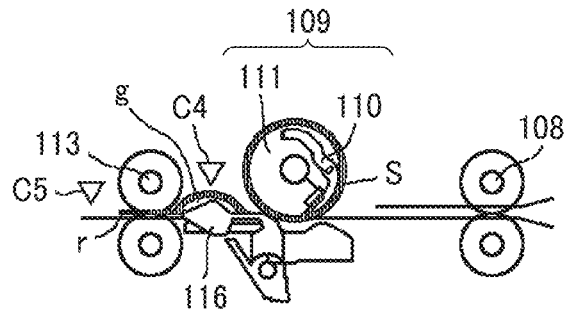
FIG. 7 is a schematic view of the main part of the sheet processing apparatus, subsequent to the state illustrated in FIG. 6.

As illustrated in FIG. 7, when the lamination sheet S is wound around the winding roller 109, a winding circumferential length difference is created between the two sheets in the amount of winding of the lamination sheet S (i.e., two-ply sheet) around the circumference of the winding roller 109. There is a surplus of the sheet on the inner circumferential side to the center of the winding roller 109, which generates a slack toward the bonded end. As a result, a space g (slack) is created between the two sheets of the lamination sheet S.

As the separation members 116 are inserted into the space "g" formed as described above, from opposed sides of the lamination sheet S, the space "g" between the two sheets is reliably maintained. In response to the detection of the leading end of the lamination sheet S with the sheet conveyance sensor C5, the lamination sheet S is conveyed from the sheet conveyance sensor C5 by a designated amount to perform these operations.

A description is now given of the separation members 116.

Figure 18:
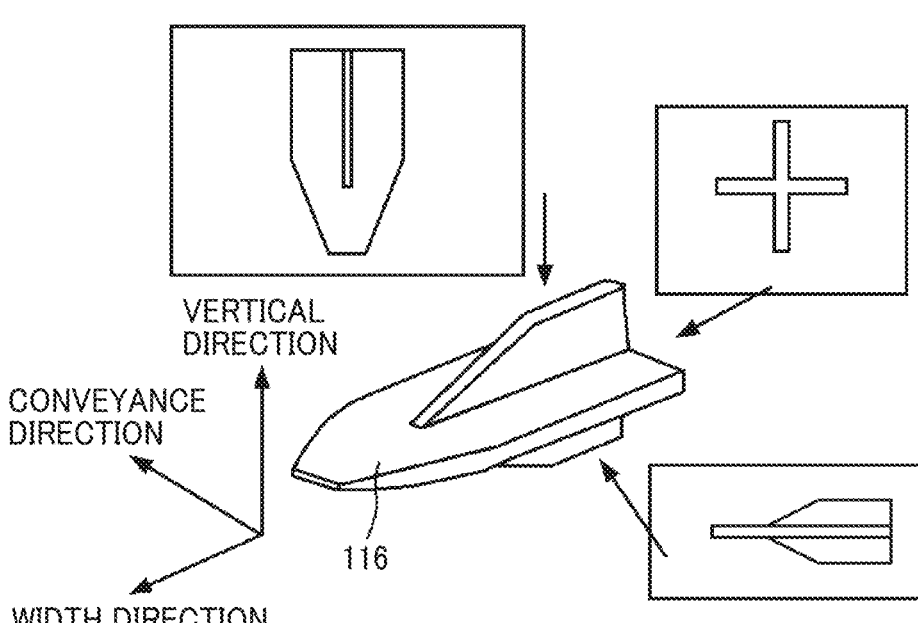
FIG. 18 is a schematic view of a separation member included in the sheet processing apparatus.

FIG. 18 is a schematic view of the separation member 116 included in the sheet processing apparatus 100.

Figure 19A:
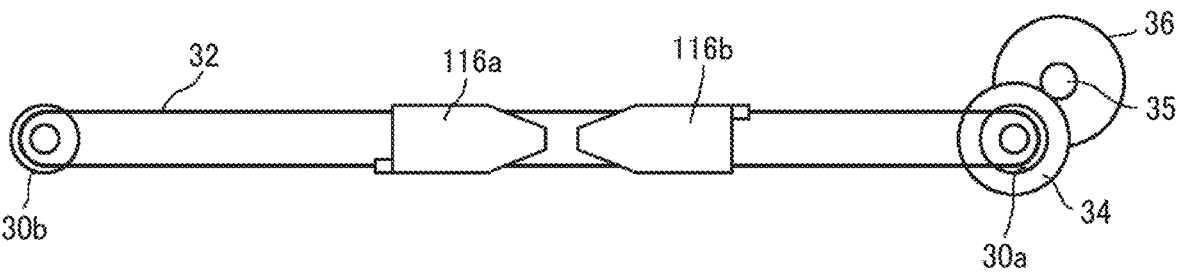
FIGS. 19A and 19B are schematic views, each illustrating an example of a drive configuration of the separation members.
Figure 19B:
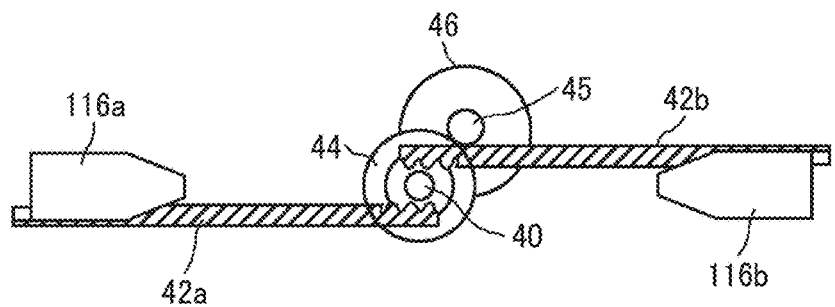

FIGS. 19A and 19B are schematic views, each illustrating an example of a drive configuration of the separation members 116.

Figure 20:
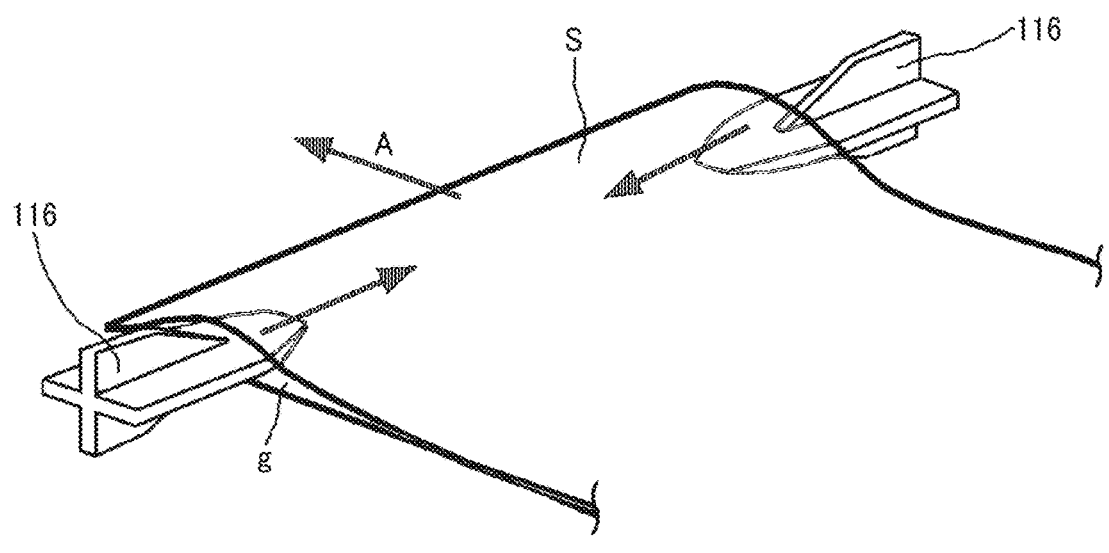
FIG. 20 is a perspective view of a state in which the separation members are inserted into a lamination sheet.

Further, FIG. 20 is a perspective view of a state in which the separation members 116 are inserted into the lamination sheet S.

As illustrated in FIG. 18, when viewed from the upstream side in the sheet conveyance direction, the size in the height (vertical direction) of the separation members 116 gradually increases from the center in the width direction to the trailing end (right end in FIG. 18). Further, when viewed from the vertical direction, the size of the separation member 116 in the sheet conveyance direction gradually increases from the leading end to the center. When viewed from the width direction, the separation member 116 has a cross shape. Each separation members 116 further has a branching member that functions as a guide to guide the two sheets separated from the lamination sheet S in different directions due to the above-described cross shape.

Further, in the present embodiment, referring to FIGS. 19A and 19B, the two separation members 116 are disposed facing each other and moved in the approaching direction and the separating direction, for example, by a belt drive mechanism as illustrated in FIG. 19A and by a rack and pinion mechanism illustrated in FIG. 19B.

More specifically, the belt drive mechanism illustrated in FIG. 19A includes a belt 32 stretched between a drive pulley 30*a* and a driven pulley 30*b* and the two separation members 116*a* and 116*b* are attached to the belt 32 while facing each other. The separation member 116*a* is attached and connected to the lower part of the belt 32 and the separation member 116*b* is attached and connected to the upper part of the belt 32.

The drive pulley 30*a* is provided with a drive transmission gear 34. The rotational output of a separation member motor 36 is transmitted to the drive transmission gear 34 via a motor output gear 35. In other words, the rotational output of the separation member motor 36 is transmitted to the belt 32.

As a result, as the separation member motor 36 is rotated in the clockwise direction (when viewed from the front of the drawing), the separation members 116*a* and 116*b* are moved toward each other. By contrast, as the separation member motor 36 is rotated in the counterclockwise direction (when viewed from the front of the drawing), the separation members 116a and 116b are moved away from each other.

The rack and pinion mechanism illustrated in FIG. 19B includes two racks 42a and 42b extending in opposite directions from each other. Each of the racks 42a and 42b meshes with a single pinion 40. The separation member 116a that is attached to the rack 42a faces the separation member 116b that is attached to the rack 42b. The pinion 40 is provided with a drive transmission gear 44. The rotational output of a separation member motor 46 is transmitted to the drive transmission gear 44 via a motor output gear 45. The rotational output of the separation member motor 46 is transmitted to the racks 42a and 42b, respectively.

As a result, as the separation member motor 46 is rotated in the clockwise direction (when viewed from the front of the drawing), the separation members 116a and 116b are moved toward each other. By contrast, as the separation member motor 46 is rotated in the counterclockwise direction (when viewed from the front of the drawing), the separation members 116a and 116b are moved away from each other.

As described above, in the present embodiment, each of the separation members 116a and 116b has the above-mentioned shape and is movable in the width direction of the lamination sheet S. Accordingly, the separation members 116a and 116b are smoothly inserted into the space g created in the lamination sheet S as illustrated in FIG. 20.

The description of a series of operations of the sheet processing apparatus 100 is continued below.

Figure 8:
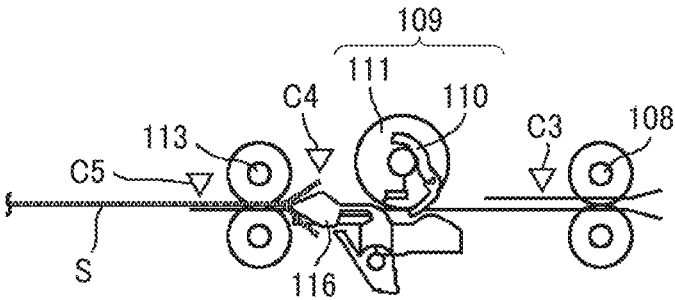
FIG. 8 is a schematic view of the main part of the sheet processing apparatus, subsequent to the state illustrated in FIG. 7.

With the separation members 116 inserted in the space g created in the lamination sheet S (see FIG. 7), the sheet processing apparatus 100 causes the winding roller 109 to rotate in the clockwise direction and shift the space "g" separating the two sheets of the lamination sheet S to the trailing end of the lamination sheet S in the forward conveyance direction (i.e., the direction indicated by arrow A in FIG. 2), as illustrated in FIG. 8. After the winding roller 109 has been rotated by a designated amount, the sheet processing apparatus 100 causes the sheet gripper 110 to open. As a result, the trailing end of the lamination sheet S is separated into the upper and lower sheets at the trailing end.

In this state, the sheet processing apparatus 100 temporarily stops the conveyance of the lamination sheet S and further moves the separation members 116 in the width direction of the lamination sheet S to separate the whole area of the trailing end of the lamination sheet S. In response to the detection of the leading end of the lamination sheet S with the sheet conveyance sensor C5, the lamination sheet S is conveyed from the sheet conveyance sensor C5 by a designated amount to perform these operations.

Figure 21:
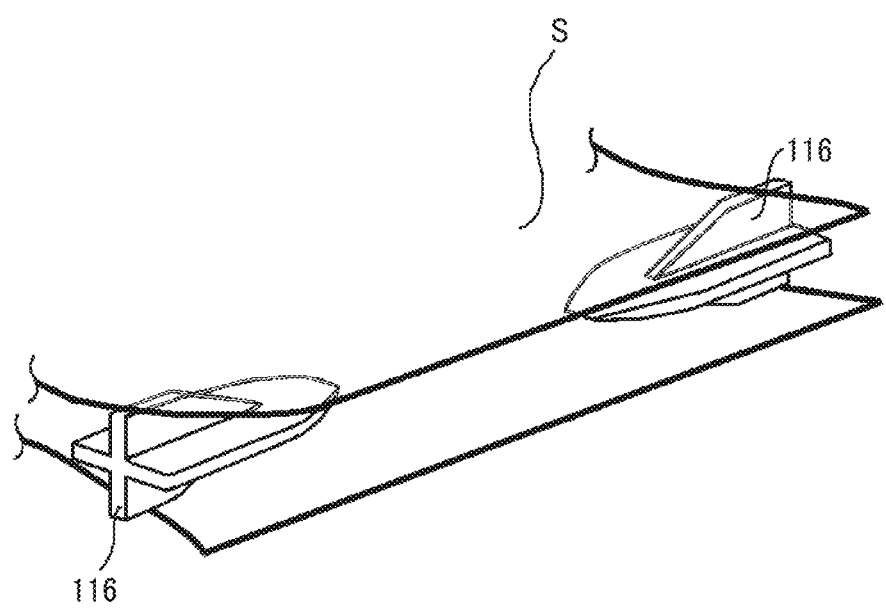
FIG. 21 is a perspective view of the separation members and the lamination sheet in the state illustrated in FIG. 8.

FIG. 21 is a perspective view of the separation members 116 and the lamination sheet S in the state illustrated in FIG. 8.

Figure 22:
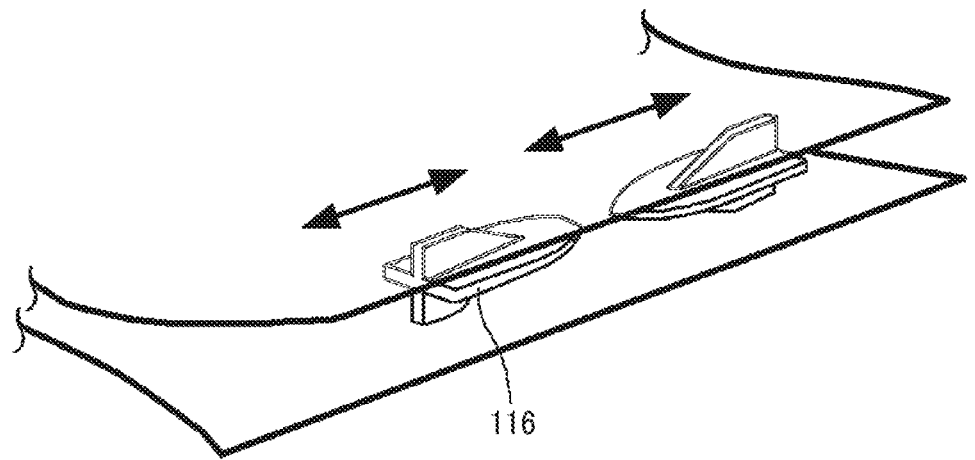
FIG. 22 is another perspective view of the separation member and the lamination sheet in FIG. 8, performing an operation subsequent to the operation in FIG. 21.

FIG. 22 is another perspective view of each separation member 116 and the lamination sheet S in the state illustrated in FIG. 8, performing an operation subsequent to the operation in FIG. 21.

Since each of the separation members 116 further has a branching member that functions as a guide to guide the two sheets separated from the lamination sheet S in different directions due to the above-described shape (see the cross shape illustrated in FIG. 18), the two sheets separated from the lamination sheet S may be kept in postures to be conveyed to different sheet conveyance passages.

Further, since the separation members 116 are movable in the width direction of the lamination sheet S (see FIGS. 19A and 19B), the separation members 116 are positioned suitably to support the postures of the two sheets of the lamination sheet S as illustrated in FIG. 22. Due to such a configuration, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a branching member to branch the lamination sheet S over the whole area in the width direction of the sheet conveyance passage and a driver to drive the branching member, thereby reducing the cost when compared with the configuration of a typical sheet processing apparatus.

Figure 9:
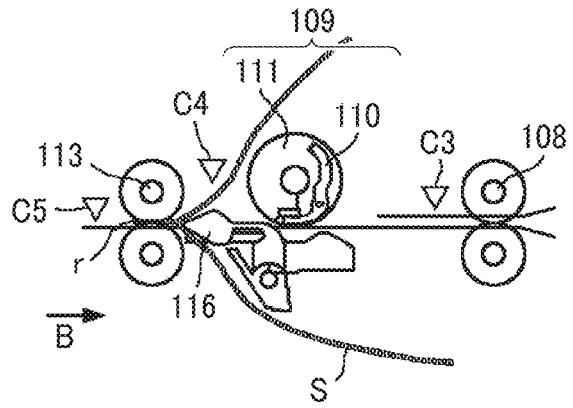
FIG. 9 is a schematic view of the main part of the sheet processing apparatus, subsequent to the state illustrated in FIG. 8.

After the separation members 116 separate the trailing end of the lamination sheet S in the entire range, as illustrated in FIG. 9, the controller 127 in the sheet processing apparatus 100 controls the driver to rotate the exit roller pair 113 counterclockwise in FIG. 9 and convey the lamination sheet S in the reverse conveyance direction (direction B). Then, the separation members 116 guide the two separated sheets of the lamination sheet S in the upper and lower directions, respectively, and the sheets are fully separated.

The sheet processing apparatus 100 temporarily stops the conveyance of the lamination sheet S, so that a bonded portion r of the lamination sheet S is gripped (nipped) by the exit roller pair 113. Accordingly, one end of the lamination sheet S is bonded as the bonded side of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

A description is now given of the operation of inserting an inner sheet into the separated lamination sheet S.

The sheet processing apparatus 100 according to the present embodiment can insert one to multiple inner sheets P into a lamination sheet S depending on the size of the lamination sheet S (i.e., the length of the lamination sheet S in the sheet conveyance direction) and the size of the inner sheet P (i.e., the length of the inner sheet P in the sheet conveyance direction).

Firstly, a description is given of a single sheet insertion mode to insert a single inner sheet P into a lamination sheet S, with reference to FIGS. 10 to 12. Then, a description is given of a multiple sheet insertion mode to insert multiple inner sheets P into a lamination sheet S along the sheet conveyance direction, with reference to FIGS. 13 to 16.

Single Sheet Insertion Mode

As illustrated in FIG. 10, the sheet processing apparatus 100 causes the entrance roller pair 108 to rotate to convey the inner sheet P conveyed from the sheet tray 103 (see FIG. 1) via a sheet conveyance roller pair 117 toward the exit roller pair 113 in the forward conveyance direction (i.e., the direction indicated by arrow A in FIG. 10).

Subsequently, as illustrated in FIG. 11, the sheet processing apparatus 100 causes the exit roller pair 113 to rotate so that the lamination sheet S and the inner sheet P meet to insert the inner sheet P into the lamination sheet S from the open portion (on the other end) of the lamination sheet S.

Then, as illustrated in FIG. 12, the exit roller pair 113 of the sheet processing apparatus 100 conveys the lamination sheet S in which the inner sheet P is inserted, in the forward conveyance direction (i.e., the direction indicated by arrow A in FIG. 12). Thus, the two sheets of the lamination sheet S are overlapped one on another again so as to close the open portion of the lamination sheet S. Then, the lamination sheets S with the inner sheet P being inserted are ejected by the exit roller pair 113 or the ejection roller pair 121 (see FIG. 24) disposed downstream from the exit roller pair 113 and are stacked on the sheet ejection tray 104 (see FIG. 1).

Multiple Sheet Insertion Mode

Then, a description is given of the multiple sheet insertion mode.

In the multiple sheet insertion mode, a plurality of inner sheets P (two sheets in the embodiment) are insertable a single lamination sheet S in the sheet conveyance direction.

Figure 13:
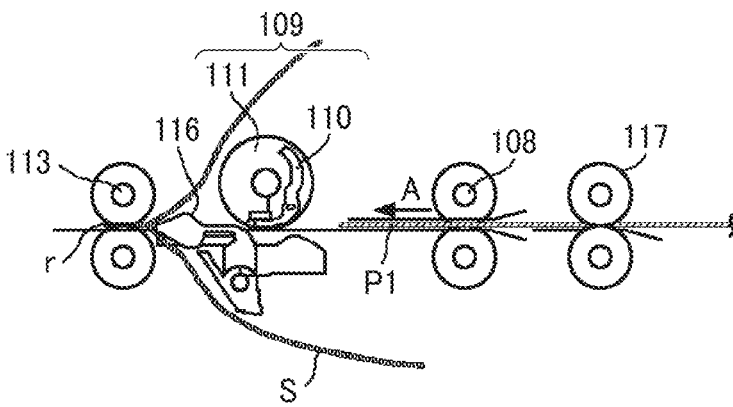
FIG. 13 is a diagram illustrating the sheet processing apparatus performing an operation in a multiple sheet insertion mode.

Then, as illustrated in FIG. 13, the sheet processing apparatus 100 causes the entrance roller pair 108 to rotate to convey a first inner sheet P (referred to as a first inner sheet P1) conveyed from the sheet tray 103 (see FIG. 1) toward the exit roller pair 113 in the forward conveyance direction (i.e., the direction indicated by arrow A in FIG. 2).

Figure 14:
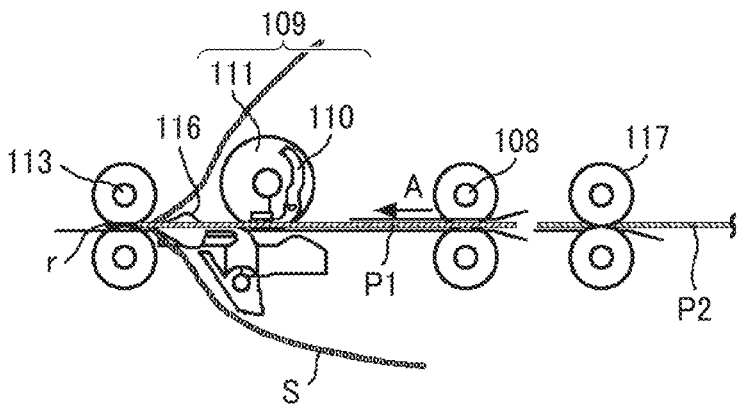
FIG. 14 is a diagram illustrating the sheet processing apparatus performing an operation in the multiple sheet insertion mode, subsequent to the operation illustrated in FIG. 13.

Subsequently, as illustrated in FIG. 14, the sheet processing apparatus 100 causes the exit roller pair 113 to rotate so that the lamination sheet S and the first inner sheet P1 meet. By so doing, the first inner sheet P1 is inserted into the opening of the lamination sheet S.

At this time, the sheet processing apparatus 100 conveys a second inner sheet P (referred to as a second inner sheet P2) conveyed from the sheet tray 103 (see FIG. 1) toward the exit roller pair 113 in the forward conveyance direction (i.e., the direction indicated by arrow A in FIG. 2).

Figure 15:
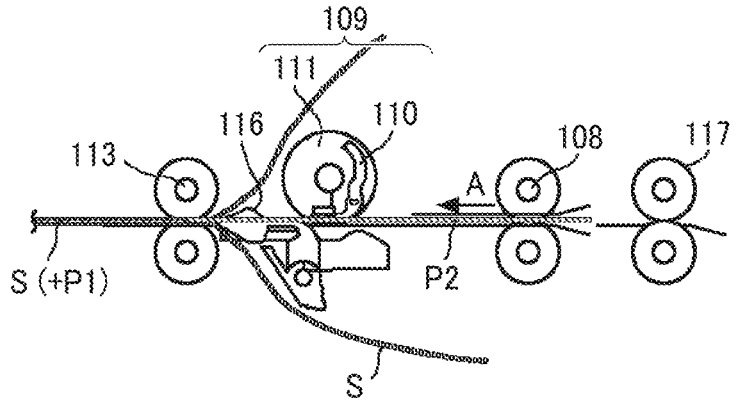
FIG. 15 is a diagram illustrating the sheet processing apparatus performing an operation in the multiple sheet insertion mode, subsequent to the operation illustrated in FIG. 14.

Subsequently, as illustrated in FIG. 15, the sheet processing apparatus 100 causes the entrance roller pair 108 to rotate so that the lamination sheet S and the second insertion sheet P2 meet. By so doing, the second inner sheet P2 is inserted into the opening of the lamination sheet S.

Figure 16:
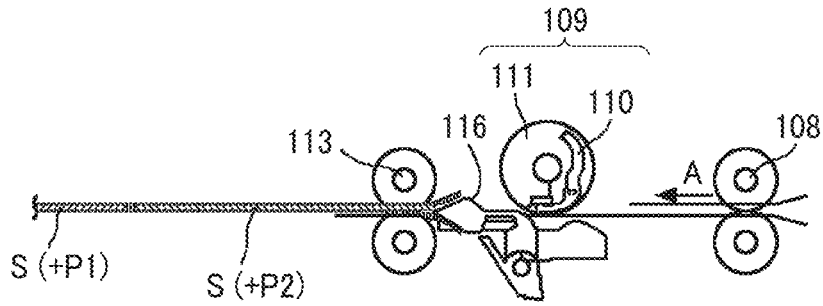
FIG. 16 is a diagram illustrating the sheet processing apparatus performing an operation in the multiple sheet insertion mode, subsequent to the operation illustrated in FIG. 15.

As illustrated in FIG. 16, the sheet processing apparatus 100 causes the exit roller pair 113 to convey the lamination sheet S, with the first inner sheet P1 and the second inner sheet P2 being inserted, in the forward conveyance direction (i.e., the direction indicated by arrow A in FIG. 2). By so doing, the two sheets are overlaid one on another again to close the opening.

Even if there are three or more inner sheets P, the three or more inner sheets P can be inserted into the lamination sheet S by repeating the above-described operations.

Figure 17:
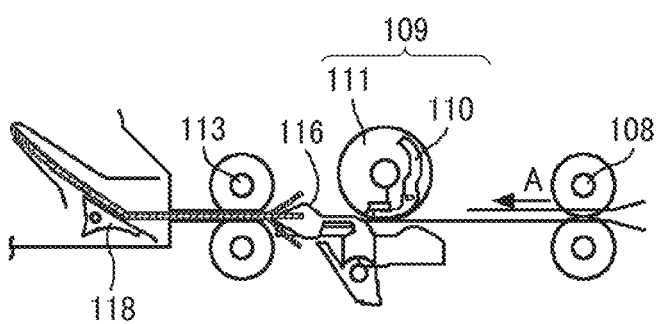
FIG. 17 is a schematic view of the main part of the sheet processing apparatus, subsequent to the state illustrated in FIG. 9.

As an alternative example, in a case where a sheet processing apparatus includes a thermal-pressure device (see a thermal fixing roller pair 120 in FIG. 24) that can heat and press the lamination sheet S, a branching member 118 may change (switch) the sheet conveyance passage of the lamination sheet S to convey the lamination sheet S to the thermal-pressure device, as illustrated in FIG. 17. Not only in the multiple sheet insertion mode but also in the single sheet insertion mode, the sheet conveyance passage may be changed (switched) with the branching member 118.

As described above, the sheet processing apparatus 100 according to the present embodiment can control the driver and other parts to perform the sheet inserting operation of an inner sheet P or inner sheets P to be inserted into a lamination sheet S.

A description is now given of a configuration in which the sheet processing apparatus 100 acquires the size of the lamination sheet S (i.e., the length in the sheet conveyance direction of the lamination sheet S), the size of the inner sheet P (i.e., the length in the sheet conveyance direction of the inner sheet P), and the number of the inner sheets P to be inserted into the lamination sheet S.

As illustrated in FIG. 1, the sheet processing apparatus 100 according to the present embodiment includes the sheet size sensor C6 as a sheet size detector and the sheet size sensor C7 as a medium size detector.

Based on the detection results of the sheet size sensors C6 and C7, the sheet processing apparatus 100 determines whether the length of the inner sheet P in the sheet conveyance direction is equal to or smaller than the threshold value. When the length of the inner sheet P in the sheet conveyance direction is equal to or smaller than the threshold value, the sheet processing apparatus 100 automatically switches to the multiple sheet insertion mode to perform the sheet inserting operation. On the other hand, when the length of the inner sheet P in the sheet conveyance direction is greater than the threshold value, the sheet processing apparatus 100 automatically switches to the single sheet insertion mode to perform the sheet inserting operation.

In particular, when the length of the inner sheet P in the sheet conveyance direction is equal to or smaller than half the length of the lamination sheet S in the sheet conveyance direction, the sheet processing apparatus 100 may automatically switch to the multiple sheet insertion mode to perform the sheet inserting operation. In the multiple sheet insertion mode, the sheet processing apparatus 100 determines the number of inner sheets P to be inserted into the lamination sheet S from the quotient of the size of the lamination sheet S divided by the size of inner sheet P.

Instead of or in addition to the detection results of the sheet size sensors C6 and C7, the sheet processing apparatus 100 may use the detection results of the sheet conveyance sensors C1 and C2.

As described above, the sheet processing apparatus 100 according to the present embodiment can automatically control the sheet inserting operation according to the size of the lamination sheet S and the size of the inner sheet P.

Additionally, as illustrated in FIG. 1, the sheet processing apparatus 100 according to the present embodiment can separately stack the lamination sheets S and the inner sheets P on separate trays to be conveyed separately. Accordingly, there is no need to stack the lamination sheets S and the inner sheets P in a predetermined order, and this configuration can enhance the convenience. In the present embodiment, the lamination sheets S are stacked on the sheet tray 102 and the inner sheets P are stacked on the sheet tray 103. However, the tray on which the lamination sheets S are stacked and the tray on which the inner sheets P are stacked are not limited to the above-described trays. For example, the inner sheets P may be stacked on the sheet tray 102 and the lamination sheets S may be loaded on the sheet tray 103.

Modification

Figure 23C:
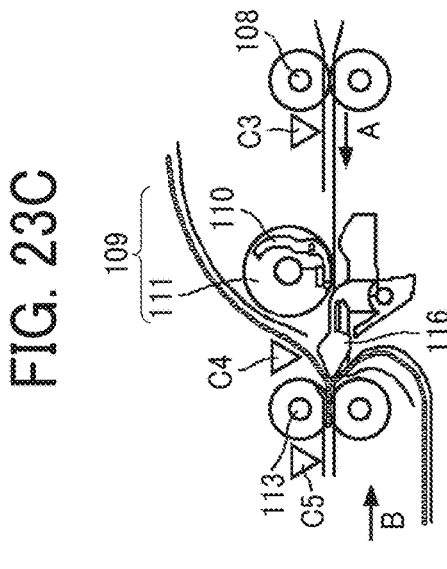
FIGS. 23A, 23B, and 23C are schematic views, each illustrating a sheet guide passage of the two sheets separated from the lamination sheet, according to a modification of the present disclosure.
Figure 23B:
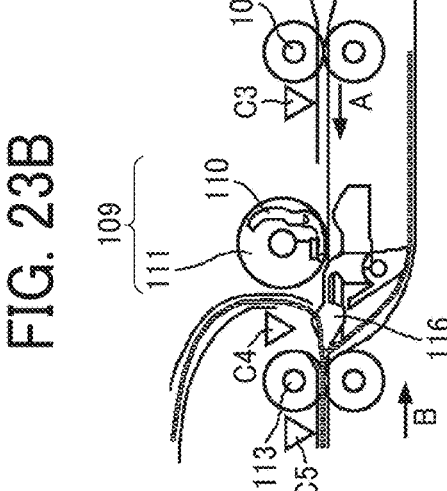
Figure 23A:
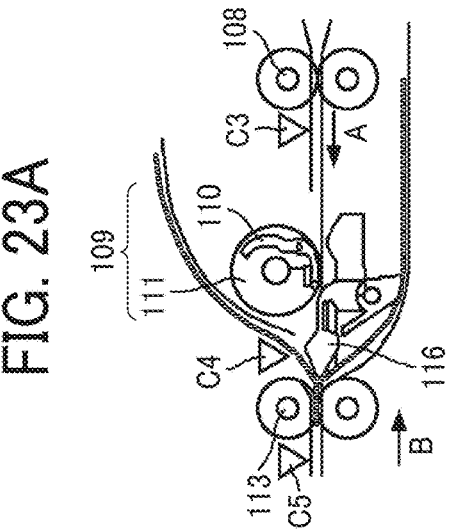

FIGS. 23A, 23B, and 23C are schematic views, each illustrating a sheet guide passage of the two sheets separated from the lamination sheet, according to a modification of the present disclosure.

Specifically, FIG. 23A illustrates a case where the two separated sheets are guided from the bonded portion r of the lamination sheet S in the direction opposite to the sheet conveyance direction (i.e., the direction indicated by arrow B in FIG. 23A) as illustrated in FIG. 9. Alternatively, as illustrated in FIG. 23B, the upper sheet of the separated lamination sheet S may be guided from the bonded portion r in the sheet conveyance direction (i.e., the direction indicated by arrow A in FIG. 23B) and the lower sheet of the separated lamination sheet S may be guided from the bonded portion r in the direction opposite to the sheet conveyance direction. Further, as illustrated in FIG. 23C, the upper sheet of the separated lamination sheet S may be guided from the bonding portion r in the direction opposite to the sheet conveyance direction and the lower sheet of the separated lamination sheet S may be guided from the bonded portion r in the sheet conveyance direction. As illustrated in FIG. 9A, the two sheets separated from each other from the lamination sheet S are branched by the separation members 116 and then guided in the direction opposite to the sheet conveyance direction. However, the two sheets separated from each other from the lamination sheet S may be branched by the separation members 116 and then guided in the sheet conveyance direction.

A description is then given of a sheet laminator including the sheet processing apparatus, and an image forming system including the sheet laminator, according to an embodiment of the present disclosure.

Figure 24:
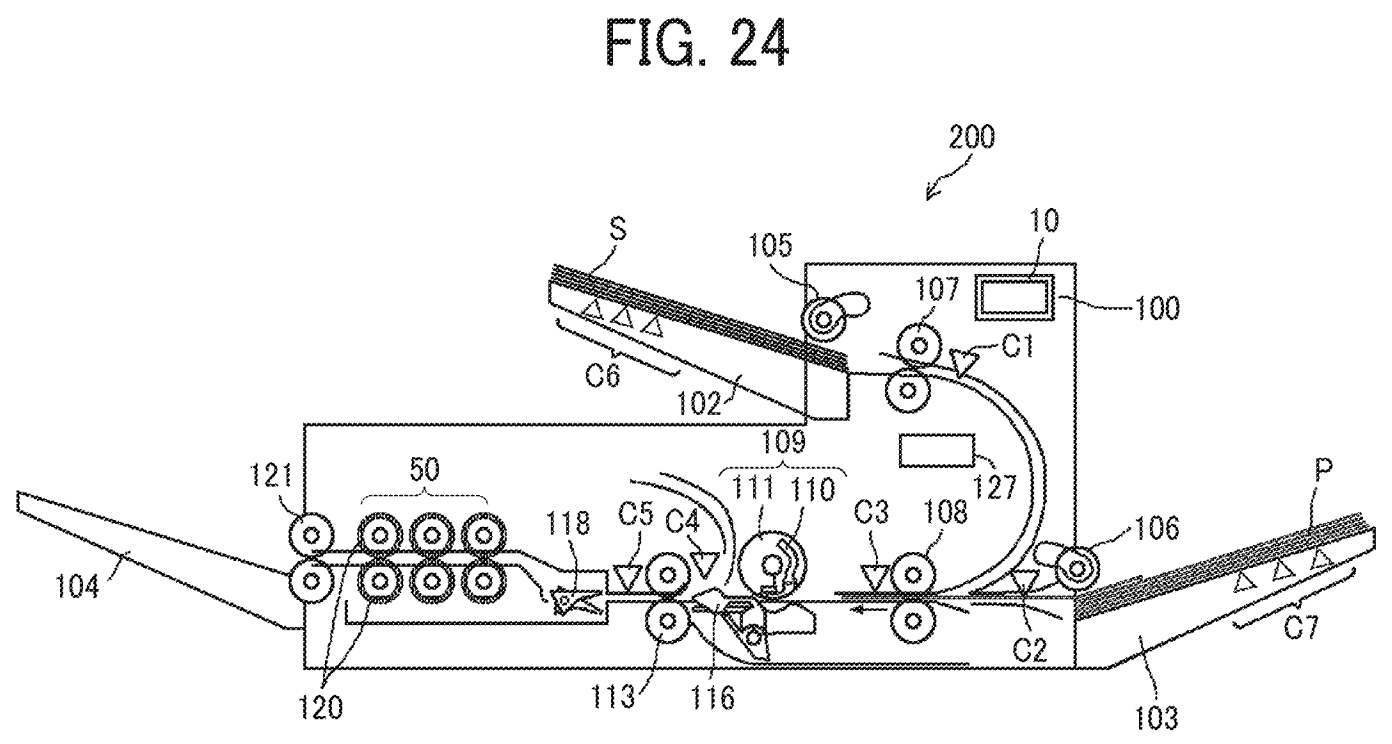

FIG. 24 is a diagram illustrating an overall configuration of a sheet laminator according to an embodiment of the present disclosure, including the sheet processing apparatus.

As illustrated in FIG. 24, a sheet laminator 200 includes the sheet processing apparatus 100 described above, a branching member 118, a thermal fixing roller pair 120, and an ejection roller pair 121. The branching member 118 changes (switches) the sheet conveyance passage of the lamination sheet S. The thermal fixing roller pair 120 that function as a pair of thermal fixing rollers that can heat and press the lamination sheet S. The ejection roller pair 121 is disposed downstream from the thermal fixing roller pair 120 in the sheet conveyance direction.

The sheet laminator 200 can perform a series of operations from feeding and separation of the lamination sheet S, insertion of the inner sheet P, and sheet lamination with heat and pressure on a stand-alone basis. This series of operations is carried out automatically without any aid of a user. For this reason, the sheet laminator 200 can enhance and provide the convenience better than a known sheet laminator employing a known technique.

Figure 25:
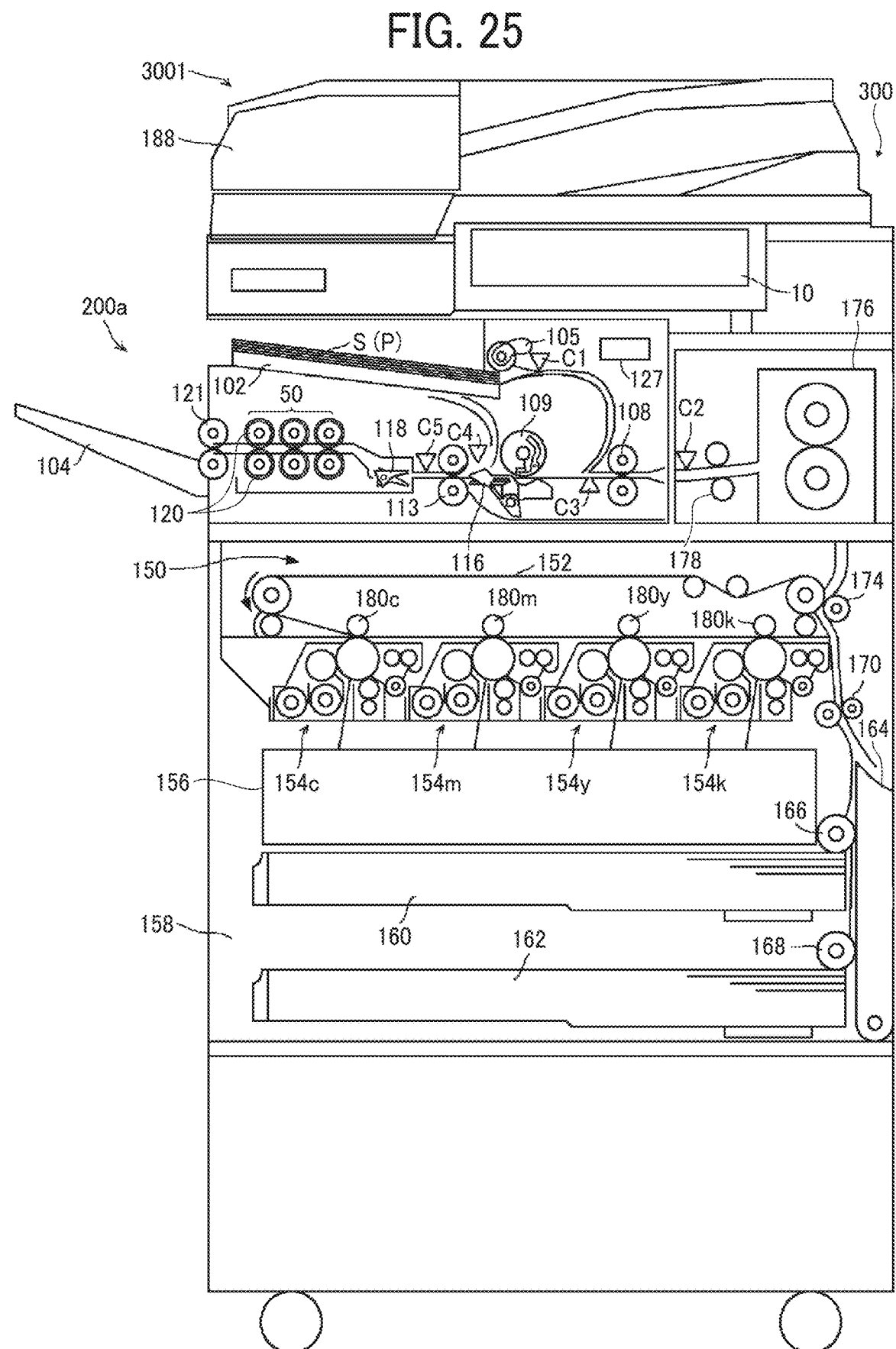
FIG. 25 is a diagram illustrating an overall configuration of an image forming system according to an embodiment of the present disclosure, including the sheet laminator and an image forming apparatus.

FIG. 25 is a diagram illustrating an overall configuration of an image forming system according to an embodiment of the present disclosure, including the sheet laminator and an image forming apparatus.

An image forming system 3001 includes a sheet laminator 200a in an in-body sheet discharging section of an image forming apparatus 300. The sheet laminator 200a functions as a device that performs sheet lamination.

The sheet laminator 200a includes the sheet tray 102 on which the lamination sheets S or the inner sheets P are stacked. The sheet laminator 200a can receive the lamination sheets S, the inner sheets P, or both from the image forming apparatus 300. Accordingly, the image forming apparatus 300 (e.g., a printer and a copier) can form an image on the lamination sheet S or the inner sheet P by the in-line connection.

A detailed description is given of the configuration of the image forming apparatus 300.

As illustrated in FIG. 25, the image forming apparatus 300 includes an intermediate transfer device 150. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 20.

The image forming apparatus 300 further includes image forming units 154c, 154m, 154y, and 154k for cyan (C), magenta (M), yellow (Y), and black (K), respectively. The image forming units 154c, 154m, 154y, and 154k are disposed below the intermediate transfer device 150 in the housing of the image forming apparatus 300. The image forming units 154c, 154m, 154y, and 154k are aligned in a quadruple tandem manner along an extended direction of the intermediate transfer belt 152. Each of the image forming units 154c, 154m, 154y, and 154k includes a drum-shaped image bearer that rotates in the clockwise direction in FIG. 25. Various image forming components, for example, a charging unit, a developing unit, a transfer unit, and a cleaning unit, are disposed around each of the image forming units 154c, 154m, 154y, and 154k. An exposure device 156 is disposed below the image forming units 154c, 154m, 154y, and 154k included in the image forming apparatus 300.

A sheet feeder 158 is disposed below the exposure device 156 in the image forming apparatus 300. The sheet feeder 158 includes a first sheet tray 160 that stores lamination sheets S and a second sheet tray 162 that stores inner sheets P. The first sheet tray 160 is an example of a third sheet stacker on which lamination sheets are stacked, and the second sheet tray 162 is an example of a fourth sheet stacker on which sheet media are stacked.

A first sheet feed roller 166 is disposed at the upper right of the first sheet tray 160 and feeds the lamination sheets S from the first sheet tray 160 one by one to a sheet conveyance passage 164. A second sheet feed roller 168 is disposed at the upper right of the second sheet tray 162 and feeds the inner sheets P from the second sheet tray 162 one by one to the sheet conveyance passage 164.

The sheet conveyance passage 164 extends upwardly from the lower side to the upper side on the right side in the image forming apparatus 300 and communicates with the sheet laminator 200a in the image forming apparatus 300. The sheet conveyance passage 164 is provided with, e.g., a conveyance roller pair 170, a secondary transfer device 174 in contact with the intermediate transfer belt 152, a fixing device 176, and a first sheet ejection device 178 including the ejection roller pair, serially.

The first sheet feed roller 166, the conveyance roller pair 170, and the sheet conveyance passage 164 are examples of a third feeder to feed a two-ply sheet (the lamination sheet S) from the first sheet tray 160 functioning as a third sheet stacker. The second sheet feed roller 168, the conveyance roller pair 170, and the sheet conveyance passage 164 are examples of a fourth feeder to feed a sheet medium (the inner sheet P) from the second sheet tray 162 functioning as a fourth sheet stacker. Further, the intermediate transfer device 150 and the fixing device 176 function as a part of the image forming device that forms an image on a sheet medium (i.e., the inner sheet P).

A description is now given of operations of the image forming apparatus 300 according to the present embodiment, to form an image on a sheet medium (i.e., the inner sheet P) and then perform a sheet laminating operation on the lamination sheet S.

To perform an image on the sheet medium (i.e., the inner sheet P), first, an image reading device 188 reads the image on an original document, and the exposure device 156 then performs writing of the image on the original document. The image forming units 154c, 154m, 154y, and 154k form respective toner images of cyan (C), magenta (M), yellow (Y), and black (K), respectively, on the respective image bearers. Then, primary transfer devices 180c, 180m, 180y, and 180k sequentially transfer the respective toner images onto the intermediate transfer belt 152, thereby forming a color image on the intermediate transfer belt 152.

By contrast, the image forming apparatus 300 rotates the second sheet feed roller 168 to feed and convey the inner sheet P to the sheet conveyance passage 164. The inner sheet P is conveyed by the conveyance roller pair 170 through the sheet conveyance passage 164 and is sent to the secondary transfer device 174 in sync with movement of the color image on the intermediate transfer belt 152. Then, the secondary transfer device 174 transfers the color image formed on the intermediate transfer belt 152 as described above, onto the inner sheet P.

After the color image has been transferred onto the inner sheet P, the fixing device 176 fixes the color image to the inner sheet P, and the first sheet ejection device 178 ejects to convey the inner sheet P to the sheet laminator 200*a*.

The sheet laminator 200*a* rotates the pickup roller 105 to pick up the lamination sheet S from the sheet tray 102 on which the lamination sheet S is stacked and conveys the lamination sheet S to the sheet separation device 1 (including the winding roller 109 and the separation members 116). The sheet separation device 1 separates a lamination sheet S into two sheets and conveys an inner sheet P conveyed from the image forming apparatus 300 by the entrance roller pair 108. By so doing, the inner sheet P is inserted between the separated two sheets of the lamination sheet S. Then, the lamination sheet S with the inner sheet P being inserted is conveyed by the exit roller pair 113 to a thermal fixing unit 50 as a thermal fixer. Then, the thermal fixing roller pair 120 of the thermal fixing unit 50 applies heat and pressure to the lamination sheet S in which the inner sheet P is inserted, in other words, the thermal fixing roller pair 120 of the thermal fixing unit 50 performs a sheet laminating operation on the lamination sheet S with the inner sheet P being inserted.

As described above, the lamination sheet S and the inner sheet P on which an on which an image is formed are conveyed to the sheet laminator 200*a* to receive the sheet laminating operation performed by the sheet laminator 200*a*.

According to the above-described configuration of the image forming system 3001 according to the present embodiment, the lamination sheet S stacked on the first sheet tray 160 of the image forming apparatus 300 is conveyed to the sheet laminator 200*a* via the sheet conveyance passage 164 and separate the lamination sheet S into two sheets in the sheet separation device 1. Then, while the sheet laminator 200*a* performs a sheet separating operation on the lamination sheet S, the image forming apparatus 300 conveys the inner sheet P stacked on the second sheet tray 162 in the sheet conveyance passage 164, the secondary transfer device 174, the fixing device 176, and the first sheet ejection device 178 to form an image on the inner sheet P, and then conveyed the inner sheet P to the sheet laminator 200*a*. Then, the sheet laminator 200*a* may also perform the sheet laminating operation on the lamination sheet S after inserting the inner sheet P on which an image is formed into the lamination sheet S separated into two sheets.

Descriptions are then given of an image forming system including the sheet processing apparatus according to an embodiment of the present disclosure and an image forming apparatus, according to a modification of the above-described embodiment.

Figure 26:
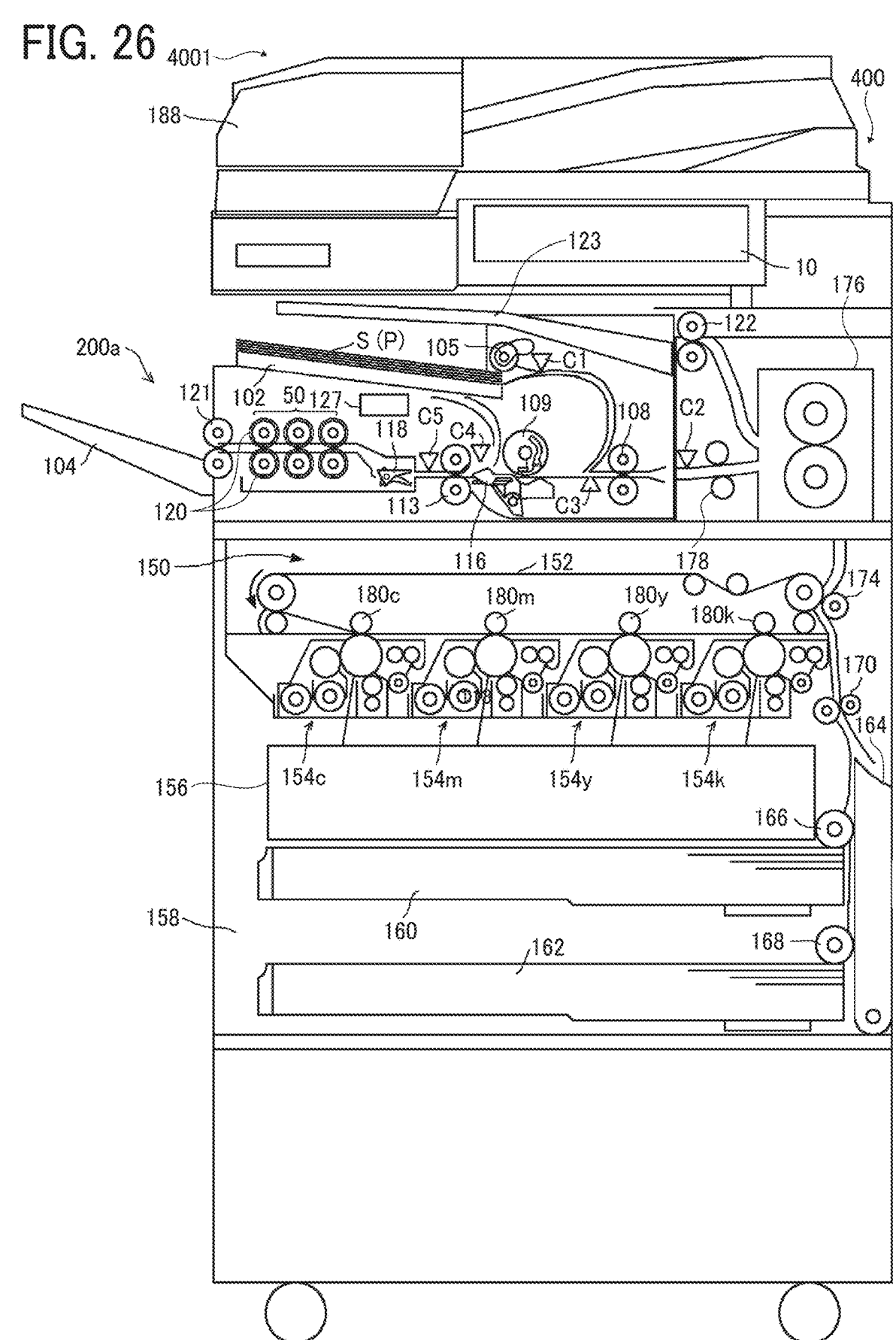
FIG. 26 is a diagram illustrating an overall configuration of an image forming system according to a modification of the present disclosure, including the sheet laminator and an image forming apparatus.

FIG. 26 is a diagram illustrating an overall configuration of an image forming system according to a modification of the present disclosure, including the sheet laminator and an image forming apparatus.

In an image forming system 4001 illustrated in FIG. 26, an image forming apparatus 400 is basically the same as the image forming apparatus 300 illustrated in FIG. 25. However, different from the image forming apparatus 300, the image forming apparatus 400 includes a second sheet ejection device 122 and a sheet ejection tray 123.

When the sheet laminating operation is not performed, the image forming apparatus 400 may form an image on the inner sheet P fed from the second sheet tray 162, and then eject the inner sheet P having the image by the second sheet ejection device 122 including a pair of sheet ejection rollers to the sheet ejection tray 123. Accordingly, when the sheet laminating operation is not performed, the image forming apparatus 400 does not need to decrease the output speed of image formation. For this reason, the image forming apparatus 400 can maintain the image formation productivity.

The image forming apparatus 400 may include the sheet laminator 200*a* detachably attached to the in-body sheet discharging section. In other words, when the sheet laminating operation is not performed, the sheet laminator 200*a* may be detached from the image forming apparatus 400.

In addition, the sheet laminator 200*a* thus detached from the image forming apparatus 400 may include the sheet tray 103 to stack the inner sheets P and the pickup roller 106 to feed the inner sheet P from the sheet tray 103, so that the sheet laminator 200*a* can be used as a single unit such as the sheet laminator 200 illustrated in FIG. 24.

The image forming system 3001 illustrated in FIG. 25 and the image forming system 4001 illustrated in FIG. 26 may include the sheet processing apparatus 100 in an in-body sheet discharging section instead of including the sheet laminator 200*a*. The image forming system 4001 illustrated in FIG. 26 may include the sheet processing apparatus 100 detachably attachable to the image forming system 4001.

Each of the image forming system 3001 illustrated in FIG. 25 and the image forming system 4001 illustrated in FIG. 26 may include a large-capacity sheet ejection device (stacker), a post-processing apparatus such as a binder unit, or both.

In a case where the lamination sheet S that is stacked on the first sheet tray 160 included in the image forming apparatus 300 illustrated in FIG. 25 or the image forming apparatus 400 illustrated in FIG. 26 passes through the fixing device 176, the lamination sheet S is not bonded at the fixing temperature but is bonded by application of heat higher than the fixing temperature. Although the image forming apparatus 300 illustrated in FIG. 25 and the image forming apparatus 400 illustrated in FIG. 26 employ electrophotography for image formation on the inner sheet P in the description above, the image formation method is not limited to the above-described configuration. For example, inkjet, stencil printing, or other known printing method may be employed to the image forming apparatus 300 and the image forming apparatus 400.

Figure 27:
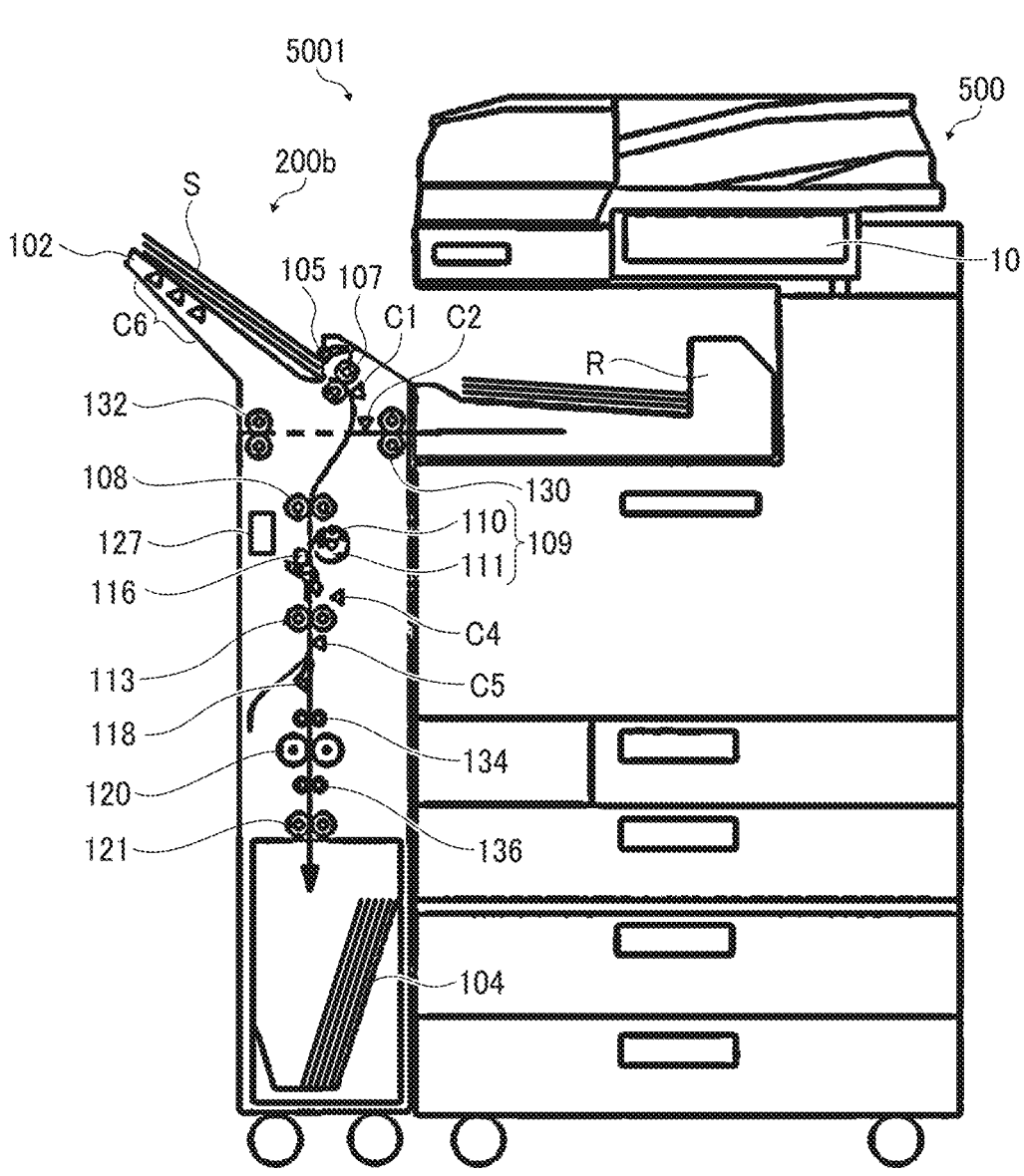
FIG. 27 is a diagram illustrating an overall configuration of an image forming system according to an embodiment of the present disclosure, including an image forming apparatus and the sheet laminator outside the image forming apparatus.

FIG. 27 is a diagram illustrating an image forming system according to yet another embodiment of the present disclosure, including an image forming apparatus and a sheet laminator according to the present disclosure on the outside of the image forming apparatus.

Figure 28:
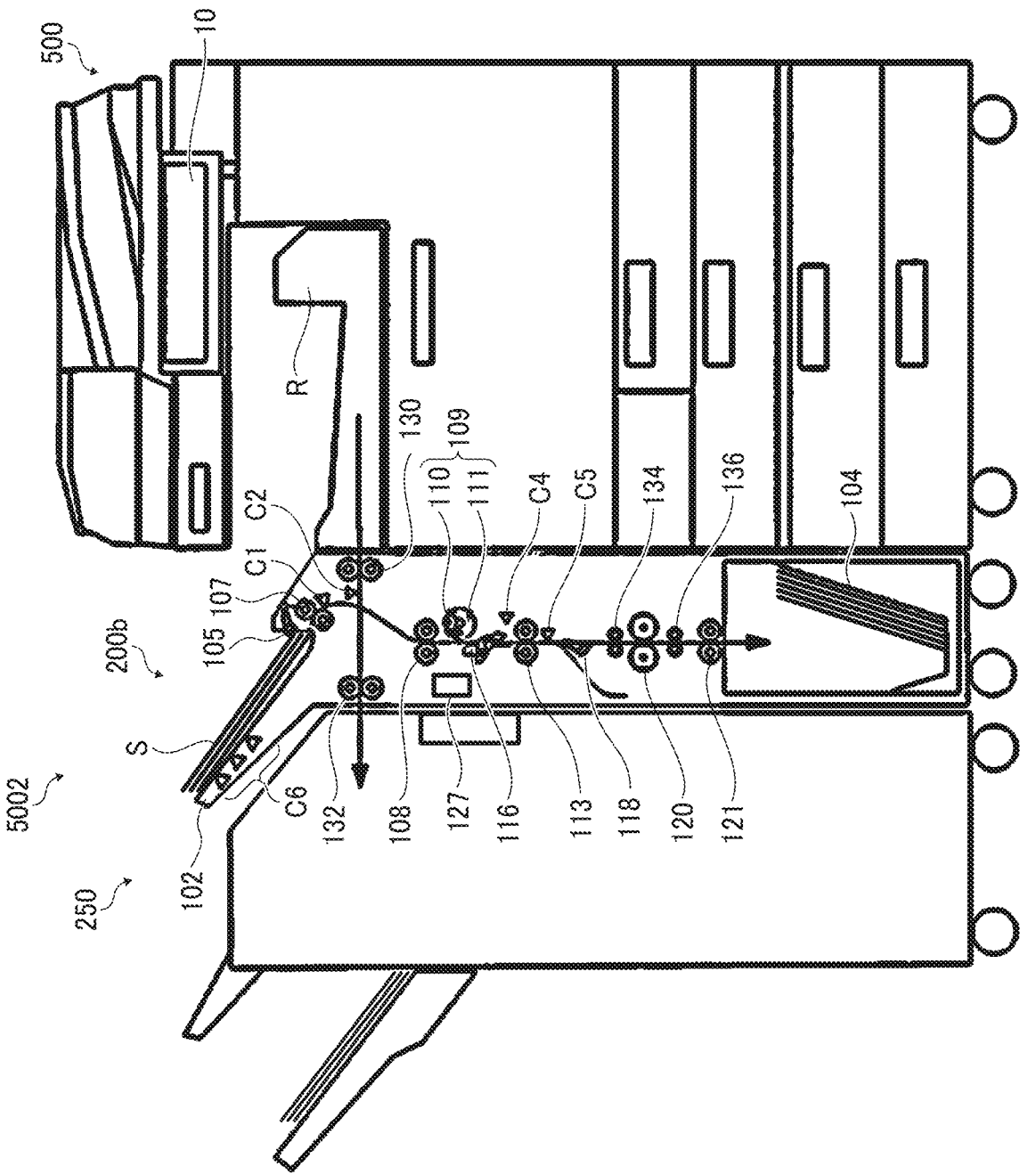
FIG. 28 is a diagram illustrating an overall configuration of another image forming system according to an embodiment of the present disclosure, including an image forming apparatus and the sheet laminator outside the image forming apparatus.

FIG. 28 is a diagram illustrating an image forming system according to yet another embodiment of the present disclosure, including an image forming apparatus and a sheet laminator according to the present disclosure on the outside of the image forming apparatus.

In FIGS. 27 and 28, elements identical to the elements of the image forming system 3001 illustrated in FIG. 25 and the elements of the image forming system 4001 illustrated in FIG. 26 are given identical reference numerals, and the descriptions these elements are omitted.

As illustrated in FIG. 27, an image forming system 5001 is basically same as the image forming system 3001 illustrated in FIG. 25 and the image forming system 4001 illustrated in FIG. 26. However, different from the image forming systems 3001 and 4001, the image forming system 5001 illustrated in FIG. 27 includes a sheet laminator 200b on the outside of an image forming apparatus 500.

The sheet laminator 200b includes the sheet tray 102 on which the lamination sheets S are stacked and has the configuration in which an inner sheet P can be fed from the image forming apparatus 500 via a relay conveyance device R. The sheet laminator 200b further includes the conveyance sensor C2 disposed downstream from an entrance roller pair 130 and upstream from an exit roller pair 132 in the sheet conveyance direction. The sheet laminator 200b further includes a sheet conveyance roller pair 134 disposed upstream from the thermal fixing roller pair 120 and a sheet conveyance roller pair 136 disposed downstream from the thermal fixing roller pair 120 in the sheet conveyance direction. Due to such a configuration, the image forming system 5001 can automatically perform any image forming operation on an inner sheet P with a copier or a printer (i.e., the image forming apparatus 500), a sheet separating operation on a lamination sheet S, a sheet inserting operation on the inner sheet P having an image into the separated lamination sheet S, and a sheet laminating operation on the lamination sheet S in which the inner sheet P is inserted.

The image forming system 5002 illustrated in FIG. 28 has a configuration in which another post-processing apparatus 250 is disposed further downstream from the sheet laminator 200b in the sheet conveyance direction of the lamination sheet S. This post-processing apparatus 250 includes, for example, a large-capacity sheet ejection device (stacker), a post-processing apparatus such as a binder, or both. According to the request of a user, the job performing the sheet laminating operation and the job not performing the sheet laminating operation can be performed in parallel, which can enhance the work efficiency.

Figure 29:
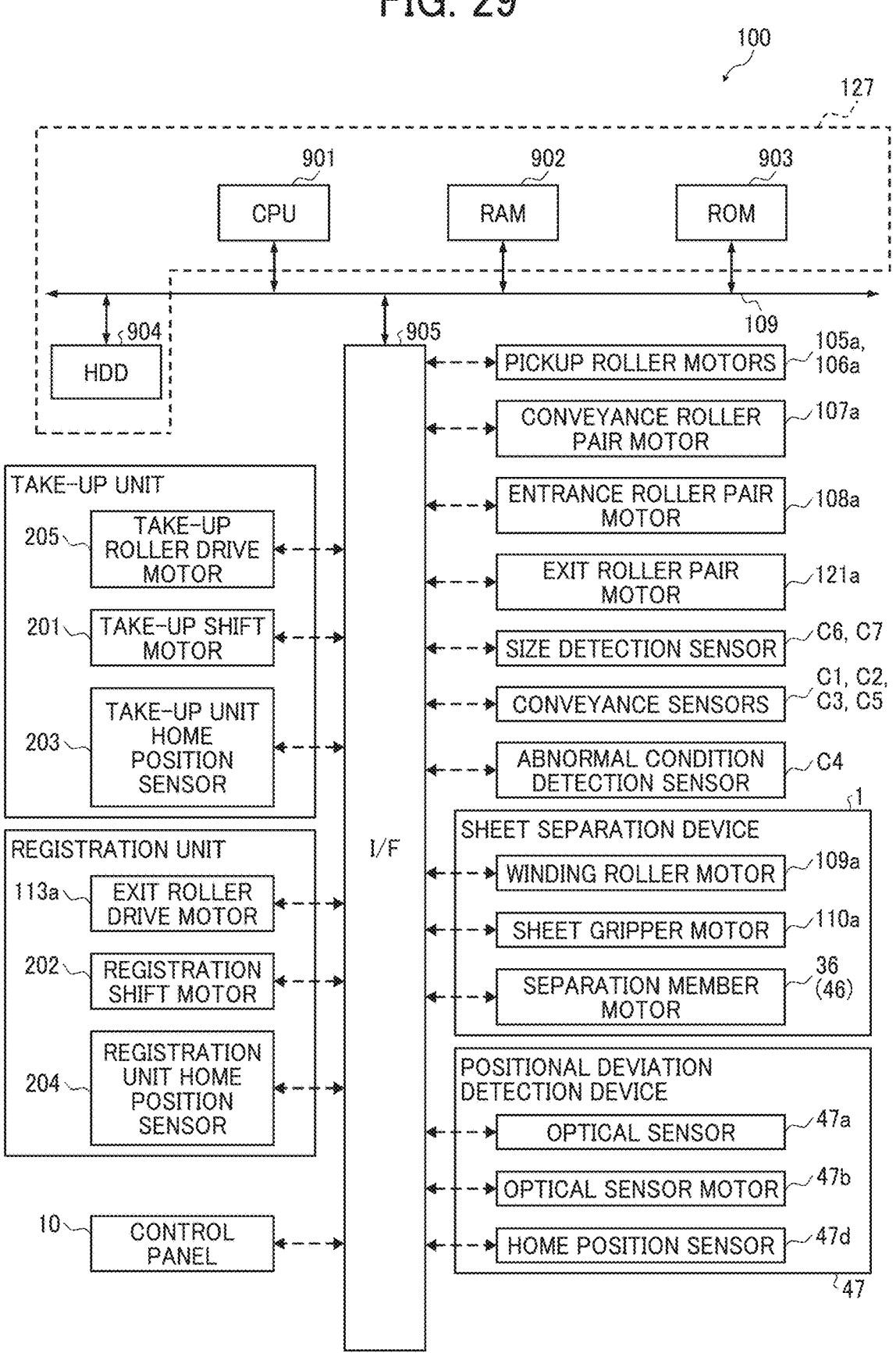
FIG. 29 is a block diagram illustrating a hardware configuration of a control block of the sheet processing apparatus to control the operation of the sheet processing apparatus.

FIG. 29 is a block diagram illustrating a hardware configuration of a control block of the sheet processing apparatus to control the operation performed in the sheet processing apparatus.

As illustrated in FIG. 29, the sheet processing apparatus 100 includes a central processing unit (CPU) 901, a random access memory (RAM) 902, a read only memory (ROM) 903, a hard disk drive (HDD) 904, and an interface (I/F) 905. The CPU 901, the RAM 902, the ROM 903, the HDD 904, and the I/F 905 are connected to each other.

The CPU 901 is an arithmetic unit and controls the overall operation of the sheet processing apparatus 100.

The RAM 902 is a volatile storage medium that allows data to be read and written at high speed. The CPU 901 uses the RAM 902 as a work area for data processing.

The ROM 903 is a read-only non-volatile storage medium that stores programs such as firmware.

The HDD 904 is a non-volatile storage medium that allows data to be read and written and has a relatively large storage capacity. The HDD 904 stores, e.g., an operating system (OS), various control programs, and application programs.

The sheet processing apparatus 100 processes, by an arithmetic function of the CPU 901, e.g., a control program stored in the ROM 903 and an information processing program (or application program) loaded into the RAM 902. Such processing configures a software controller including various functional modules of the sheet processing apparatus 100.

The software controller thus configured cooperates with hardware resources of the sheet processing apparatus 100 to construct functional blocks to implement functions of the sheet processing apparatus 100. In other words, the CPU 901, the RAM 902, the ROM 903, and the HDD 904 implement a controller 127 (control unit) to control the operation of the sheet processing apparatus 100.

The controller 127 controls, via the I/F 905, the operations of pickup roller motors 105a and 106a, a conveyance roller pair motor 107a, the entrance roller pair motor 108a, the exit roller pair motor 113a, an ejection roller pair motor 121a, the size detection sensors C6 and C7, the conveyance sensors C1, C2, C3, and C5, the abnormal condition detection sensor C4, the winding roller motor 109a, the sheet gripper motor 110a, a displacement detector (lateral registration detector) 47, an optical sensor 47a, an optical sensor motor 47b, a take-up shift motor 201, a registration shift motor 202, a take-up unit home position sensor 203, a registration unit home position sensor 204, a take-up roller drive motor 205, the separation member motor 36 (46), and the control panel 10.

Further, the controller 127 acquires the detection results from, for example, the size detection sensors C6 and C7, the sheet conveyance sensors C1, C2, C3, and C5, the abnormal condition detection sensor C4, the optical sensor 47a, the take-up unit home position sensor 203, and the registration unit home position sensor 204.

The winding roller motor 109a is a drive unit to drive the winding roller 109.

The sheet gripper motor 110a is a drive unit to drive the sheet gripper 110. The take-up shift motor 201 and the registration shift motor 202 are driving units that drive a take-up unit 230 and the registration unit 231 during the registration shift operation. The take-up roller drive motor 205 is a drive unit to drive the take-up roller. The separation member motor 36 (46) is a drive unit to move the separation members.

Figure 30B:
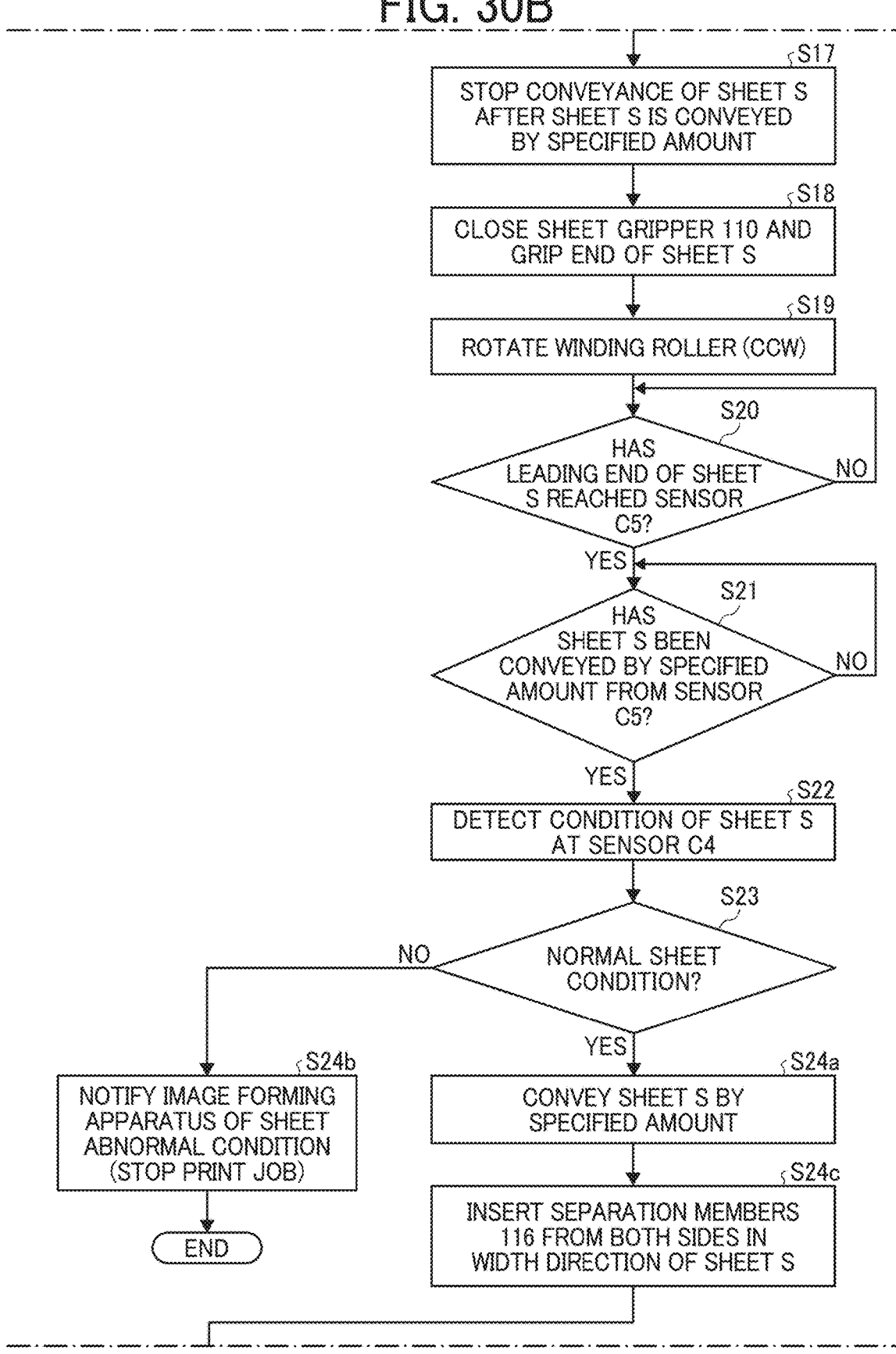
Figure 30C:
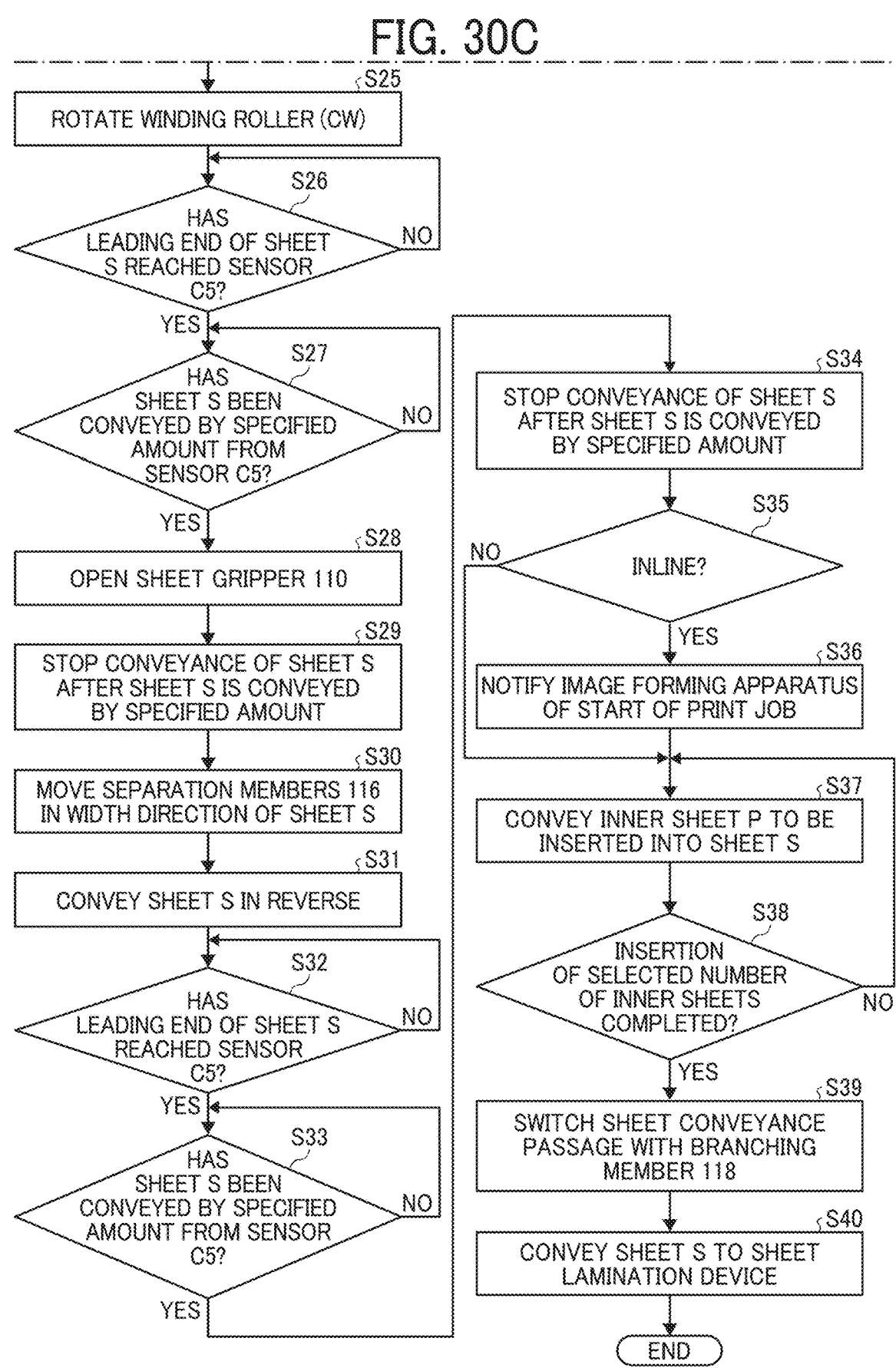

FIG. 30 including FIGS. 30A, 30B, and 30C is a flowchart of a series of operations performed by the image forming system 3001 illustrated in FIG. 25, from feeding a lamination sheet S, inserting an inner sheet P, and completing lamination of the lamination sheet S with the inner sheet P being inserted.

A description is given of the series of operations, with reference to the reference numerals indicated in the flowchart of FIG. 30 including FIGS. 30A, 30B, and 30C.

In the following description, only the sheet laminating operation in the image forming system 3001 illustrated in FIG. 25 is described. However, the sheet laminating operations in the image forming system 4001 illustrated in FIG. 26, the image forming system 5001 illustrated in FIG. 27, and the image forming system 5002 illustrated in FIG. 28 are similar to the image forming system 3001 illustrated in FIG. 25, and thus the detailed description is omitted.

First, in step S01, the image forming system 3001 determines whether a user has selected the multiple sheet insertion mode. When the user has selected the multiple sheet insertion mode (YES in step S01), the image forming system 3001 requests the user inputting the number of inner sheets in step S02. The number of inner sheets can be set by the user with, for example, the control panel 10.

On the other hand, when the user has not selected the multiple sheet insertion mode (NO in step S01), the image forming system 3001 determines whether the user has selected the single sheet insertion mode with one inner sheet in step S03.

Subsequent to step S02 or step S03, the sheet laminator 200a starts feeding a lamination sheet S (see FIG. 1), in step S11. Then, in step S12, the sheet laminator 200a determines whether the leading end of the lamination sheet S has reached the sheet conveyance sensor C3 (see FIG. 2). In step S13, the sheet laminator 200a determines whether the lamination sheet S has been conveyed by the designated from the sheet conveyance sensor C3, and temporarily stops the conveyance (see FIG. 3).

When the lamination sheet S has not been conveyed by the designated amount from the sheet conveyance sensor C3 (NO in step S13), step S13 is repeated until the lamination sheet S is conveyed by the designated amount from the sheet conveyance sensor C3. On the other hand, when the lamination sheet S has been conveyed by the specified amount from the sheet conveyance sensor C3 (YES in step S13), the sheet laminator 200a causes the sheet gripper motor 110a to open the sheet gripper 110 in step S14, and conveys the lamination sheet S in the reverse conveyance direction (i.e., the direction indicated by arrow B in FIG. 4) in step S15 (see FIG. 4).

Then, the sheet laminator 200a determines whether the lamination sheet S has been conveyed by the designated amount in step S16. When the lamination sheet S has not been conveyed by the designated amount (NO in step S16), step S16 is repeated until the lamination sheet S is conveyed by the designated amount. On the other hand, when the lamination sheet S has been conveyed by the designated amount (YES in step S16), the sheet laminator 200a temporarily stops the conveyance in step S17. Then, in step S18, the sheet laminator 200a causes the sheet gripper motor 110a to close the sheet gripper 110 to nip the end of the lamination sheet S (see FIG. 5).

Then, in step S19, the sheet laminator 200a causes the winding roller motor 109a to rotate the winding roller 109 in the counterclockwise direction, so that the lamination sheet S is would around the winding roller 109 (see FIG. 6). In step S20, the sheet laminator 200a determines whether the leading end of the lamination sheet S has reached at the sheet conveyance sensor C5.

When the leading end of the lamination sheet S has not reached the sheet conveyance sensor C5 (NO in step S20), step S20 is repeated until the leading end of the lamination sheet S reaches the sheet conveyance sensor C5. By contrast, when the leading end of the lamination sheet S has reached the sheet conveyance sensor C5 (YES in step S20), the sheet laminator 200a then executes the operation of step S21.

In step S21, the sheet laminator 200a determines whether the lamination sheet S has been conveyed by the designated amount from the sheet conveyance sensor C5. When the lamination sheet S has not been conveyed by the specified amount from the sheet conveyance sensor C5 (NO in step S21), step S21 is repeated until the lamination sheet S is conveyed by the designated amount from the sheet conveyance sensor C5. By contrast, when the lamination sheet S has been conveyed by the specified amount from the sheet conveyance sensor C5 (YES in step S21), the sheet laminator 200a detects the condition of the lamination sheet S with the abnormal condition detection sensor C4 in step S22.

The abnormal condition detection sensor C4 is an abnormal condition detector that detects whether the dimension of the space g created between the two sheets of the lamination sheet S (the amount of bending of one of the two sheets) exceeds the predetermined threshold. In step S23, the sheet laminator 200a determines whether the lamination sheet S is in a normal condition, in other words, the size of the space g is equal to or greater than the given threshold, from the detection result of the abnormal condition detection sensor C4. When the sheet laminator 200a determines that the lamination sheet S is in a normal condition (i.e., the size of the space g is equal to or greater than the given threshold)

from the detection result of the abnormal condition detection sensor C4 (YES in step S23), the sheet laminator 200a then executes the operation of step S24a.

On the other hand, when the sheet laminator 200a determines that the lamination sheet S is in an abnormal condition (i.e., the size or dimension of the space "g" is smaller than the given threshold) from the detection result of the abnormal condition detection sensor C4 (NO in step S23), the sheet laminator 200a notifies the user of the abnormal condition and stops the sheet processing operation in step S24b.

In step S24a, the sheet laminator 200a conveys the lamination sheet S by the specified amount in a direction opposite to the sheet winding direction (i.e., the direction indicated by arrow A in FIG. 2), so that the bonded portion r of the lamination sheet S is located downstream from the nip region of the exit roller pair 113. Accordingly, the space g created between the two sheets of the lamination sheet S can be formed at a position corresponding to the insertion position of the separation members 116.

After step S24a, the sheet laminator 200a executes the operation of step S24c. In step S24c, the sheet laminator 200a causes the separation member motor 36 to inserts the separation members 116 from both sides of the lamination sheet S into the space g created between the two sheets of the lamination sheet S (see FIGS. 7 and 20). Then, in step S25, the sheet laminator 200a causes the winding roller motor 109a to rotate the winding roller 109 in the clockwise direction with the separation members 116 inserted from both sides of the lamination sheet S, and convey the lamination sheet S in the forward conveyance direction (i.e., the direction indicated by arrow A in FIG. 2).

Then, in step S26, the sheet laminator 200a determines whether the leading end of the lamination sheet S has reached the sheet conveyance sensor C5. When the leading end of the lamination sheet S has not reached the sheet conveyance sensor C5 (NO in step S26), step S26 is repeated until the leading end of the lamination sheet S reaches the sheet conveyance sensor C5. By contrast, when the leading end of lamination sheet S has reached the sheet conveyance sensor C5 (YES in step S26), the sheet laminator 200a executes the operation of step S27.

In step S27, the sheet laminator 200a determines whether the lamination sheet S has been conveyed by the designated amount from the sheet conveyance sensor C5. When the lamination sheet S has not been conveyed by the designated amount from the sheet conveyance sensor C5 (NO in step S27), step S27 is repeated until the lamination sheet S is conveyed by the designated amount from the sheet conveyance sensor C5. By contrast, when the lamination sheet S has been conveyed by the designated amount from the sheet conveyance sensor C5 (YES in step S27), the sheet laminator 200a the sheet gripper motor 110a to open the sheet gripper 110 in step S28.

In step S29, the sheet laminator 200a conveys the lamination sheet S by the designated amount, then temporarily stops the conveyance of the lamination sheet S. Then, in step S30, the controller 127 of the sheet laminator 200a causes the separation member motor 36 to further move the separation members 116 in the width direction of the lamination sheet S (see FIGS. 8 and 22). As a result, the trailing ends of the two sheets of the lamination sheet S are separated into the upper and lower sheets.

In step S31, the sheet laminator 200a conveys the lamination sheet S in the reverse conveyance direction (i.e., the direction indicated by arrow B in FIG. 9). Then, in step S32, the sheet laminator 200a determines whether the leading end of the lamination sheet S in the forward conveyance direction has reached the sheet conveyance sensor C5. When the leading end of the lamination sheet S has not reached the sheet conveyance sensor C5 (NO in step S32), step S32 is repeated until the leading end of the lamination sheet S reaches the sheet conveyance sensor C5. By contrast, when the leading end of lamination sheet S has reached the sheet conveyance sensor C5 (YES in step S32), the sheet laminator 200a then executes the operation of step S33. In step S33, the sheet laminator 200a determines whether the lamination sheet S has been conveyed by a specified amount from the sheet conveyance sensor C5. When the lamination sheet S has not been conveyed by the specified amount from the sheet conveyance sensor C5 (NO in step S33), step S33 is repeated until the lamination sheet S is conveyed by the specified amount from the sheet conveyance sensor C5. By contrast, when the lamination sheet S has been conveyed by the specified amount from the sheet conveyance sensor C5 (YES in step S33), the sheet laminator 200a temporarily stops the conveyance of the lamination sheet S in step S34 (see FIG. 9). As a result, the separation of the lamination sheet S is completed.

Subsequently, in step S35, the sheet laminator 200a determines whether or not to perform the image forming operation (with an inline image forming apparatus) on the inner sheet P to be inserted into the lamination sheet S. When the image forming operation is performed with an inline image forming apparatus (YES in step S35), the sheet laminator 200a sends a signal to notify the inline image forming apparatus, for example, the image forming apparatus 300 (or the image forming apparatus 400 or the image forming apparatus 500) to start the print job (printing operation) to form an image on the inner sheet P in step S36. Then, the sheet laminator 200a executes the operation of step S37.

By contrast, when the image forming operation is not performed with an inline image forming apparatus (NO in step S35), the sheet laminator 200a then executes the operation of step S37.

In step S37, the sheet laminator 200a conveys the inner sheet P in the forward conveyance direction (i.e., the direction indicated by arrow A in FIG. 10), so as to insert the inner sheet P into the opening of the lamination sheet S. In step S37, when the single sheet insertion mode is selected, the sheet laminator 200a performs the operations illustrated in FIGS. 10 to 12. On the other hand, when the multiple sheet insertion mode is selected, the sheet laminator 200a performs the operations illustrated in FIGS. 13 to 16.

In step S38, the sheet laminator 200a determines whether the selected number of inner sheets P are inserted into the lamination sheet S. When the selected number of inner sheets P are not inserted into the lamination sheet S (NO in step S38), step S38 is repeated until the selected number of inner sheets P are inserted into the lamination sheet S. On the other hand, when the selected number of inner sheets P are inserted into the lamination sheet S (YES in step S38), the sheet laminator 200a then executes the operation of step S39.

Then, in step S39, the controller 127 of the sheet laminator 200a causes the branching member motor 118a to rotate the branching member 118 to switch (change) the sheet conveyance passage of the lamination sheet S with the branching member 118. In step S40, the sheet laminator 200a conveys the lamination sheet S sandwiching the inner sheet P to the thermal fixing unit 50. By application of heat and pressure to the lamination sheet S, the sheet laminating operation completes (see FIG. 17).

When the image forming operation is performed with an inline image forming apparatus (YES in step S35), the sheet laminator 200a sends a signal to notify the inline image forming apparatus, for example, the image forming apparatus 300 (or the image forming apparatus 400 or the image forming apparatus 500) to start the print job, then performs the printing operation on the inner sheet P and conveys the inner sheet P. In this case, the sheet processing apparatus waits until the printed inner sheet Pis conveyed and reaches the sheet conveyance sensor C1. The sheet laminator 200a may send the image forming apparatus 300 (or the image forming apparatus 400 or the image forming apparatus 500) the signal to start the print job in advance based on a time to convey the printed inner sheet P, for example, after the separation members 116 complete the operations illustrated in FIG. 7. Due to such a configuration, the productivity can be enhanced.

Sequentially, a description is given of the configuration in which two sheets of the lamination sheet S are preferably separated from each other and an inner sheet P is inserted between the separated two sheets of the lamination sheet S in the main scanning direction (width direction) without causing positional deviation.

Figure 31A:
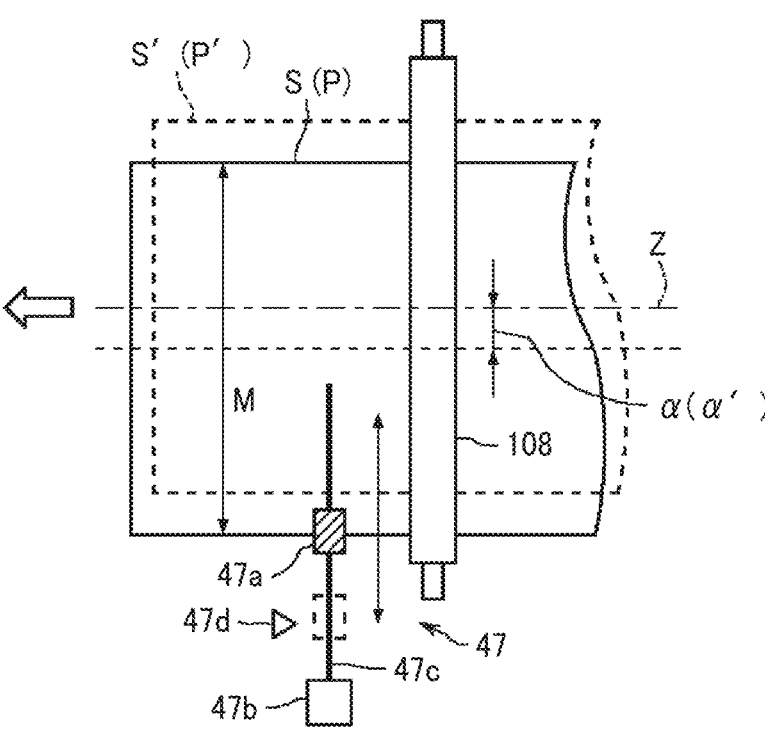
FIG. 31A is a top view of a displacement detector and the area around the displacement detector.
Figure 31B:
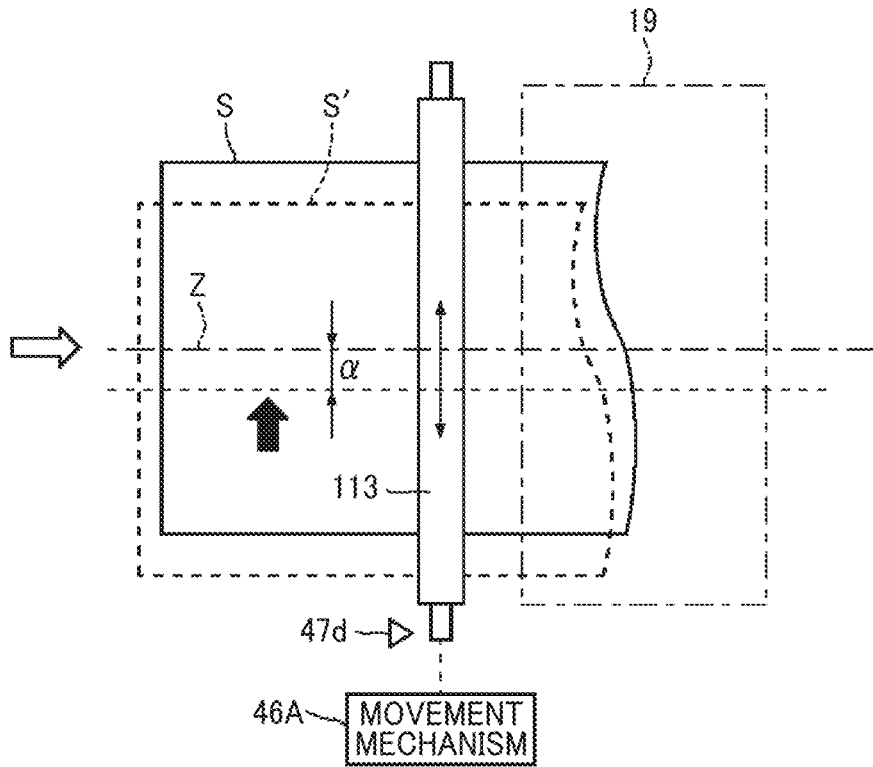
FIG. 31B is a top view of a displacement adjuster and the area around the displacement adjuster.

Referring to FIGS. 31A and 31B (and FIG. 1), the sheet processing apparatus 100 according to the present embodiment includes the displacement detector 47 as a position detector and the exit roller pair 113 as a position adjuster as well as a second conveyor.

Then, the displacement detector 47 (as a first position detector) and the exit roller pair 113 (as a position adjuster) are used to set the lateral registration (i.e., the lateral displacement volume) of the inner sheet P with respect to the lamination sheet S to be a desired value.

A detailed description is now given of the details of the above-described operation.

FIG. 31A is a top view of the displacement detector 47 and the area around the displacement detector 47.

With reference to FIG. 31A, the displacement detector 47 can detect the lateral displacement volume (i.e., the lateral registration) in the width direction of the lamination sheet S being conveyed in a given sheet conveyance direction toward a sheet separation unit 19. The given sheet conveyance direction is the direction indicted by white arrow in FIG. 31A. The width direction of the lamination sheet S is the direction orthogonal to the sheet conveyance direction and the vertical direction in FIGS. 31A and 31B. The displacement detector 47 can also detect the lateral displacement volume (i.e., the lateral registration) in the width direction of the inner sheet P being conveyed in the direction indicted by the white arrow toward the sheet separation unit 19.

More specifically, the displacement detector 47 includes the optical sensor 47a, the optical sensor motor 47b, a feed screw 47c, a guide rod, and the home position sensor 47d.

The optical sensor 47a is a reflection type photosensor including a light emitting element and a light receiving element and is disposed upstream (i.e., the right side in FIG. 1) from the sheet separation unit 19 in the sheet conveyance direction (the sub-scanning direction). The optical sensor 47a is movable at one end (i.e., the lower end in FIG. 31A) within a widthwise range corresponding to the widthwise size M of the lamination sheet S or the inner sheet P.

Specifically, the optical sensor 47a has an internal thread and a through hole and is held to be movable in the width direction. The feed screw 47c extending in the width direction screws together with the internal thread. The guide rod disposed parallel to the feed screw 47c is inserted through the through hole. When the optical sensor motor 47*b* that is a forward and reverse rotation type is driven, the feed screw 47*c* is rotated in the forward and reverse directions. By so doing, the optical sensor 47*a* can be moved within a range indicated by a bidirectional arrow in FIG. 31A.

The position of the edge portion at the one end of the lamination sheet S is nipped and conveyed by the entrance roller pair 108 is optically detected by the optical sensor 47*a*. Specifically, when the conveyance sensor C3 (see FIG. 1) detects the lamination sheet S, the optical sensor 47*a* that stays at the home position (indicated with a broken line in FIG. 31A) moves in the width direction to the position at which the optical sensor 47*a* detects the edge portion at the one end of the lamination sheet S. The home position of the optical sensor 47*a* is detected by the home position sensor 47*d*.

Then, the displacement volume $\alpha$ (i.e., the lateral registration) of the lamination sheet S from the center reference Z (i.e., the desired position as the widthwise center position of a sheet of any widthwise size) is obtained, based on the distance of movement from the home position of the optical sensor 47*a* (obtained from the number of steps of the optical sensor motor 47*b*) or the widthwise size M of the lamination sheet S.

Like the conveyance of the lamination sheet S, when the inner sheet P is conveyed, a displacement volume $\alpha'$ (i.e., the lateral registration) of the inner sheet P is detected by the displacement detector 47.

Normally, the widthwise and lengthwise size of the lamination sheet S is larger than the widthwise and lengthwise size of the inner sheet P.

The widthwise size M of the lamination sheet S and the inner sheet P can be grasped based on the information of the lamination sheet S and the inner sheet P input to the control panel 10.

On the other hand, FIG. 31B is a top view of the exit roller pair 113 serving as a displacement adjuster and the area around the exit roller pair 113. With reference to FIG. 31B, the exit roller pair 113 functions as a displacement adjuster that can adjust the lateral displacement of the lamination sheet S, in other words, the displacement in the width direction of the lamination sheet S before the sheet separating operation, based on the displacement volume (i.e., the lateral registration) of the lamination sheet S detected by the displacement detector 47 (serving as a displacement detector).

Specifically, the exit roller pair 113 as a position adjuster is a conveyance roller pair (conveyor) that nips and conveys the lamination sheet S for a sheet separating operation, and is made movable by a movement mechanism 46A in the width direction of the lamination sheet S while the lamination sheet S is nipped by the exit roller pair 113. The movement mechanism 46A moves the exit roller pair 113 in the width direction (in a direction indicated by a bidirectional arrow in FIG. 31B). The movement mechanism 46A may include, for example, a holder that rotatably holds the exit roller pair 113 and a rack and pinion mechanism that moves the holder in the width direction.

Before the sheet separating operation is performed, the movement mechanism 46A moves the exit roller pair 113 nipping the lamination sheet S by a distance corresponding to the displacement volume $\alpha$ of the lamination sheet S in the opposite direction to the direction in which the exit roller pair 113 is displaced so as to cancel the displacement volume $\alpha$ (i.e., the lateral registration) of the lamination sheet S detected by the displacement detector 47.

As a result, the center position in the width direction of the lamination sheet S coincides with the center reference Z (in other words, the desired position). Due to such a configuration, when compared with a configuration in which the center position is displaced from the center reference Z, the separation members 116 are smoothly inserted into the space "g" of the lamination sheet S (see FIG. 20) and a separation failure is less likely to occur.

Before the above-described displacement is adjusted, the exit roller pair 113 is at the home position detected by the home position sensor 46*d*. The exit roller pair 113 is then moved from the home position by a desired distance of movement corresponding to the displacement volume $\alpha$ of the lamination sheet S (obtained from the number of steps of the motor of the movement mechanism 46A).

On the other hand, the exit roller pair 113 may be controlled such that the exit roller pair 113 is moved from the home position by the displacement volume $\alpha$ of the exit roller pair 113 in advance before the lamination sheet S is nipped, and then is brought back to the home position after the lamination sheet S is nipped. This configuration can easily control readjustment of the displacement of the lamination sheet S corresponding to the displacement volume $\alpha'$ of the inner sheet P described below.

In the present embodiment, based on the displacement volume $\alpha'$ of the inner sheet P detected by the displacement detector 47 (as a position detector), after the sheet separating operation and before the sheet inserting operation, the exit roller pair 113 (as a position adjuster) adjusts the relation of lateral positions (the positions in the width direction) of the inner sheet P and the lamination sheet S.

More specifically, as described above, the exit roller pair 113 (as a position adjuster) adjusts the displacement volume $\alpha$ of the lamination sheet S to be zero, based on the displacement volume $\alpha$ of the lamination sheet S detected by the displacement detector 47 (as a position detector). Then, the sheet separating operation is performed. In other words, the lateral center position of the lamination sheet S is matched with the center reference Z before the sheet separating operation.

Then, before the sheet inserting operation, based on the displacement volume $\alpha'$ of the inner sheet P detected by the displacement detector 47 after the sheet separating operation, the lamination sheet S is moved in the width direction so that the exit roller pair 113 (and the movement mechanism 46A) generates the displacement volume $\alpha$ that is substantially equal to the displacement volume $\alpha'$ of the inner sheet P. More specifically, the lamination sheet S is moved by substantially the same distance as the displacement volume $\alpha'$ of the inner sheet P in the direction substantially the same as the direction of displacement of the inner sheet P.

As a result, even if the inner sheet P is displaced, the center position in the width direction of the inner sheet P matches the center position in the width direction of the lamination sheet S. According to this configuration, it is less likely to cause such a failure in which the sheet inserting operation is performed while the inner sheet P is relatively displaced in the width direction with respect to the lamination sheet S (for example, the inner sheet P is out from the lamination sheet S).

Figure 32:
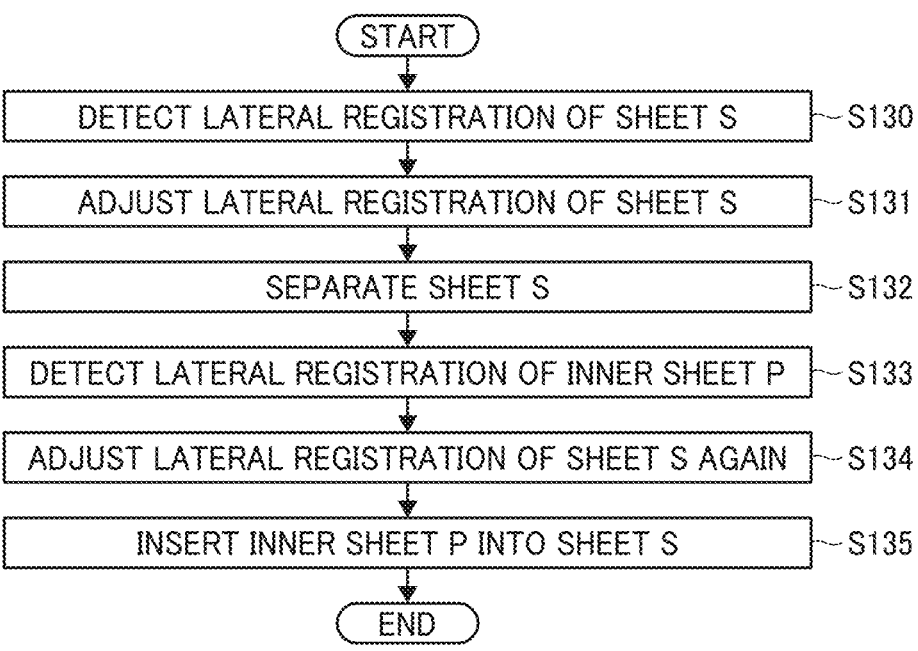
FIG. 32 is a flowchart illustrating the control process to adjust the relation of lateral positions of a lamination sheet and an inner sheet.

A description is now given of the control in adjustment of the relation of lateral positions of the above-described lamination sheet S and the inner sheet P, with reference to FIG. 32.

FIG. 32 is a flowchart of the control process to adjust the relation of lateral positions of the lamination sheet S and the inner sheet P.

When the entrance roller pair 108 nips and conveys the lamination sheet S, the displacement detector 47 detects the displacement volume α (i.e., the lateral registration) of the lamination sheet S (step S130).

Then, after the exit roller pair 113 nips the lamination sheet S, the movement mechanism 46A moves the exit roller pair 113 in the width direction to adjust the lateral registration α of the lamination sheet S (step S131). Subsequently, the lateral registration α of the lamination sheet S is adjusted, and then the sheet separation unit 19 performs the sheet separating operation on the lamination sheet S (step S132).

When the entrance roller pair 108 nips and conveys the inner sheet P, the displacement detector 47 detects the displacement volume α' (i.e., the lateral registration) of the inner sheet P (step S133). Subsequently, before the inner sheet P reaches the sheet separation unit 19, the lateral registration of the lamination sheet S nipped by the exit roller pair 113 is adjusted again to be aligned with the lateral registration α' of the inner sheet P (step S134).

Then, with the lateral center position of the lamination sheet S matched with the lateral center position of the inner sheet P, the inner sheet P is inserted into the lamination sheet S in the sheet inserting operation (step S135). Then, the flow of the control of adjustment of the relation of lateral positions of the lamination sheet S and the inner sheet P ends.

Modification 1

A description is given of the sheet processing apparatus 100 according to Modification 1 of the above embodiments of the present disclosure.

Figure 33:
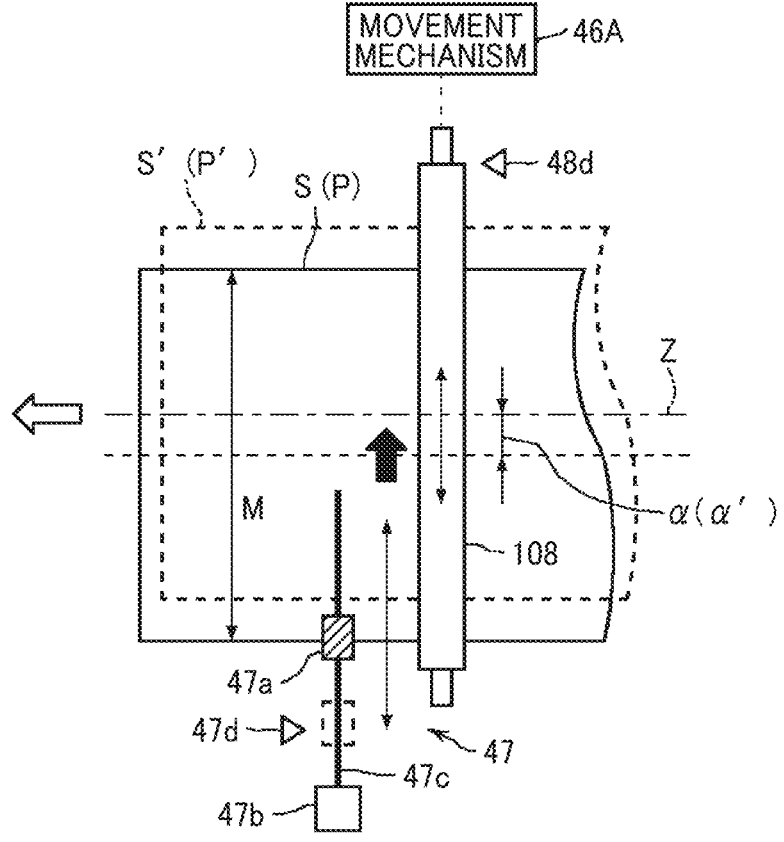
FIG. 33 is a top view of the displacement detector and the displacement adjuster and the area around the displacement detector and the displacement adjuster according to Modification 1 of an embodiment of the present disclosure.

FIG. 33 is a top view of the displacement detector and the displacement adjuster and the area around the displacement detector and the displacement adjuster according to Modification 1 of an embodiment of the present disclosure.

The sheet processing apparatus 100 according to Modification 1 in FIG. 33 has the different control in adjustment of the relation of lateral positions of the lamination sheet S and the inner sheet P, from the sheet processing apparatus 100 with reference to FIGS. 31A, 31B, and 32.

More specifically, as illustrated in FIG. 33, the sheet processing apparatus 100 according to Modification 1 includes the entrance roller pair 108 as a conveyance roller pair disposed upstream from the sheet separation unit 19 in the sheet conveyance direction. The entrance roller pair 108 as a position adjuster is movable in the width direction by the movement mechanism 46A while holding the lamination sheet S and the inner sheet P.

In other words, in Modification 1, the entrance roller pair 108 as a position adjuster adjusts the displacement of the lamination sheet S and the displacement of the inner sheet P. The movement mechanism 46A moves the entrance roller pair 108 in the width direction (i.e., the direction indicated by the bidirectional arrow in FIG. 33). The movement mechanism 46A may include, for example, a holder that rotatably holds the entrance roller pair 108 and a rack and pinion mechanism that moves the holder in the width direction.

First, the entrance roller pair 108 (as a position adjuster) adjusts the displacement volume α of the lamination sheet S to be zero, based on the displacement volume α of the lamination sheet S detected by the displacement detector 47 (a position detector). Then, the sheet separating operation is performed.

In other words, before the lamination sheet S reaches the position of the exit roller pair 113 that does not function as a position adjuster in Modification 1, the entrance roller pair 108 as a position adjuster moves to align the lateral center position of the lamination sheet S with the center reference Z. Then, the sheet processing apparatus 100 performs the sheet separating operation while the lamination sheet S is nipped by the exit roller pair 113.

Then, before the sheet inserting operation, based on the displacement volume α' of the inner sheet P detected by the displacement detector 47, the entrance roller pair 108 (as a position adjuster) adjusts the displacement volume α' of the inner sheet P to be zero.

In other words, before the inner sheet P reaches the position of the sheet separation unit 19, the entrance roller pair 108 moves to align the lateral center position of the inner sheet P with the center reference Z. Then, the inner sheet P is inserted into the lamination sheet S at the position of the sheet separation unit 19, in other words, the sheet processing apparatus 100 performs the sheet inserting operation.

By so doing, the lateral center position of the lamination sheet S and the lateral center position of the inner sheet P match with the center reference Z, respectively. According to this configuration, it is less likely to cause such a failure in which the sheet inserting operation is performed while the inner sheet P is relatively displaced in the width direction with respect to the lamination sheet S (for example, the inner sheet P is out from the lamination sheet S).

Figure 34:
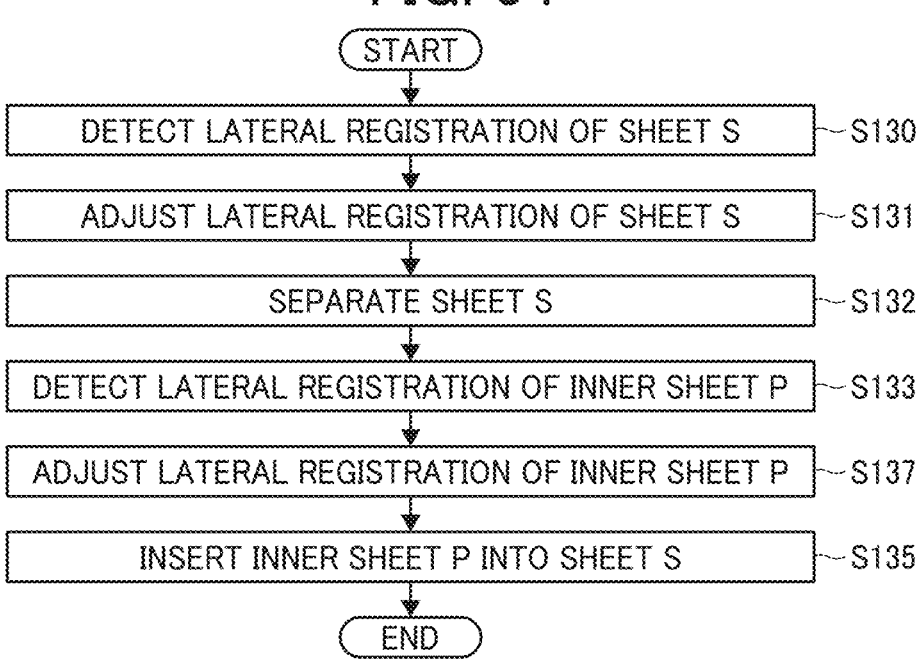
FIG. 34 is a flowchart of the control process executed in a sheet processing apparatus of FIG. 33 to adjust the relation of lateral positions of the lamination sheet and the inner sheet.

A description is now given of the control in adjustment of the relation of lateral positions of the lamination sheet S and the inner sheet P in Modification 1, with reference to FIG. 34.

FIG. 34 is a flowchart of the control process executed in the sheet processing apparatus of FIG. 33 to adjust the relation of lateral positions of the lamination sheet S and the inner sheet P.

When the entrance roller pair 108 nips and conveys the lamination sheet S, the displacement detector 47 detects the displacement volume α (i.e., the lateral registration) of the lamination sheet S (step S130). Then, while the entrance roller pair 108 nips and conveys the lamination sheet S, the movement mechanism 46A moves the entrance roller pair 108 in the width direction to adjust the displacement volume α (i.e., the lateral registration) of the entrance roller pair 108 (step S131).

Subsequently, the lateral registration α of the lamination sheet S is adjusted, and then the sheet separation unit 19 performs the sheet separating operation on the lamination sheet S (step S132).

When the entrance roller pair 108 nips and conveys the inner sheet P, the displacement detector 47 detects the displacement volume α' (i.e., the lateral registration) of the inner sheet P (step S133). Subsequently, before the inner sheet P reaches the sheet separation unit 19, the movement mechanism 46A moves the entrance roller pair 108 in the width direction to adjust the displacement volume α' (i.e., the lateral registration) of the inner sheet P while the entrance roller pair 108 nips the inner sheet P (step S137).

Then, while the lateral center position of the lamination sheet S and the lateral center position of the inner sheet P are matched with the center reference Z, respectively, the inner sheet P is inserted into the lamination sheet S in the sheet inserting operation (step S135). Then, the flow of the control of adjustment of the relation of lateral positions of the lamination sheet S and the inner sheet P ends.

Due to such a configuration, the two sheets (sheets S1 and S2) of the lamination sheet S can be preferably separated from each other and the inner sheet P can be inserted into the lamination sheet S without causing the lateral displacement of the inner sheet P.

Modification 2

Figure 35:
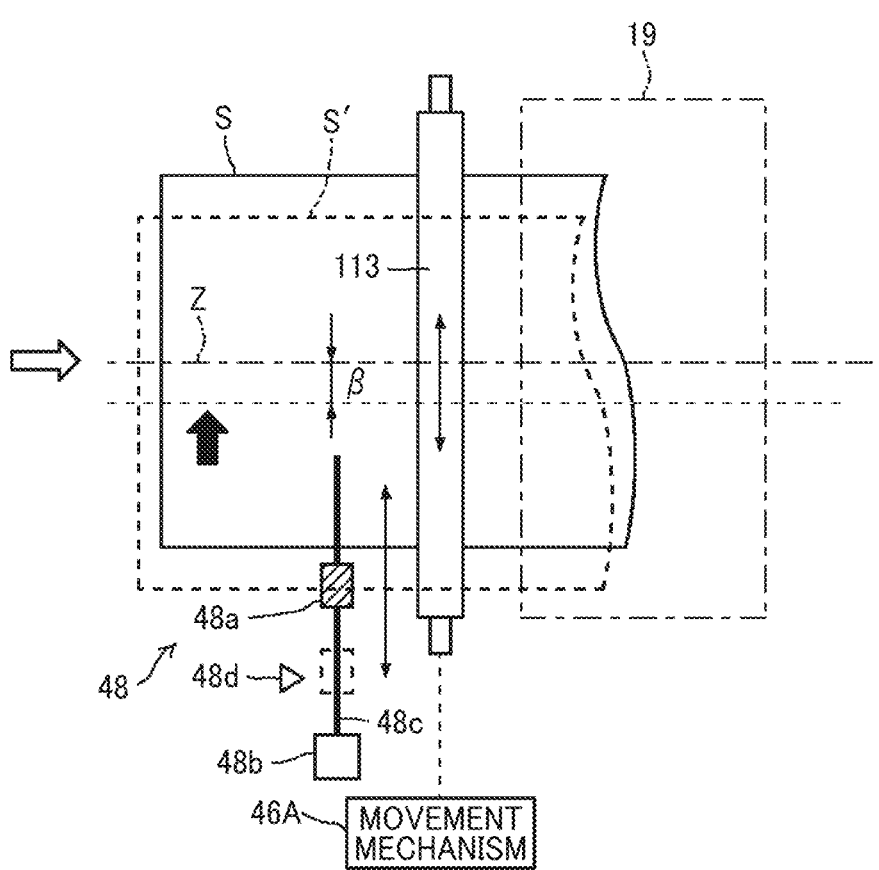
FIG. 35 is a top view of the displacement adjuster and the area around the displacement adjuster, according to Modification 2 of an embodiment of the present disclosure.

A description is given of the sheet processing apparatus 100 according to Modification 2, with reference to FIG. 35.

FIG. 35 is a top view of the exit roller pair 113 as a position adjuster and the area around the exit roller pair 113, according to Modification 2 of the above embodiments of the present disclosure.

As illustrated in FIG. 35, the sheet processing apparatus 100 according to Modification 2 includes a second displacement detector 48 as a second position detector that detects the displacement volume β (lateral registration) of the lamination sheet S nipped and conveyed by the exit roller pair 113 as a position adjuster.

Specifically, the second displacement detector 48 as a second position detector includes, for example, an optical sensor 48a, an optical sensor motor 48b, a feed screw 48c, a guide rod, and a home position sensor 48d.

The optical sensor 48a is a reflection type photosensor disposed near (i.e., the left side in FIG. 35) the sheet separation unit 19. The optical sensor 48a is movable at one end (i.e., the lower end in FIG. 35) within a widthwise range corresponding to the widthwise size M of the lamination sheet S.

Specifically, the optical sensor 48a has an internal thread and a through hole and is held to be movable in the width direction. The feed screw 48c extending in the width direction screws together with the internal thread. The guide rod disposed parallel to the feed screw 48c is inserted through the through hole. When the optical sensor motor 48b that is a forward and reverse rotation type is driven, the feed screw 48c is rotated in the forward and reverse directions. By so doing, the optical sensor 48a can be moved within a range indicated by a bidirectional arrow in FIG. 35.

Then, before the sheet inserting operation, based on the displacement volume β of the lamination sheet S detected by the second displacement detector 48 after the sheet separating operation, the exit roller pair 113 adjusts the displacement volume β of the exit roller pair 113 to be zero. In other words, after the sheet separating operation and before the sheet inserting operation, the lateral center position of the lamination sheet S is matched with the center reference Z again.

According to this configuration, even if the lamination sheet S is displaced after the sheet separating operation, the displacement can be adjusted again. As a result, it is less likely to cause such a failure in which the sheet inserting operation is performed while the inner sheet P is relatively displaced in the width direction with respect to the lamination sheet S (for example, the inner sheet P is out from the lamination sheet S).

Figure 36:
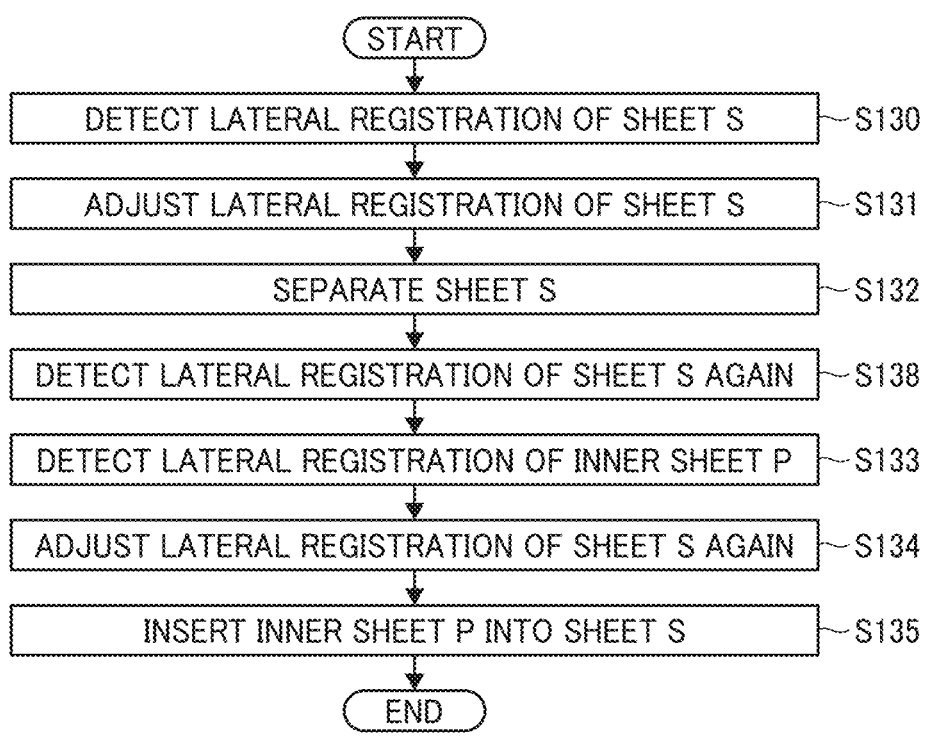
FIG. 36 is a flowchart of the control process executed in the sheet processing apparatus of FIG. 35 to adjust the relation of lateral positions of the lamination sheet and the inner sheet.

A description is now given of the control in adjustment of the relation of lateral positions of the lamination sheet S and the inner sheet P in Modification 2, with reference to FIG. 36.

FIG. 36 is a flowchart of the control process executed in the sheet processing apparatus of FIG. 35 to adjust the relation of lateral positions of the lamination sheet S and the inner sheet P.

When the entrance roller pair 108 nips and conveys the lamination sheet S, the displacement detector 47 (see FIG. 31A) detects the displacement volume α (i.e., the lateral registration) of the lamination sheet S (step S130).

Then, after the exit roller pair 113 nips the lamination sheet S, the movement mechanism 46A moves the exit roller pair 113 in the width direction to adjust the lateral registration α of the lamination sheet S (step S131). Subsequently, the lateral registration α of the lamination sheet S is adjusted, and then the sheet separation unit 19 performs the sheet separating operation on the lamination sheet S (step S132).

Then, with the exit roller pair 113 nipping and conveying the lamination sheet S, the displacement volume β (i.e., the lateral registration) of the lamination sheet S is detected, and the movement mechanism 46A moves the exit roller pair 113 in the width direction to adjust the displacement volume β (i.e., the lateral registration) of the lamination sheet S (step S138).

When the entrance roller pair 108 nips and conveys the inner sheet P, the displacement detector 47 detects the displacement volume α' (i.e., the lateral registration) of the inner sheet P (step S133). Subsequently, before the inner sheet P reaches the sheet separation unit 19, the lateral registration of the lamination sheet S nipped by the exit roller pair 113 is adjusted again to be aligned with the lateral registration α' of the inner sheet P (step S134).

Then, with the lateral center position of the lamination sheet S matched with the lateral center position of the inner sheet P, the inner sheet P is inserted into the lamination sheet S in the sheet inserting operation (step S135). Then, the flow of the control of adjustment of the relation of lateral positions of the lamination sheet S and the inner sheet P ends.

Due to such a configuration, the two sheets (sheets S1 and S2) of the lamination sheet S can be preferably separated from each other and the inner sheet P can be inserted into the lamination sheet S without causing the lateral displacement of the inner sheet P.

In Modification 2, the detection of the lateral registration before the sheet separating operation in step S130 may be performed not by the displacement detector 47 that is a first displacement detector (see FIG. 31A) but by the second displacement detector 48.

Modification 3

A description is now given of the control in adjustment of the relation of lateral positions of the lamination sheet S and the inner sheet P in Modification 3, with reference to FIGS. 37A, 37B, 37C, 37D, and 37E.

FIGS. 37A, 37B, 37C, 37D, and 37E are top views, each illustrating the displacement detector 47 as a first displacement detector and the area around the displacement detector 47, according to Modification 3 of an embodiment of the present disclosure.

The displacement detector according to Modification 3 illustrated in FIGS. 37A, 37B, 37C, 37D, and 37E may be a substitute for the displacement detector 47 illustrated in FIG. 31A or FIG. 33 or the second displacement detector 48 illustrated in FIG. 35.

Figure 37A:
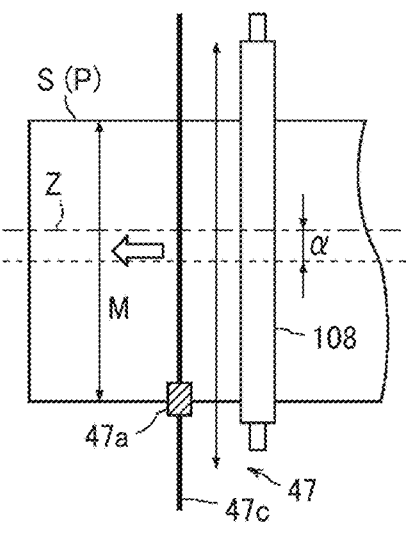
FIGS. 37A, 37B, 37C, 37D, and 37E are top views, each illustrating the displacement detector and the area around the displacement detector, according to Modification 3 of an embodiment of the present disclosure.

The optical sensor 47a of the displacement detector 47 (as a first displacement detector) illustrated in FIG. 37A is movable in the entire area in the direction indicated by a bidirectional arrow in FIG. 37A, within a widthwise range corresponding to the widthwise size M of the lamination sheet S or the inner sheet P.

In such a configuration, the widthwise size M of the lamination sheet S or the inner sheet P can be detected by the optical sensor 47a. For this reason, even if the widthwise size M of the lamination sheet S or the inner sheet P is not identified, displacement of the lamination sheet S or the inner sheet P can be detected.

Figure 37B:
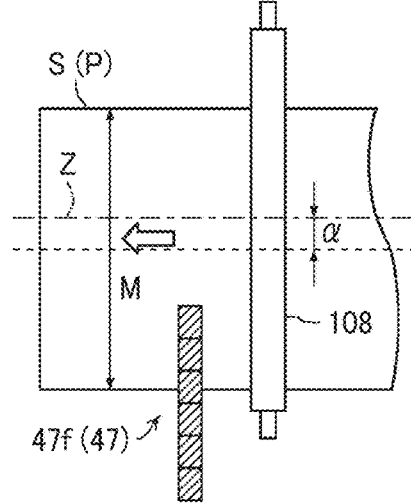

In contrast, the optical sensor of the displacement detector 47 (as a first displacement detector) illustrated in FIG. 37B is a contact image sensor (CIS) 47f that is fixed to the one end (i.e., the lower end in FIG. 37B) with respect to the widthwise range corresponding to the widthwise size M of the lamination sheet S or the inner sheet P.

The CIS 47f includes multiple optical sensors arranged side by side in the width direction. The CIS 47f detects the position of the edge portion at the one end of the lamination sheet S or the inner sheet P based on the position of the optical sensor whose signal changes among the multiple optical sensors. This configuration does not require a mechanism for moving the optical sensor.

Figure 37C:
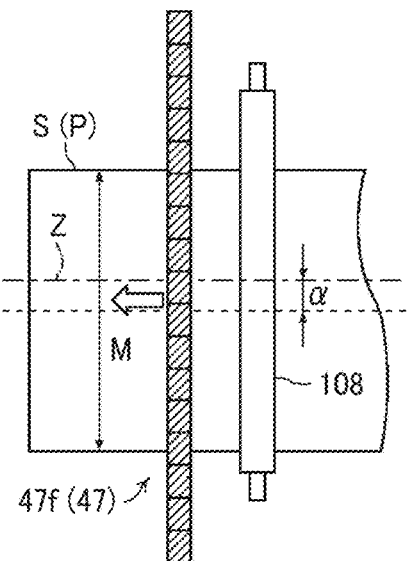

The optical sensor of the displacement detector 47 (as a first displacement detector) illustrated in FIG. 37C is the CIS 47f that is fixed to the entire area with respect to the widthwise range corresponding to the widthwise size M of the lamination sheet S or the inner sheet P. This configuration does not require a mechanism for moving the optical sensor and, even if the widthwise size M of the lamination sheet S or the inner sheet P is not identified, displacement of the lamination sheet S or the inner sheet P can be detected.

Figure 37D:
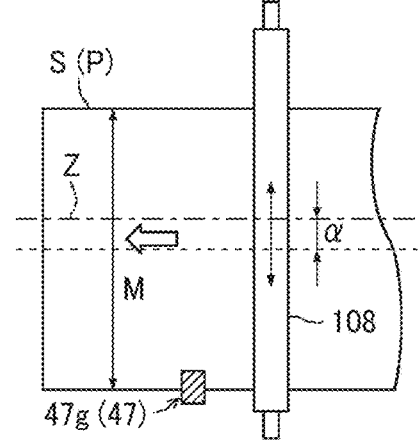

In contrast, an optical sensor 47g of the displacement detector 47 (as a first displacement detector) illustrated in FIG. 37D is fixed to the one end (i.e., the lower end in FIG. 37D) with respect to the widthwise range corresponding to the widthwise size M of the lamination sheet S or the inner sheet P.

In this configuration, the entrance roller pair 108 is movable in the width direction to obtain the displacement volume α of the lamination sheet S or the inner sheet P based on the position at which the optical sensor 47g detects the edge portion at the one end of the lamination sheet S or the inner sheet P nipped and conveyed by the entrance roller pair 108 (in other words, the amount of movement of the entrance roller pair 108) and the widthwise size M of the lamination sheet S or the inner sheet P.

Figure 37E:
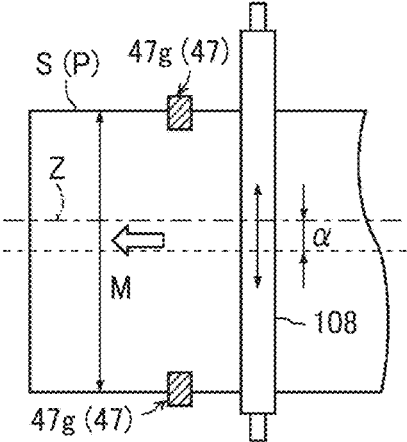

The optical sensors 47g of the displacement detector 47 (as a first displacement detector) illustrated in FIG. 37E are fixed to both ends (i.e., the lower and upper ends in FIG. 37E) with respect to the widthwise range corresponding to the widthwise size M of the lamination sheet S or the inner sheet P.

In this configuration, the entrance roller pair 108 is movable in the width direction to obtain the displacement volume α of the lamination sheet S or the inner sheet P based on the position at which the optical sensor 47g detects the edge portion at both ends of the lamination sheet S or the inner sheet P nipped and conveyed by the entrance roller pair 108 (in other words, the amount of movement of the entrance roller pair 108) and the widthwise size M of the lamination sheet S or the inner sheet P.

As a result, in the configuration including any one of the displacement detectors illustrated in FIGS. 37A, 37B, 37C, 37D, and 37E, the two sheets, which are the first sheet S1 and the second sheet S2, of the lamination sheet S can be preferably separated, and the inner sheet P can be inserted into the lamination sheet S without causing the lateral displacement of the inner sheet P.

Modification 4

A description is now given of a control panel of the sheet processing apparatus 100 according to Modification 4, with reference to FIG. 38.

FIG. 38 is a diagram illustrating a display screen of the control panel 10, according to Modification 4 of the above embodiments of the present disclosure.

In the sheet processing apparatus 100 according to Modification 4, the position adjuster can change the adjustment volume of the lateral position to any value within a range in which the inner sheet P (inner paper material) does not protrude in the width direction with respect to the lamination sheet S (film) after the sheet inserting operation.

Specifically, referring to FIG. 38, a user or a service person operates the control panel 10 (see FIG. 1) to finely adjust the amount of movement of the exit roller pair 113 as a position adjuster step by step. With such a configuration, even if an adjustment error occurs in the exit roller pair 113 as a position adjuster, the user or the service person can correct the adjustment error.

Further, FIGS. 39A and 39B are diagrams, each illustrating another display screen of the control panel 10.

As illustrated in FIGS. 39A and 39B, a user or a service person can operate the control panel 10 to input the size of the lamination sheet S (film) or the inner sheet P (inner paper material) or finely adjust the size in the width direction (i.e., the main scanning direction) or the size in the sheet conveyance direction (i.e., the sub-scanning direction) step by step.

Due to such a configuration, the two sheets (sheets S1 and S2) of the lamination sheet S can be further preferably separated from each other and the inner sheet P can be further preferably inserted into the lamination sheet S without causing the lateral displacement of the inner sheet P.

A description is now given of the flow of control process of the lateral registration adjustment when the lamination sheet S is separated and the inner sheet P is inserted into the lamination sheet S, with reference to a flowchart of FIG. 40.

Figure 40A:
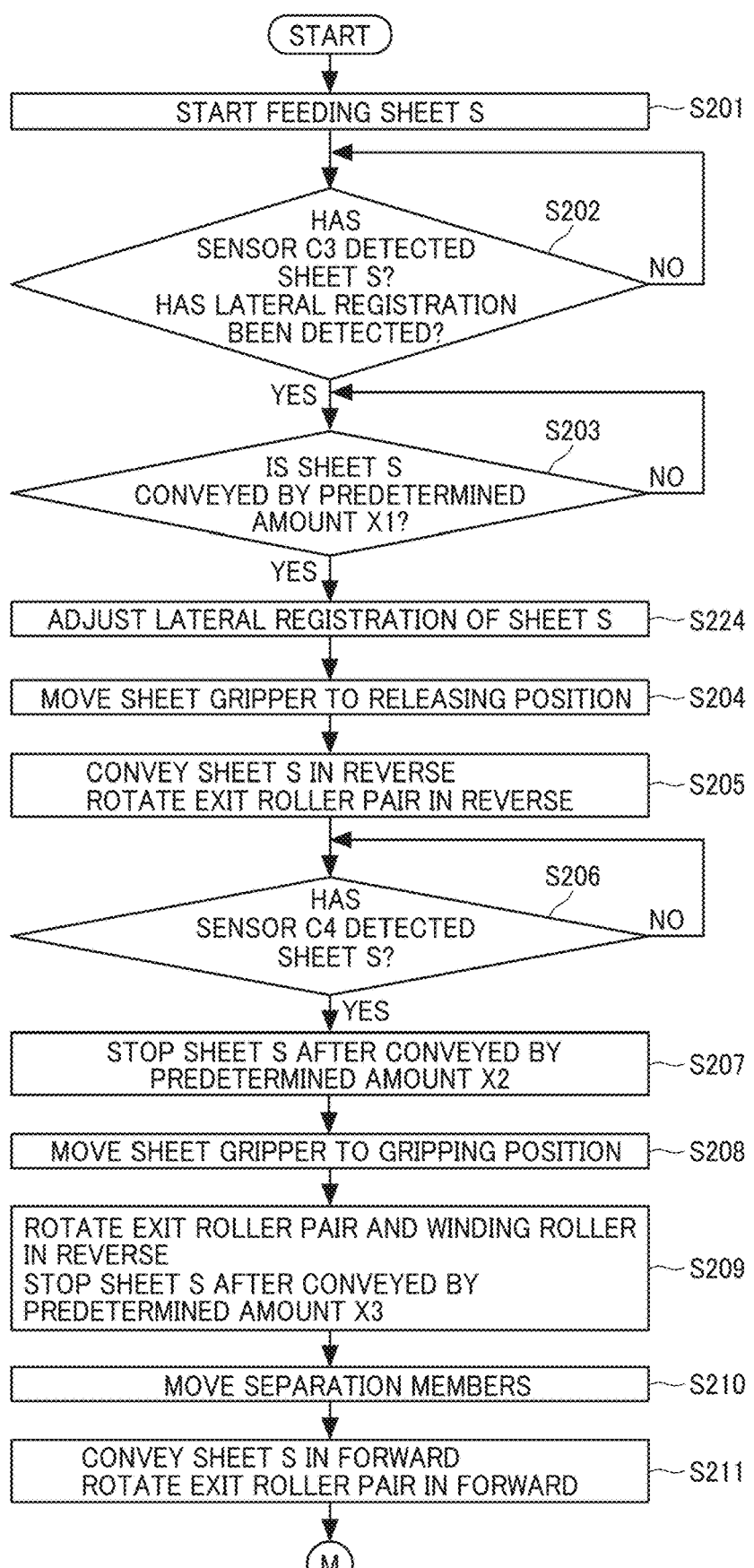

FIG. 40 including FIGS. 40A and 40B is a flowchart of the control process to adjust a lateral registration of the sheet when separating the lamination sheet S and inserting the inner sheet P.

The controller 127 starts feeding the lamination sheet S from the sheet tray 102 (step S201 of the flowchart in FIG. 40A). Then, the displacement detector 47 detects the lateral registration (i.e., the displacement volume in the width direction or the lateral displacement amount) of the lamination sheet S nipped and conveyed by the entrance roller pair 108 (step S202 of the flowchart in FIG. 40A).

Then, the controller 127 causes the exit roller pair 113 to convey the lamination sheet S until the lamination sheet S passes the position of the winding roller 109, and then stops the conveyance of the lamination sheet S. The controller 127 determines whether the conveyance sensor C3 detects the bonding portion of the lamination sheet S (i.e., the leading end of the lamination sheet S conveyed in the forward direction, in other words, the other end of the lamination sheet S) (step S202 of the flowchart in FIG. 40A).

When the conveyance sensor C3 has not detected the bonding portion A of the lamination sheet S (NO in step S202 of the flowchart in FIG. 40A), step S202 is repeated until the conveyance sensor C3 detects the bonding portion A of the lamination sheet S. In contrast, when the conveyance sensor C3 has detected the bonding portion A of the lamination sheet S (YES in step S202 of FIG. 40A), in response to the timing of detection of the bonding portion A of the lamination sheet S PJ by the conveyance sensor C3, the controller 127 causes the exit roller pair 113 to convey the lamination sheet S in the forward direction by a predetermined amount X1 (step S203 of the flowchart in FIG. 40A). When the lamination sheet S is not conveyed by the predetermined amount X1 (NO in step S203 of FIG. 40A), step S203 is repeated until the lamination sheet S is conveyed by the predetermined amount X1. In contrast, when the lamination sheet S is conveyed by the predetermined amount X1 (YES in step S203 of FIG. 40A), the process proceeds to step S204.

At this time, the exit roller pair 113 (functioning as a displacement adjuster) moves in the width direction while the exit roller pair 113 is nipping the lamination sheet S, so that the lateral registration (i.e., the lateral displacement volume) of the lamination sheet S detected by the displacement detector 47 becomes zero (step S224 of the flowchart in FIG. 40A). The timing to adjust the lateral registration of the lamination sheet S by the exit roller pair 113 (as a displacement adjuster) is not limited to the above-described timing.

When the exit roller pair 113 temporarily stops the conveyance of the lamination sheet S, the sheet gripper 110 moves from the gripping position to the releasing position in step S204 of the flowchart in FIG. 40A).

Then, the controller 127 causes the exit roller pair 113 to rotate in reverse to start conveyance of the lamination sheet S in the reverse direction (step S205 of the flowchart in FIG. 40A).

Subsequently, as illustrated in FIG. 4, the controller 127 determines whether the conveyance sensor C4 has detected the lamination sheet S (step S206 of the flowchart in FIG. 40A). When the conveyance sensor C4 has not detected the lamination sheet S (NO in step S206 of FIG. 40A), step S206 is repeated until the conveyance sensor C4 detects the lamination sheet S. When the conveyance sensor C4 has detected the lamination sheet S (YES in step S206 of FIG. 40A), in response to the detection of the lamination sheet S by the conveyance sensor C4, the controller 127 causes the exit roller pair 113 to convey the lamination sheet S by a predetermined amount X2 until the gripped portion B of the lamination sheet S reaches the predetermined rotational position of the winding roller 109. Then, the controller 127 causes the exit roller pair 113 to stop the conveyance of the lamination sheet S (step S207 of the flowchart in FIG. 40A).

Then, the controller 127 causes the sheet gripper 110 at the predetermined rotational position of the winding roller 109 to move from the releasing position to the gripping position (step S208 of the flowchart in FIG. 40A).

Then, the controller 127 causes the exit roller pair 113 to continue to rotate in the reverse direction and the winding roller 109 to start winding the lamination sheet S. At the timing at which the exit roller pair 113 has conveyed the lamination sheet S by a conveyance amount that is equal to a predetermined amount X3 since the start of winding of the lamination sheet S by the winding roller 109, the controller 127 causes the exit roller pair 113 to stop the conveyance of the lamination sheet S and the winding roller 20 to stop winding the lamination sheet S (step S209 of the flowchart in FIG. 40A).

Then, the controller 127 causes the separation members 116 to move to be inserted into the gap C that is sufficiently widened in the lamination sheet S (step S210 of FIG. 40A).

Then, with the separation members 116 inserted in the gap C of the lamination sheet S, the controller 127 causes the exit roller pair 113 to start rotating in the forward direction and the winding roller 109 to start rotating in the forward direction (clockwise direction) (step S211 of the flowchart in FIG. 40A).

Then, the controller 127 causes the exit roller pair 113 and the winding roller 109 to stop rotating in the forward direction after the exit roller pair 113 has conveyed the lamination sheet S in the forward direction by a predetermined amount X4 (step S212 of the flowchart in FIG. 40B).

Then, the controller 127 causes the sheet gripper 110 to move from the gripping position to the releasing position in the above-described state so that the sheet gripper 110 is on the conveyance passage (step S213 of the flowchart in FIG. 40B).

After step S213, the controller 127 causes the exit roller pair 113 to rotates in the forward direction again to start conveyance of the lamination sheet S in the forward direction (step S214 of the flowchart in FIG. 40B).

Then, the controller 127 determines whether the exit roller pair 113 conveys the lamination sheet S by a predetermined amount X5 in response to the timing at which the conveyance sensor C4 detects the trailing end of the lamination sheet S conveyed in the forward direction, in other words, after the conveyance sensor C4 has detected the gripped portion of the exit roller pair 113 (step S215 of the flowchart in FIG. 40B). When the exit roller pair 113 does not convey the lamination sheet S by the predetermined amount X5 after the conveyance sensor C4 has detected the gripped portion of the lamination sheet S (NO in step S215 of FIG. 40B), step S215 is repeated until the exit roller pair 113 conveys the lamination sheet S by the predetermined amount X5 after the conveyance sensor C4 has detected the gripped portion of the lamination sheet S. By contrast, when the exit roller pair 113 conveys the lamination sheet S by the predetermined amount X5 after the conveyance sensor C4 has detected the gripped portion of the lamination sheet S (YES in step S215 of FIG. 40B), as illustrated in FIG. 8, the controller 127 causes the exit roller pair 113 to stop conveying the lamination sheet S and causes the separation claws 6 to rotate in the reverse direction to start conveyance of the lamination sheet S in the reverse direction (step S216 of the flowchart in FIG. 40B.

Subsequently, the controller 127 determines whether the conveyance sensor C5 (see FIG. 1) has detected the trailing end of the lamination sheet S conveyed in the reverse direction, in other words, the bonding portion of the lamination sheet S (step S217 of the flowchart in FIG. 40B). When the conveyance sensor C5 has not detected the trailing end of the lamination sheet S (NO in step S217 of FIG. 40B), step S217 is repeated until the conveyance sensor C5 detects the trailing end of the lamination sheet S. By contrast, the conveyance sensor C5 (see FIG. 1) has detected the trailing end of the lamination sheet S (YES in step S217 of FIG. 40B), the controller 127 causes the exit roller pair 113 to convey the lamination sheet S by a predetermined amount X6 and stop the conveyance of the lamination sheet S in response to the timing at which the conveyance sensor C5 detects the trailing end of the lamination sheet S (step S218 of the flowchart in FIG. 40B).

Then, the controller 127 starts to convey the inner sheet P from the sheet tray 103 (see FIG. 1) (step S219 of the flowchart in FIG. 40B).

Further, the controller 127 determines whether the conveyance sensor C3 has detected the leading end (the bonding portion) of the lamination sheet S and whether the displacement detector 47 has detected the lateral registration (i.e., the lateral displacement volume) of the inner sheet P while the entrance roller pair 108 is nipping and conveying the inner sheet P (step S220 of the flowchart in FIG. 40B). When the conveyance sensor C3 has not detected the leading end of the lamination sheet S, the displacement detector 47 has not detected the lateral registration (i.e., the lateral displacement volume) of the inner sheet P, or both (NO in step S220 in FIG. 40B), step S220 is repeated until the conveyance sensor C3 detects the leading end of the lamination sheet S, the displacement detector 47 detects the lateral registration (i.e., the lateral displacement volume) of the inner sheet P. In contrast, when the conveyance sensor C3 has detected the leading end of the lamination sheet S and the displacement detector 47 has detected the lateral registration (i.e., the lateral displacement volume) of the inner sheet P (YES in step S220 in FIG. 40B), the process proceeds to step S225. In step S225 in FIG. 40B, the exit roller pair 113 as a position adjuster moves in the width direction while nipping the lamination sheet S so as to generate the lateral registration (i.e., the lateral displacement volume) of the lamination sheet S that is equal to the lateral registration (i.e., the lateral displacement volume) of the inner sheet P detected by the displacement detector 47.

Subsequently, as illustrated in FIG. 11, in response to the timing at which the conveyance sensor C3 detects the leading end of the inner sheet P in the forward direction, the controller 127 causes the entrance roller pair 108 to convey the inner sheet P by a predetermined amount X7, and then the exit roller pair 113 starts the conveyance of the lamination sheet S in the forward direction again (step S221 of FIG. 40B).

Referring to FIGS. 31A and 31B (and FIG. 1), the sheet processing apparatus 100 according to the present embodiment includes a displacement detector 47 as a position detector and the exit roller pair 113 as a position adjuster.

Then, the displacement detector 47 (as a displacement detector) and the exit roller pair 113 (as a displacement adjuster) are used to set a target value that is the lateral registration (the displacement volume) of an inner sheet P with respect to a lamination sheet S.

A description is now given of a guide with reference to FIGS. 41, 42, 43 and 44.

Figure 41:
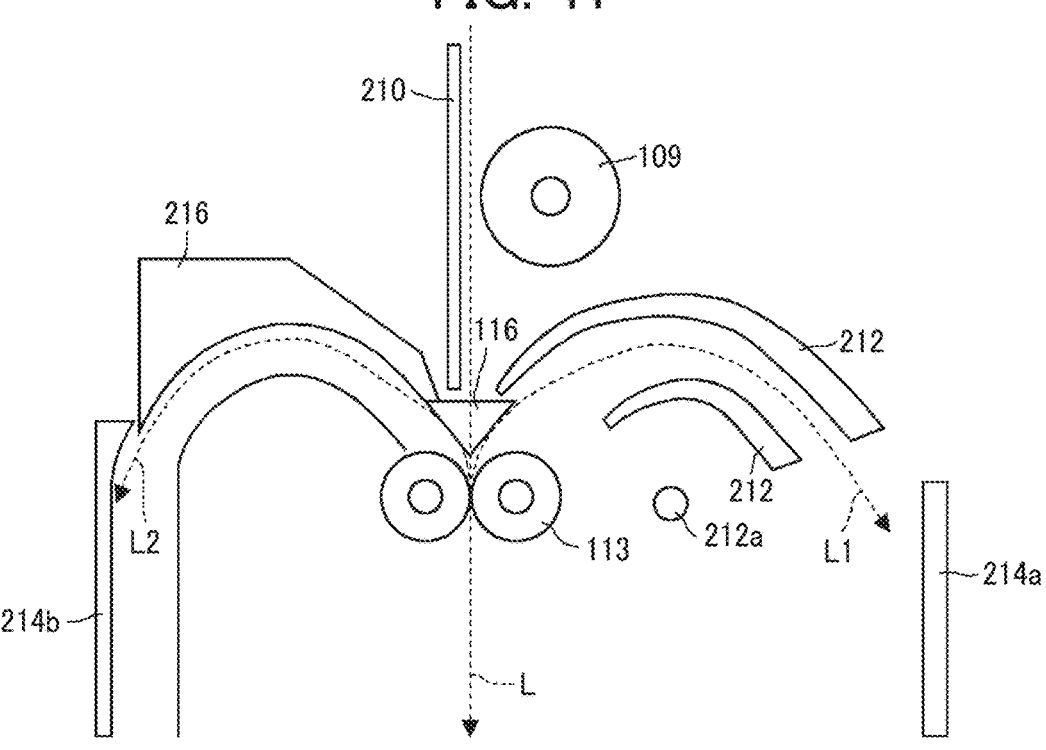
FIG. 41 is a diagram illustrating a configuration of a guide disposed around a winding roller and an exit roller pair.

FIG. 41 is a diagram illustrating a configuration of a guide disposed around a winding roller and an exit roller pair.

Figure 42:
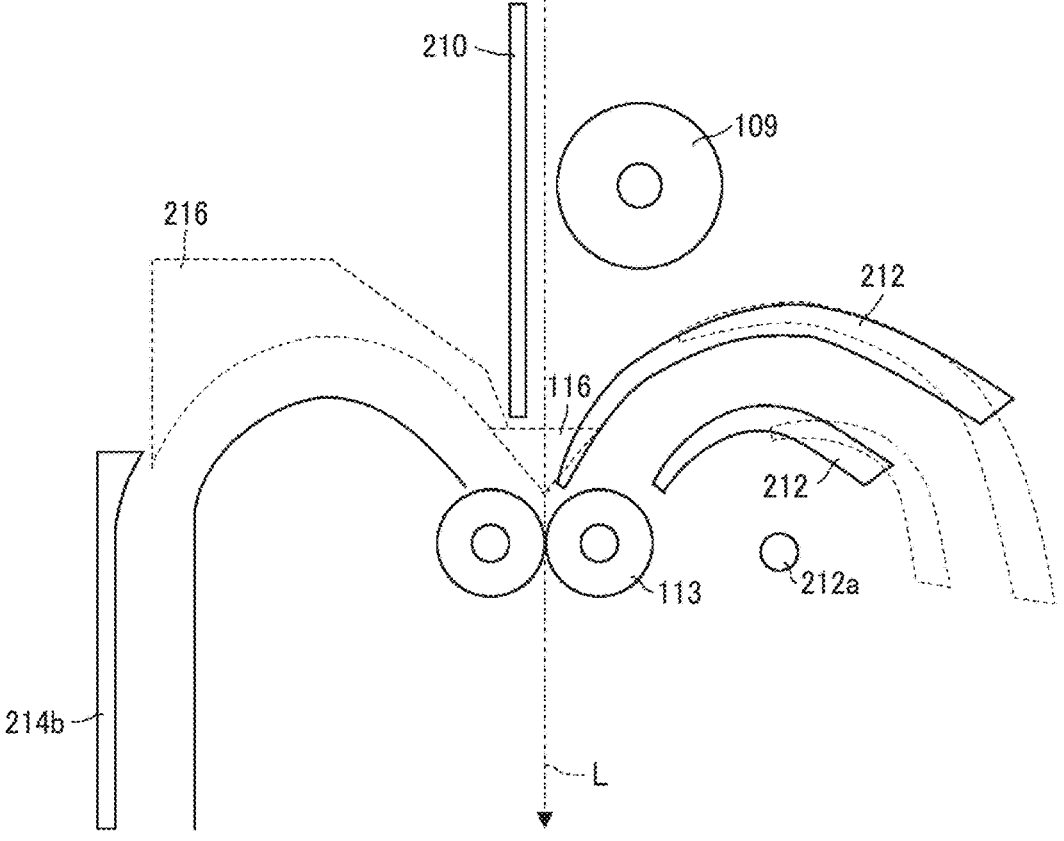
FIG. 42 is a diagram illustrating a configuration of the guide disposed around the winding roller and the exit roller pair, subsequent to the operation illustrated in FIG. 41.

FIG. 42 is a diagram illustrating a configuration of the guide disposed around the winding roller and the exit roller pair, subsequent to the operation illustrated in FIG. 41.

Figure 43:
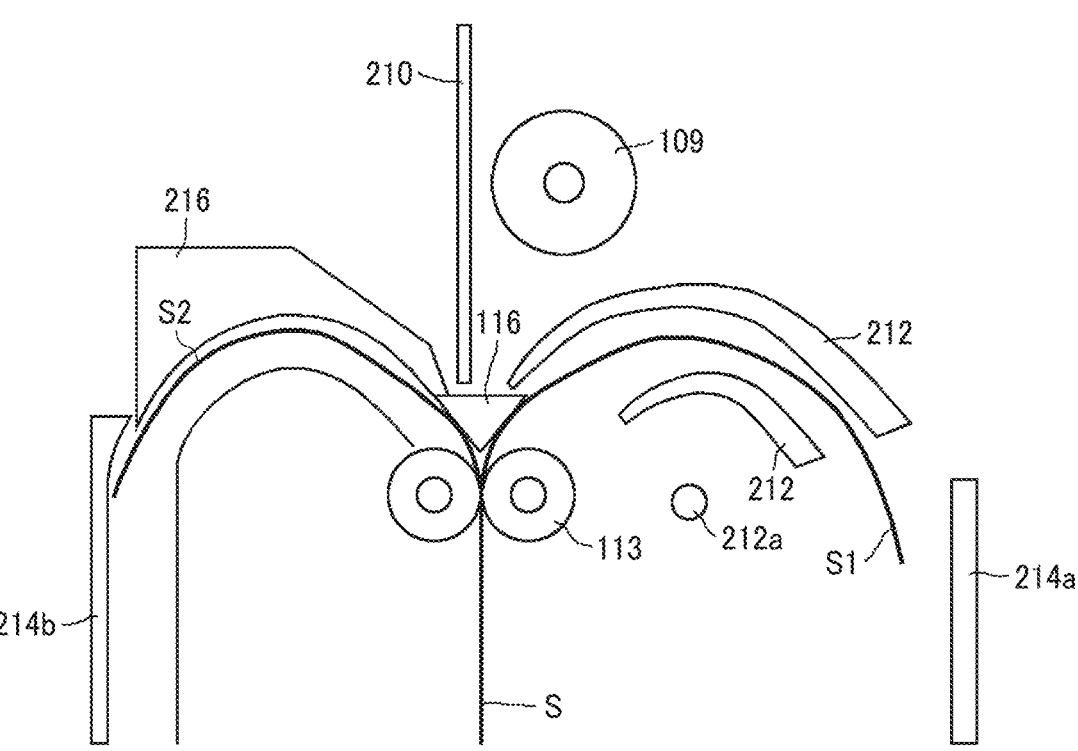
FIG. 43 is a diagram illustrating a configuration of the guide disposed around the winding roller and the exit roller pair, subsequent to the operation illustrated in FIG. 42.

FIG. 43 is a diagram illustrating a configuration of the guide disposed around the winding roller and the exit roller pair, subsequent to the operation illustrated in FIG. 42.

Figure 44:
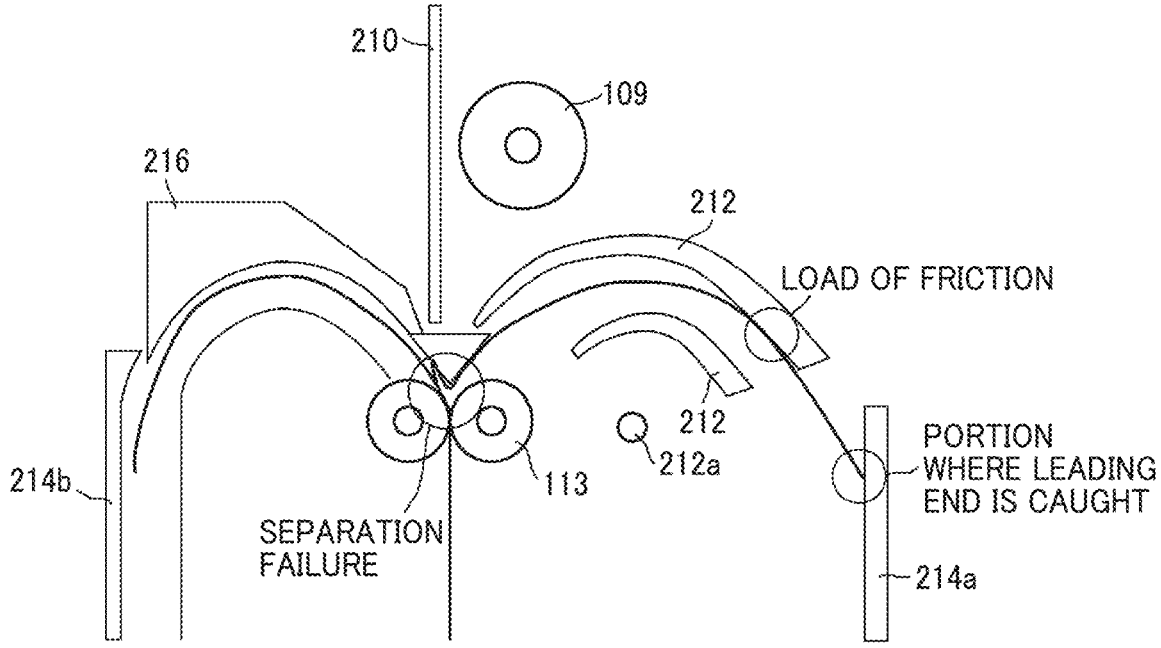
FIG. 44 is a diagram illustrating a configuration of the guide disposed around the winding roller and the exit roller pair, subsequent to the operation illustrated in FIG. 43.

FIG. 44 is a diagram illustrating a configuration of the guide disposed around the winding roller and the exit roller pair, subsequent to the operation illustrated in FIG. 43.

As illustrated in FIGS. 41 to 44, the sheet laminator 200 further includes a guide plate 210, a rotation guide plate 212, a right guide plate 214a, and a left guide plate 214b. The guide plate 210 guides a lamination sheet S (or an inner sheet P) from the winding roller 109 to the exit roller pair 113. The rotation guide plate 212 guides the lamination sheet S having the two sheets separated from each other.

Since a space between the winding roller 109 and the exit roller pair 113 is also a space in which a slack of a lamination sheet S is formed, the rotation guide plate 212 is rotatably movable about a rotary shaft 212a. The rotation guide plate 212 defines a right-branched conveyance passage L1 to guide one of the separated lamination sheet S (referred to as a "first sheet S1") toward the right guide plate 214a.

A branching member 216 is disposed on the opposite side of the rotation guide plate 212 across the sheet conveyance passage L to form a left-branched conveyance passage L2 to guide the other of the separated lamination sheet S toward the left guide plate 214b.

As illustrated in FIG. 42, in a state in which the separation members 116 (and the branching member 216) are retracted from the sheet conveyance passage L, the rotation guide plate 212 can move to a position (sheet guiding position) at which the lamination sheet S is guided to the exit roller pair 113. As a result, the lamination sheet S (or the inner sheet P) to be conveyed from the upstream side of the exit roller pair 113 in the forward conveyance direction can be smoothly conveyed toward the nip region of the exit roller pair 113.

On the other hand, as illustrated in FIG. 43, when the separated two sheets of the lamination sheet S are guided to the right-branched conveyance passage L1 and the left-branched conveyance passage L2, the rotation guide plate 212 moves to a position (separated sheet guiding position) away from the exit roller pair 113, and guides the first sheet S1 that is one of the separated two sheets of the lamination sheet S to the right-branched conveyance passage L1.

At this time, as illustrated in FIG. 44, the first sheet S1 on the right-branched conveyance passage L1 is less elastic than a typical thin paper, and the adhesive surface of the first sheet S1 is likely to receive a frictional load from the rotation guide plate 212 or the leading end of the first sheet S1 is likely to be caught by, for example, the right guide plate 214a. If the stiffness of the first sheet S1 is broken due to the receipt of the frictional load or the catching of the leading end of the first sheet S1, a separation failure of the lamination sheet S is caused in the vicinity of the separation members 116, which may cause an inconvenience such as a separation failure, a paper jam, or an insertion failure of an inner sheet P.

To elimination this inconvenience, it is conceivable to avoid the buckling by additionally arranging a conveying roller and positively conveying the first sheet S1 on the right-branched conveyance passage L1. However, in the configuration in which the rotation guide plate 212 is avoided, no space is provided for arranging such a conveying roller. Further, in order to dispose the conveying roller that rotates with the rotation guide plate 212 as a single unit, there is an issue to deal with a complicated drive configuration in addition to an issue on a space.

Figure 45:
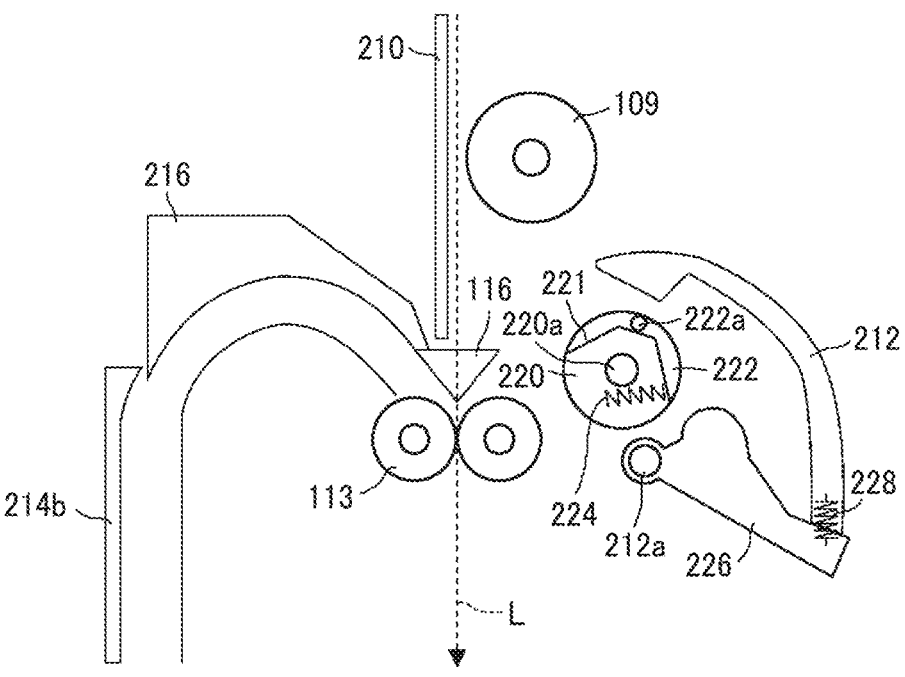
FIG. 45 is a diagram illustrating a configuration of a take-up roller added in FIGS. 41 to 44.

FIG. 45 is a diagram illustrating a configuration of a take-up roller added in FIGS. 41 to 44.

In order to handle such a situation, in the present embodiment, as illustrated in FIG. 45, a take-up roller 220 as a take-up member is disposed inside the rotation area of the rotation guide plate 212 (near the rotary shaft 212a). The take-up roller 220 is rotatable about a rotary shaft 220a.

The take-up roller 220 has chucks 222 that rotate about a chuck rotary shaft 222a, and the chucks 222 form a sheet gripper 221 between the chucks 222 and the take-up roller 220. The chuck 222 is biased urged in a direction to close the sheet gripper 221 by a pressure spring 224 disposed on the take-up roller 220. The chuck 222 is an example of a gripping mechanism.

A pressure lever 226 is rotatably disposed on the rotary shaft 212a of the rotation guide plate 212 and is coupled to one end of the rotation guide plate 212 by a connection spring 228. As a result, the pressure lever 226 also rotates in conjunction with the rotation of the rotation guide plate 212.

Figure 46:
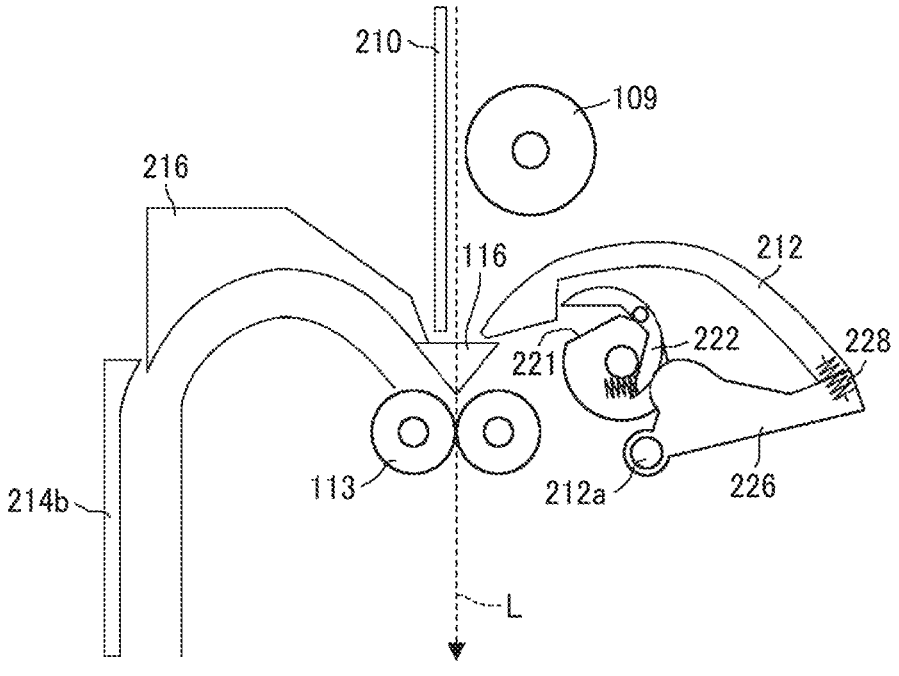
FIG. 46 is a diagram illustrating an operation of the added take-up roller.

FIG. 46 is a diagram illustrating an operation of the take-up roller 220.

As illustrated in FIG. 46, the pressure lever 226 abuts against the chuck 222 when rotating, and biases the sheet gripper 221 in the opening direction. As a result, when the rotation guide plate 212 is rotated and moved to the separated sheet guiding position, the chuck 222 is opened by being pushed by the pressure lever 226 rotated in conjunction with the rotation guide plate 212 (open state).

Figure 47:
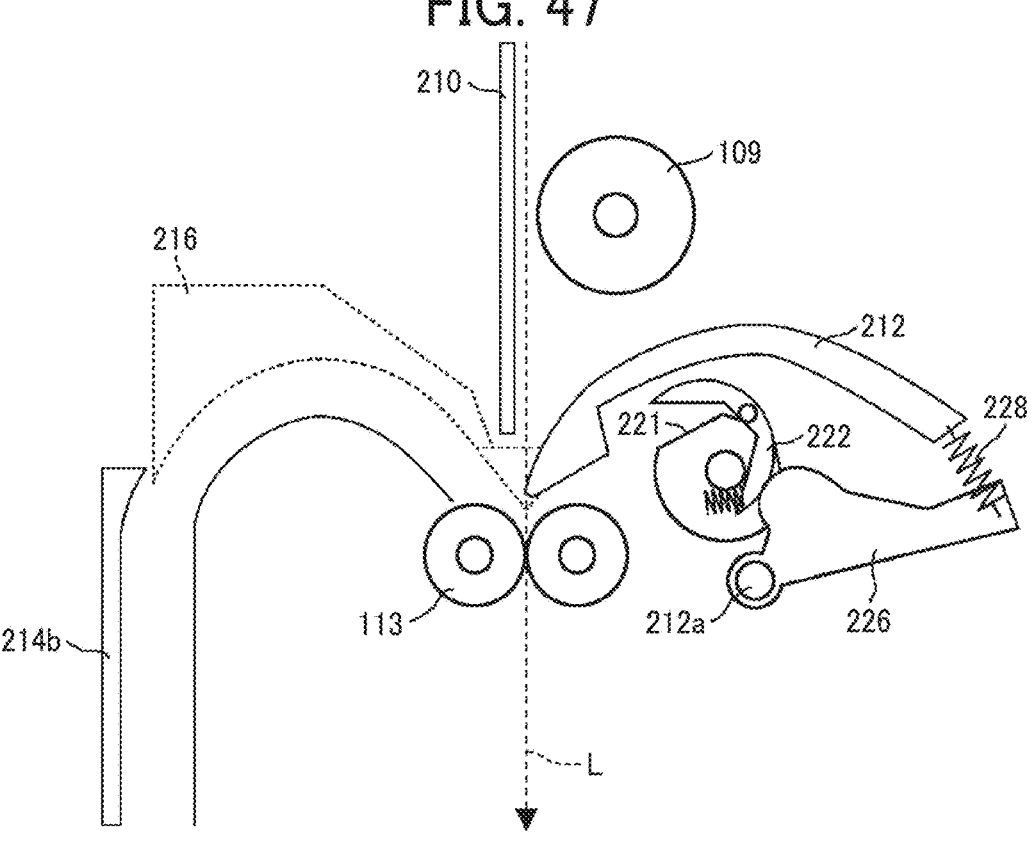
FIG. 47 is a diagram illustrating an operation of the take-up roller, subsequent to the operation illustrated in FIG. 46.

Further, FIG. 47 is a diagram illustrating an operation of the take-up roller 220, subsequent to the operation illustrated in FIG. 46.

As illustrated in FIG. 47, in a state in which the separation members 116 are retracted from the sheet conveyance passage L, the rotation guide plate 212 is moved to the sheet guiding position to the exit roller pair 113. At this time, the chuck 222 abuts against (the rotary shaft of) the take-up roller 220 and is stopped, so that the pressure lever 226 is also restrained. However, the connection spring 228 is extended so that the rotation guide plate 212 moves to the sheet guiding position. As a result, the lamination sheet S conveyed from the upstream side of the exit roller pair 113 in the forward conveyance direction can be smoothly guided to the nip region of the exit roller pair 113.

Figure 48:
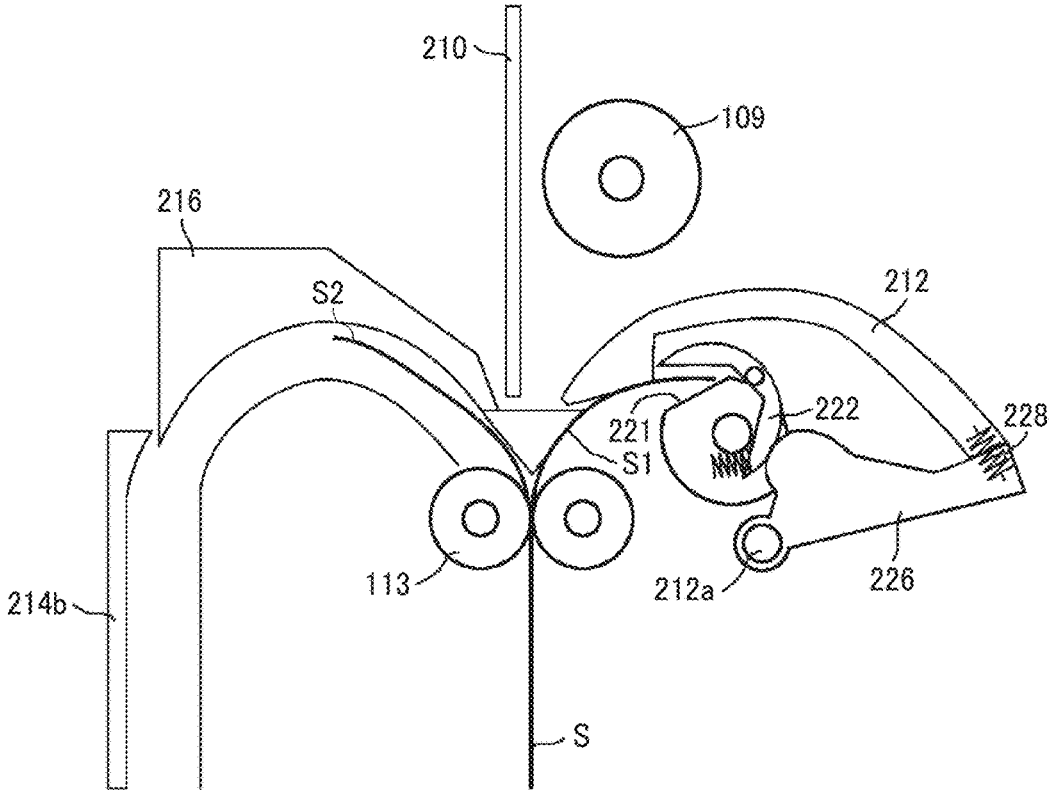
FIG. 48 is a diagram illustrating an operation of the take-up roller, subsequent to the operation illustrated in FIG. 47.

Subsequently, FIG. 48 is a diagram illustrating an operation of the take-up roller, subsequent to the operation illustrated in FIG. 47.

Figure 49:
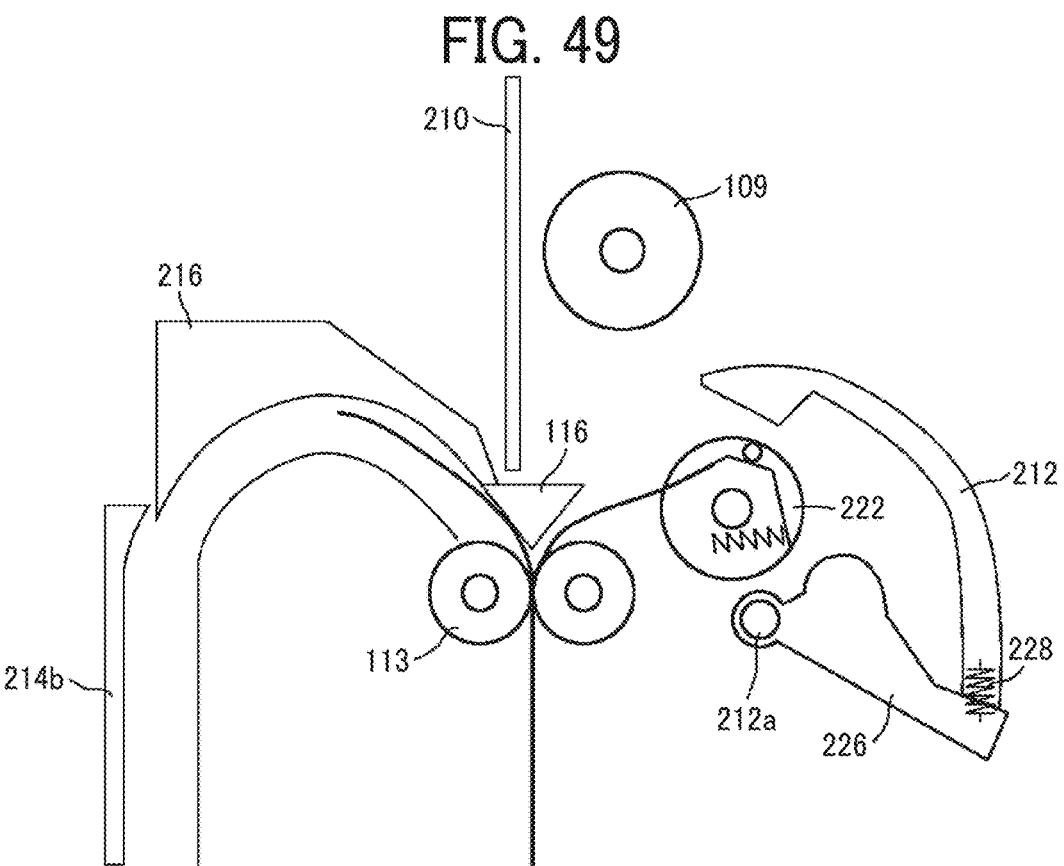
FIG. 49 is a diagram illustrating an operation of the take-up roller, subsequent to the operation illustrated in FIG. 48.

As illustrated in FIG. 48, the first sheet S1 conveyed to the right-branched conveyance passage L1 is conveyed to the sheet gripper 221 in a state where the chucks 222 are opened. Then, FIG. 49 is a diagram illustrating an operation of the take-up roller, subsequent to the operation illustrated in FIG. 48. As illustrated in FIG. 49, the pressure lever 226 is also separated from the chucks 222 by moving the rotation guide plate 212 to the retracted position. As a result, the chucks 222 are closed and grip the first sheet S1 (gripping state).

Figure 50:
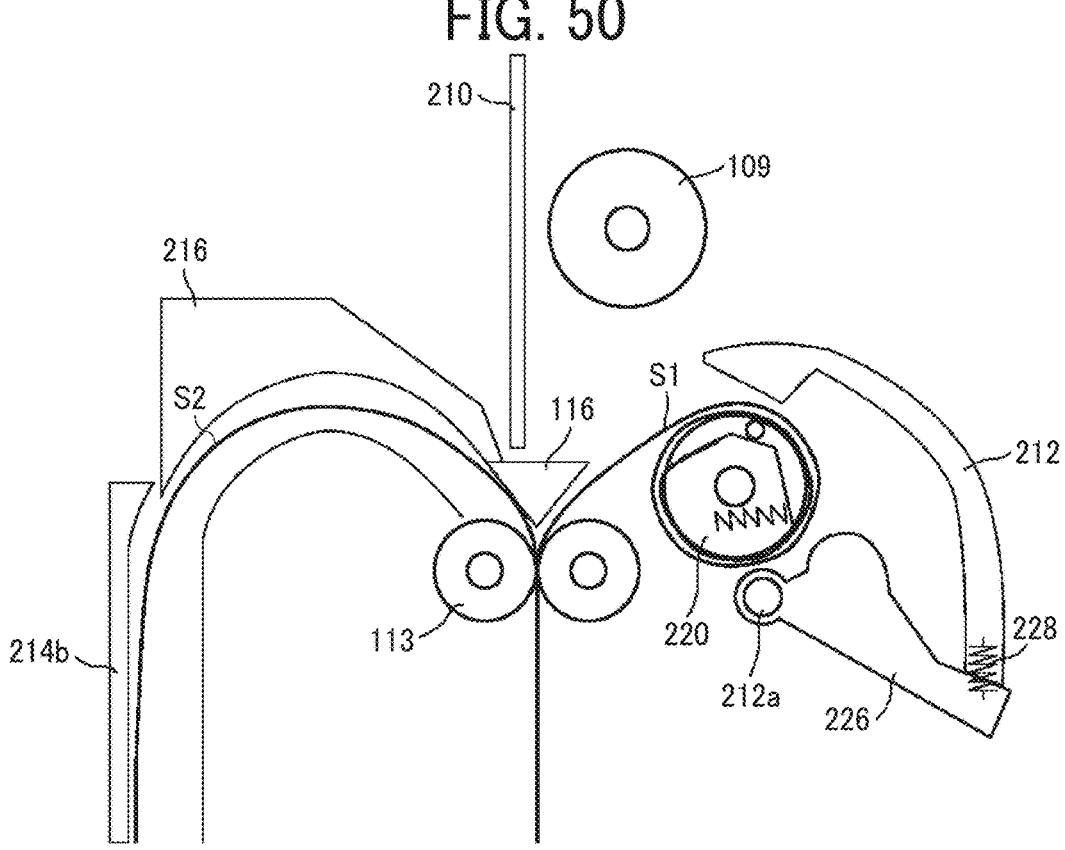
FIG. 50 is a diagram illustrating an operation of the take-up roller, subsequent to the operation illustrated in FIG. 50.

Then, as illustrated in FIG. 50, the take-up roller 220 is rotated in a clockwise direction to take up the sheet S1 that is conveyed upward from the exit roller pair 113.

At this time, it is desirable that the conveyance linear velocity (Vw) of the take-up roller 220 is equal to or greater than the conveyance linear velocity (Ve) of the exit roller pair 113 (Ve≤Vw). Due to such a configuration, the sheet S1 can be taken up without causing any slack (deflection), which can prevent occurrence of skew or paper jam.

According to the above-described configuration, the leading end of the first sheet S1 is caught by the rotation guide plate 212 or the right guide plate 214a beyond the rotation guide plate 212 on the right-branched conveyance passage L1, so as to prevent an inconvenience that can occur when the leading end of the first sheet S1 loses the rigidity, such as a failure of separation, a jam of lamination sheets S, or a failure of insertion of the inner sheet P.

Figure 51:
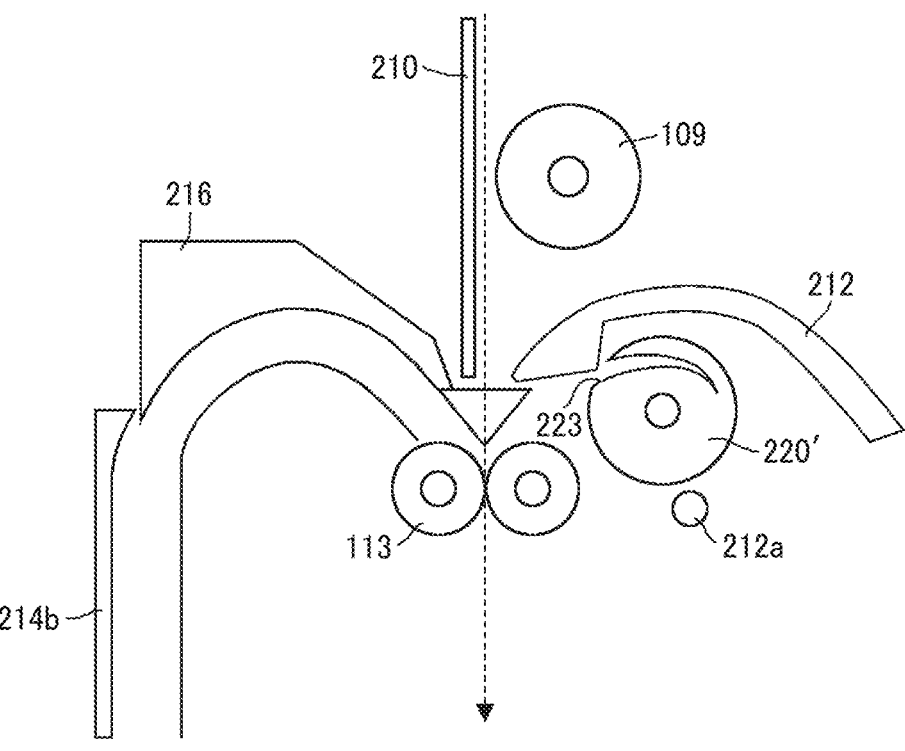
FIG. 51 is a diagram illustrating a configuration of the take-up roller according to a modification of the above-described embodiments.
Figure 52:
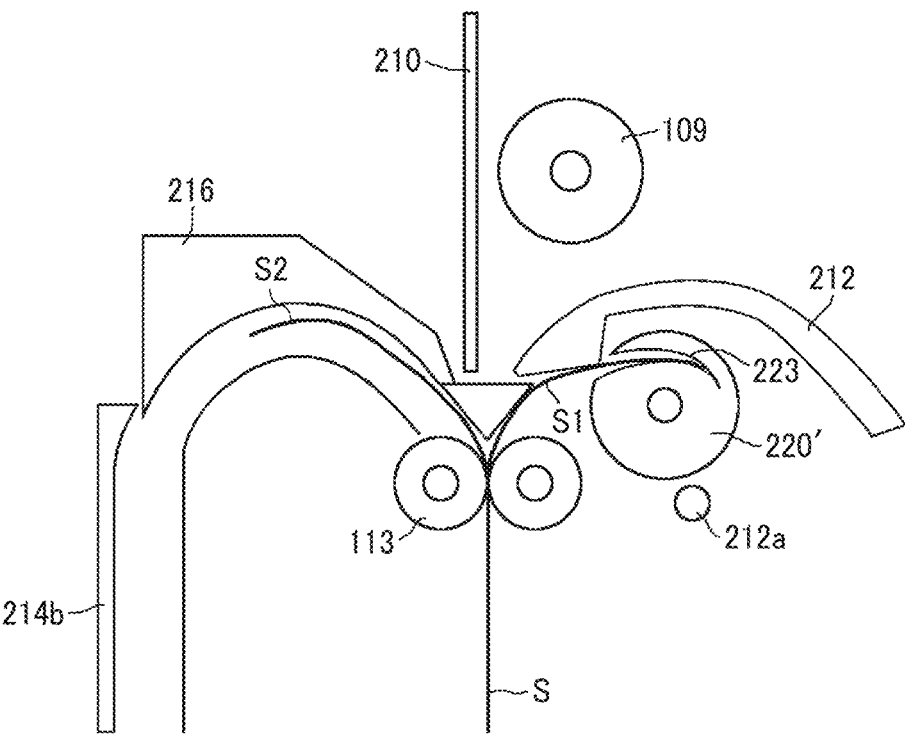
FIG. 52 is a diagram illustrating an operation of the take-up roller, subsequent to the operation illustrated in FIG. 51.
Figure 53:
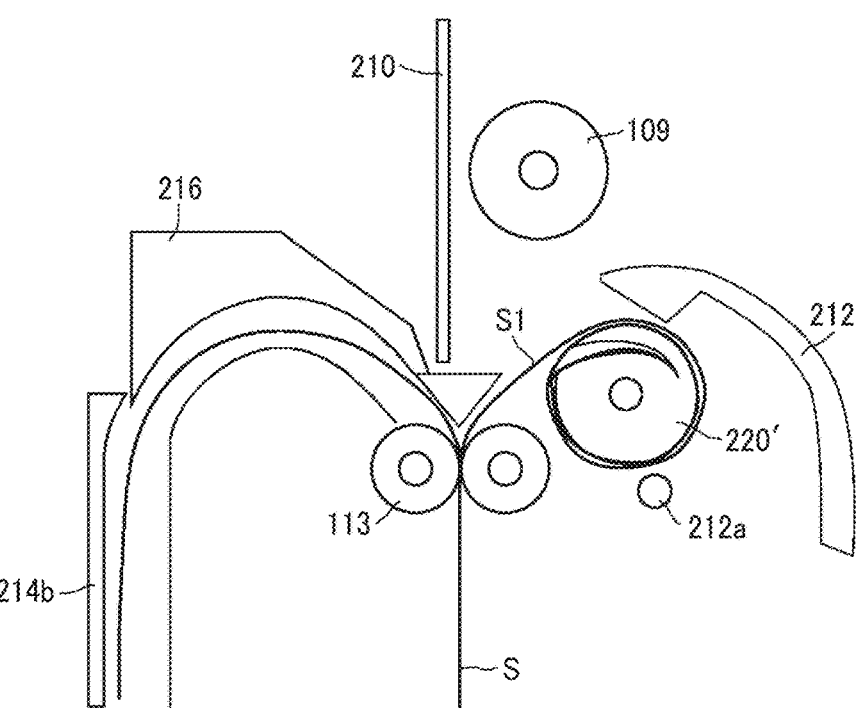
FIG. 53 is a diagram illustrating an operation of the take-up roller, subsequent to the operation illustrated in FIG. 52.

FIGS. 51, 52 and 53 illustrate a modification of a take-up roller.

Specifically, FIG. 51 is a diagram illustrating a configuration of the take-up roller according to a modification of the above-described embodiments.

FIG. 52 is a diagram illustrating an operation of the take-up roller, subsequent to the operation illustrated in FIG. 51.

FIG. 53 is a diagram illustrating an operation of the take-up roller, subsequent to the operation illustrated in FIG. 52.

As illustrated in FIG. 51, a take-up roller 220' has a notch-shaped holding portion 223 integrally formed in the take-up roller 220', instead of the chuck configuration (the chuck 222 in FIG. 45, for example). As illustrated in FIGS. 52 and 53, after the lamination sheet S conveyed to the right-branched conveyance passage L1 is conveyed to the notch-shaped holding portion 223, the rotation guide plate 212 is moved to the retracted position, and the take-up roller

220 and the exit roller pair 113 are simultaneously driven so as to perform a take-up operation to take up the lamination sheet S.

The notch-shaped holding portion 223 has a low sheet holding force at the start of a take-up with respect to the chuck configuration. However, when the first sheet S1 makes one round of the take-up roller 220', the lamination sheet S itself is pressed against the take-up roller 220'. Due to such a configuration, a further holding force is generated, and the same effect as the effect of the chucking configuration can be obtained. Accordingly, the configuration according to this modification can reduce the number of parts when compared with the chuck configuration, and can achieve the effect of cost reduction.

A description is given below of a configuration of a sheet laminator according to an embodiment of the present disclosure.

Figure 54A:
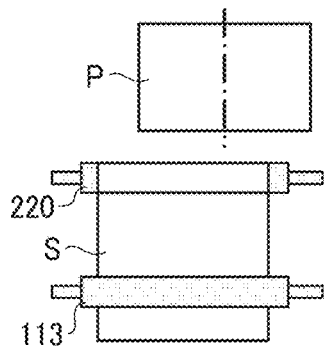
FIG. 54A is a schematic diagram illustrating the movement of the exit roller pair and the take-up roller in the lateral registration correction when inserting an inner sheet before the lateral registration correction is performed in a typical configuration.

FIG. 54A is a schematic diagram illustrating the movement of the exit roller pair and the take-up roller in the lateral registration correction when inserting an inner sheet before the lateral registration correction is performed in a typical configuration.

Figure 54B:
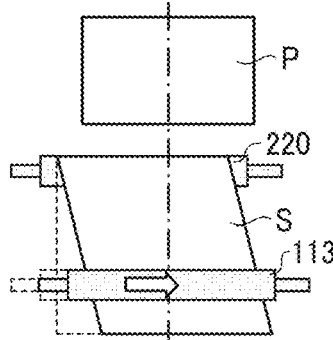
FIG. 54B is a schematic diagram illustrating the movement of the exit roller pair and the take-up roller in the lateral registration correction when inserting an inner sheet after the lateral registration correction is performed in the typical configuration.

FIG. 54B is a schematic diagram illustrating the movement of the exit roller pair and the take-up roller in the lateral registration correction when inserting an inner sheet after the lateral registration correction is performed in the typical configuration.

In the typical configuration, the take-up roller 220 does not move (is fixed) in the main scanning direction (the width direction). Due to such a configuration, only the exit roller pair 113 moves in accordance with the position of the inner sheet P. At this time, since the lamination sheet S is twisted between the exit roller pair 113 and the take-up roller 220, it is likely that the lamination sheet S is skewed with respect to the subsequent inner sheet P.

Figure 55A:
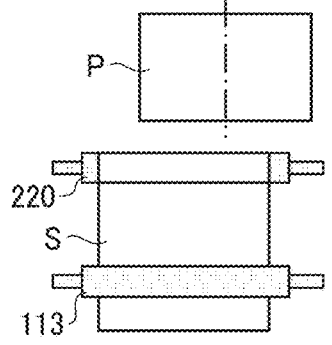
FIG. 55A is a schematic diagram illustrating the movement of the exit roller pair and the take-up roller in the lateral registration correction when inserting an inner sheet before the lateral registration correction according to the present embodiment.

FIG. 55A is a schematic diagram illustrating the movement of the exit roller pair and the take-up roller in the lateral registration correction when inserting an inner sheet before the lateral registration correction according to the present embodiment.

Figure 55B:
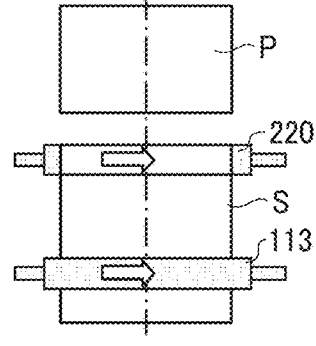
FIG. 55B is a schematic diagram illustrating the movement of the exit roller pair and the take-up roller in the lateral registration correction when inserting an inner sheet after the lateral registration correction according to the present embodiment.

FIG. 55B is a schematic diagram illustrating the movement of the exit roller pair and the take-up roller in the lateral registration correction when inserting an inner sheet after the lateral registration correction according to the present embodiment.

In the present embodiment, the take-up roller 220 is movable in the main scanning direction, so that a positional deviation between the take-up roller 220 and the exit roller pair 113 is eliminated. By so doing, twist of the lamination sheet S is prevented.

Figure 56:
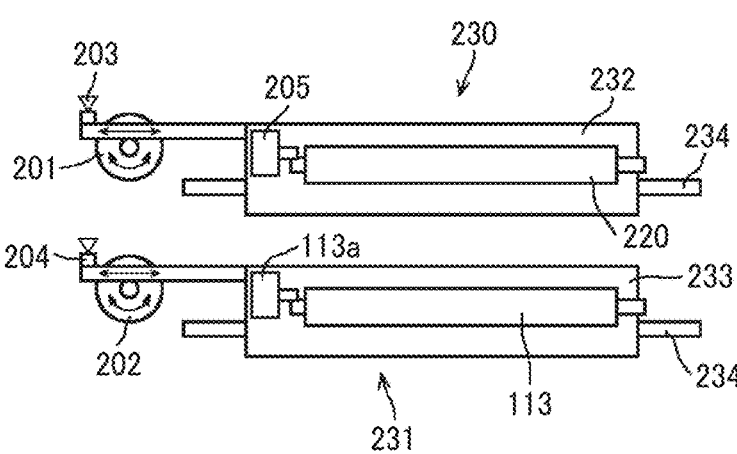
FIG. 56 is a schematic diagram illustrating a configuration of a take-up unit.

Specifically, FIG. 56 is a schematic diagram illustrating a configuration of a take-up unit 230 as a take-up assembly.

As illustrated in FIG. 56, the sheet processing apparatus 100 further includes the take-up unit 230 that can drive the take-up roller 220 in the main scanning direction, so that the take-up roller 220 moves in sync with a movement of the exit roller pair 113.

As illustrated in FIG. 56, the take-up unit 230 includes a take-up unit holder 232 and a slide shaft 234 and a rack and pinion mechanism. The take-up unit holder 232 rotatably holds the take-up roller 220. The slide shaft 234 and the rack and pinion mechanism guide the take-up unit holder 232 in the main scanning direction.

The take-up unit 230 includes a take-up shift motor 201 that drives a rack-and-pinion mechanism, and a take-up unit home position sensor 203 that detects the position of the take-up unit holder 232. The take-up roller 220 is rotationally driven by a take-up roller drive motor 205.

On the other hand, the registration unit 231 that can drive the exit roller pair 113 in the main scanning direction includes a registration unit holder 233 that rotatably holds the exit roller pair 113, and a slide shaft 234 and a rack-and-pinion mechanism that guide the registration unit holder 233 in the main scanning direction.

The registration unit 231 includes a registration shift motor 202 that drives the rack-and-pinion mechanism, and a registration unit home position sensor 204 that detects the position of the registration unit holder 233. The exit roller pair 113 is driven to rotate by an exit roller pair motor 113a.

As described above, both the exit roller pair 113 and the take-up roller 220 are movable in the main scanning direction, and the respective positions of the exit roller pair 113 and the take-up roller 220 can be detected by the take-up unit home position sensor 203 and the registration unit home position sensor 204. Accordingly, the displacement of the take-up roller 220 and the exit roller pair 113 in the main scanning direction can be eliminated and the lamination sheet S can be prevented from being twisted.

Figures 57A, 57B, 57C:
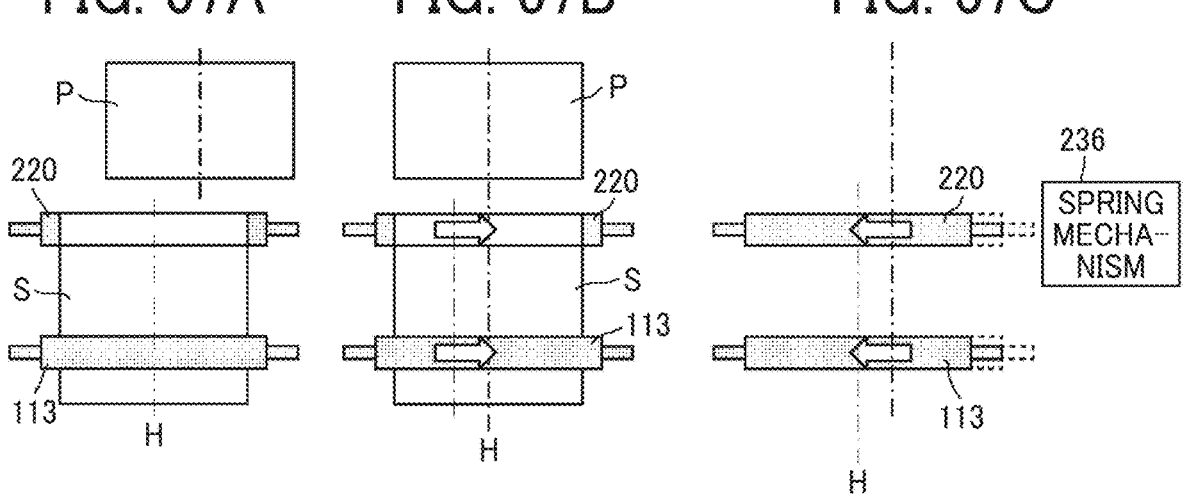
FIGS. 57A, 57B, and 57C are schematic diagrams each illustrating a configuration of the take-up unit, subsequent to the operation of FIG. 56.

FIGS. 57A, 57B and 57C are schematic diagrams each illustrating a configuration of the take-up unit, subsequent to the operation of FIG. 56.

As a modification of the above-described configuration, as illustrated in FIGS. 57A, 57B and 57C, the take-up roller 220 may have a configuration to move (pull) the take-up roller 220 by the exit roller pair 113 via the lamination sheet S, without the drive device (such as a rack-and-pinion mechanism or a take-up shift motor 201) that drives the take-up unit holder 232.

In this case, the take-up unit holder 232 includes a spring mechanism 236 to cause the take-up roller 220 to return the original position (home position H) after the lamination sheet S is conveyed.

Another Modification

Figure 58:
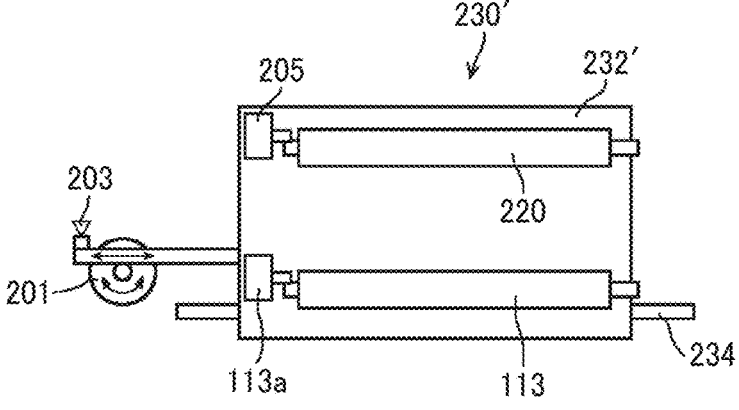
FIG. 58 is schematic diagram illustrating a configuration of the take-up unit, subsequent to the operations of FIGS. 57A, 57B, and 57C.

FIG. 58 is schematic diagram illustrating a configuration of a take-up unit 230', subsequent to the operations of FIGS. 57A, 57B, and 57C.

As illustrated in FIG. 58, the take-up unit 230' as a take-up assembly includes a take-up unit holder 232', a slide shaft 234, and a rack and pinion mechanism. The take-up unit holder 232' rotatably holds both of the exit roller pair 113 and the take-up roller 220. The slide shaft 234 guides the take-up unit holder 232' in the main scanning direction.

The take-up unit 230' includes the take-up shift motor 201 that drives a rack-and-pinion mechanism, and the take-up unit home position sensor 203 that detects the position of the take-up unit holder 232'.

As described above, the take-up unit 230' may have a configuration in which the exit roller pair 113 and the take-up roller 220 are moved as a single unit in the main scanning direction (the width direction). This configuration can reduce the number of parts and achieve the effect in cost reduction.

A description is given below of configurations in some embodiments of the present disclosure.

Figure 59A:
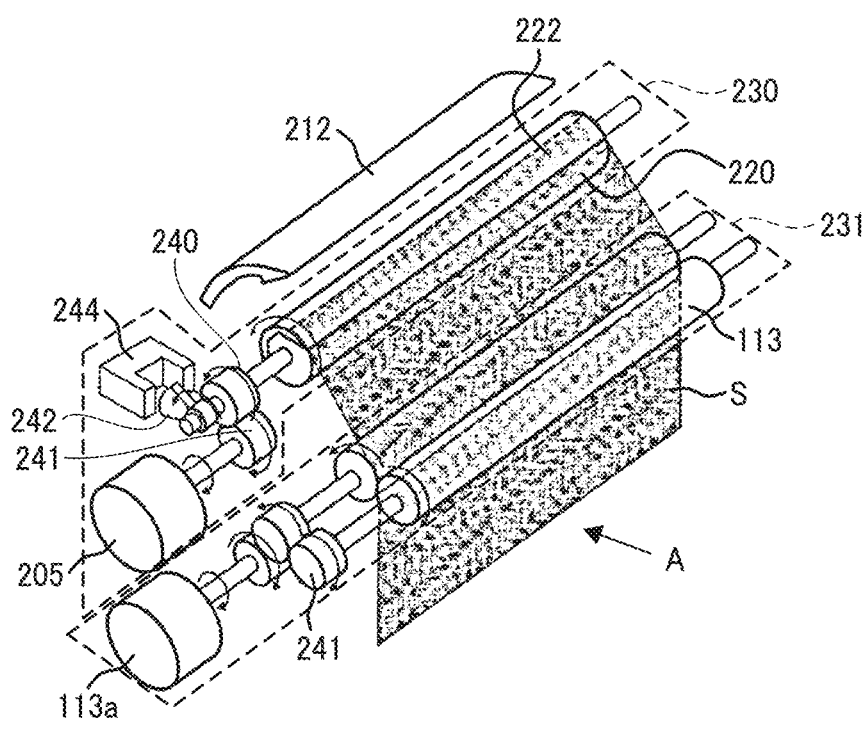
FIG. 59A is a diagram illustrating a configuration of the take-up roller and the drive device (when winding the lamination sheet)

FIG. 59A is a diagram illustrating a configuration of the take-up roller 220 and the drive device (when winding a lamination sheet).

Figure 59B:
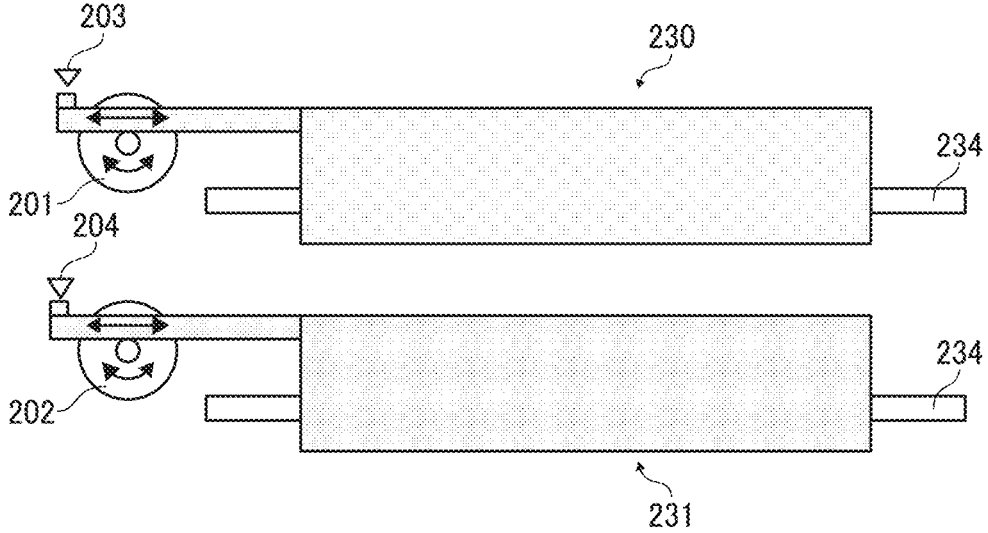
FIG. 59B is a side view of the take-up roller and the drive device, viewed from a direction indicated by arrow A in FIG. 59A.

FIG. 59B is a side view of the take-up roller 220 and the drive device, viewed from a direction indicated by arrow A in FIG. 59A.

Figure 60A:
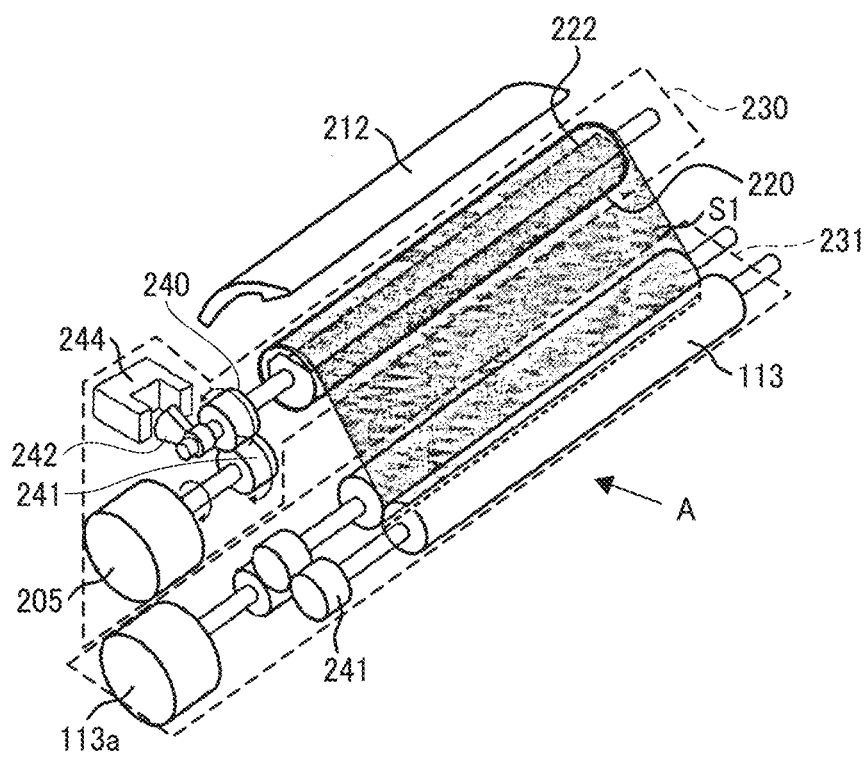
FIG. 60A is a diagram illustrating a configuration of the take-up roller and the drive device (when inserting an inner sheet)

FIG. 60A is a diagram illustrating a configuration of the take-up roller 220 and the drive device (when inserting an inner sheet).

Figure 60B:
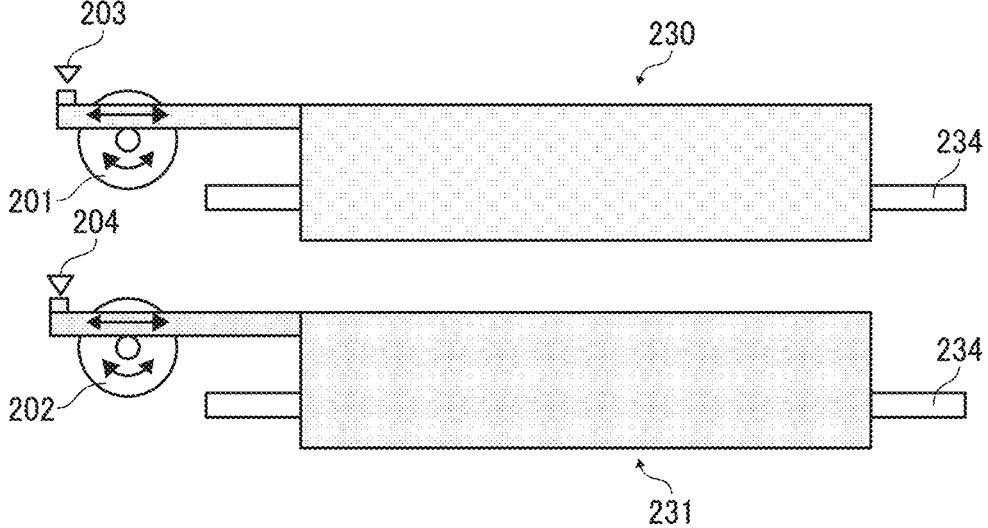
FIG. 60B is a side view of the take-up roller and the drive device, viewed from a direction indicated by arrow A in FIG. 60A.

FIG. 60B is a side view of the take-up roller 220 and the drive device, viewed from a direction indicated by arrow A in FIG. 60A.

The rotary shaft of the take-up roller 220 is coupled to a take-up roller drive motor 205 via a take-up roller drive torque limiter gear 240 and a gear 241 that are connectors. The take-up roller drive torque limiter gear 240 does not transmit a driving force of a given torque or more from the take-up roller drive motor 205.

Further, a take-up roller HP feeler 242 as a feeler is mounted on the rotary shaft of the take-up roller 220. The state of rotation of the take-up roller HP feeler 242 is detected by a take-up roller HP sensor 244.

After one (the first sheet S1) of the two sheets, separated from each other, of the lamination sheet S conveyed by the exit roller pair 113 is nipped by the chuck 222, the take-up roller 220 rotates to take up the first sheet S1. During the take-up of the first sheet S1 by the take-up roller 220, the take-up roller HP feeler 242 continues to rotate. Due to such a configuration, the output signal of the take-up roller HP sensor 244 repeats ONs and OFFs at a constant phase.

Subsequently, when the lamination sheet S is wound by a given distance, the sheet conveyance (take-up) is temporarily stopped, and a registration shift operation is performed to detect the end portion of the lamination sheet S. At this time, the take-up unit 230 (the take-up roller 220) is moved in sync with the movement of the registration unit 231 (the exit roller pair 113) in the width direction, so that the lamination sheet S gripped by both the exit roller pair 113 and the take-up roller 220 can be prevented from being twisted.

Then, as illustrated in FIGS. 60A and 60B, when the joint portion side of the lamination sheet S is at a constant distance from the exit roller pair 113, the exit roller pair 113 is stopped from being driven and is fixed in an excited state. By so doing, the sheet position is fixed, and the lamination sheet S is set in a posture in which the inner sheet P is inserted into the lamination sheet S.

Even when the exit roller pair 113 is fixed, the take-up roller drive motor 205 of the take-up roller 220 continues to rotate. For this reason, the first sheet S1 is pulled between the exit roller pair 113 and the take-up roller 220. When the torque of the take-up roller drive torque limiter gear 240 exceeds a given value, the torque is not transmitted. As a result, the take-up roller 220 and the take-up roller HP feeler 242 stop rotating.

When the rotation of the take-up roller HP feeler 242 is stopped, the output signal of the take-up roller HP sensor 244 becomes a constant value (ON or OFF with no change). By detecting that the signal does not change in the control, the completion of the take-up of the first sheet S1 can be detected.

Subsequently, at the timing of inserting the inner sheet P, the position of the registration unit 231 is adjusted in the main scanning direction in order to align the center position of the inner sheet P with the center position of the lamination sheet S. At this time, the take-up unit 230 is moved in sync with the registration unit 231, so that the first sheet S1 gripped by the exit roller pair 113 and the take-up roller 220 can be prevented from being twisted.

Figure 61:
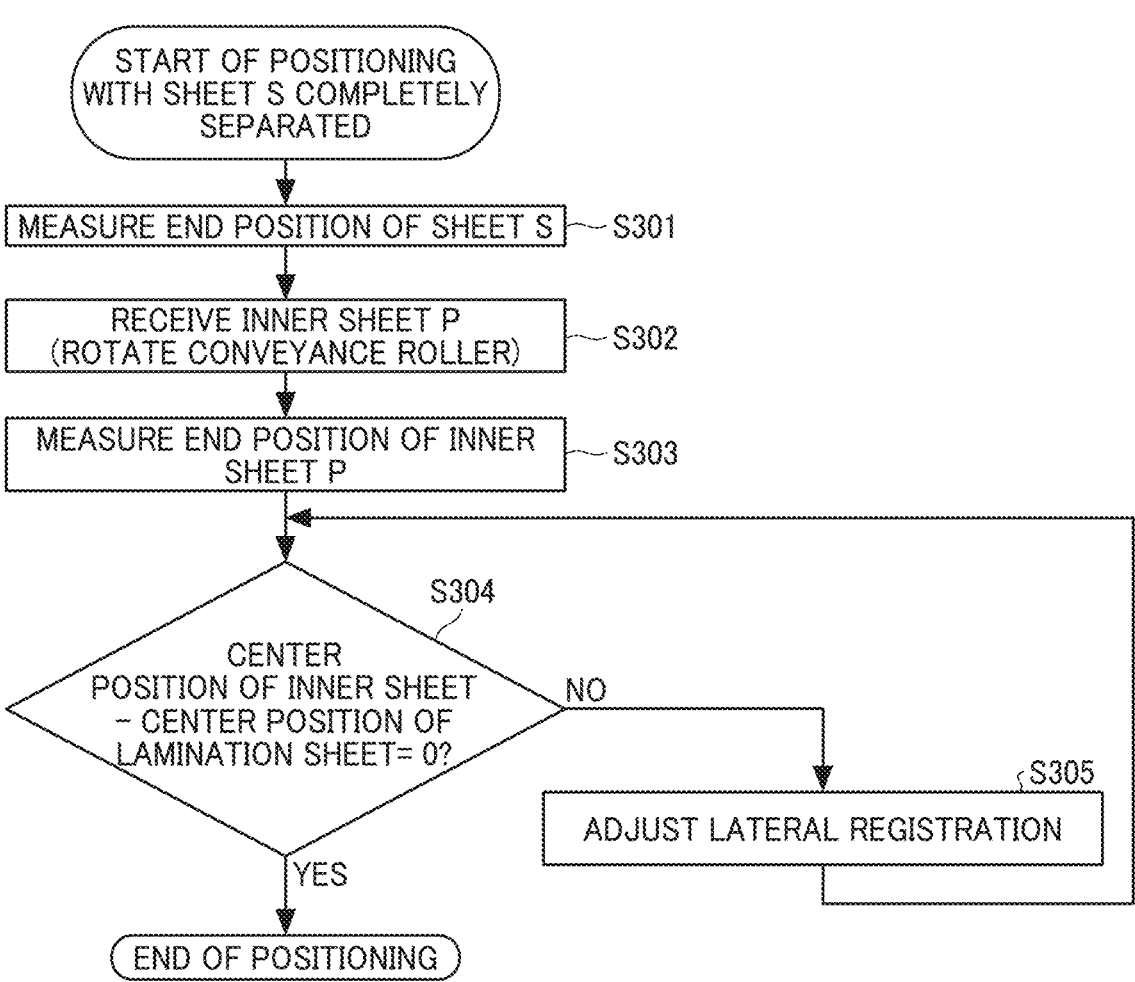
FIG. 61 is a flowchart of an automatic adjustment process of adjusting the position of a lamination sheet and an inner sheet.

FIG. 61 is a flowchart of an automatic adjustment process of adjusting the position of a lamination sheet S and an inner sheet P.

Referring now to the flowchart of FIG. 61, a description is given of an example of a method of positional adjustment.

The alignment is performed when the lamination sheet S is gripped by the position adjuster (for example, the exit roller pair 113) after completion of separation of the two sheets of the lamination sheet S.

First, in step S301, the controller 127 drives the movement mechanism 46A (see FIG. 31A) to read the end portion of the lamination sheet S nipped by the exit roller pair 113 by the displacement detector 47 (see FIG. 31B). The controller 127 calculates the amount of deviation of the center position of the lamination sheet S based on the width of the lamination sheet S and the end position of the lamination sheet S.

Then, the controller 127 causes the entrance roller pair 108 to rotate to convey the inner sheet P (step S302). Subsequently, the controller 127 causes the displacement detector 47 to read the end of the inner sheet P (step S303). The controller 127 calculates the amount of deviation of the center position of the inner sheet P based on the width of the inner sheet P and the end position of the inner sheet P.

In step S304, the amounts of deviation of the center positions of the lamination sheet S and the inner sheet P are compared with each other with reference to the conveyance center. When the amounts of deviation are equal (YES in step S304), the alignment is finished (no adjustment to be done). On the other hand, when the amounts of deviation are different (NO in step S304), the controller 127 calculates the difference.

Then, in step S305, the movement mechanism 46A is driven by the difference in the calculated amount of deviation, and the center position of the lamination sheet S and the center position of the inner sheet P are aligned. Then, the process returns to step S304.

As described above, the center position of the lamination sheet S with the two sheets separated from each other and the center position of the inner sheet P can be aligned.

Some embodiments of the present disclosure have been described in detail above. The above-described embodiments are examples and can be modified within the scope not departing from the gist of the present disclosure. For example, some embodiments and advantageous configurations may be combined with each other.

The effects obtained by the above-described embodiments are examples. The effects obtained by other embodiments are not limited to the above-described effects.

Aspects of the present disclosure are, for example, as follows.

Aspect 1

In Aspect 1, a sheet processing apparatus includes a sheet separator, a positional deviation detector, a positional deviation adjuster, a take-up member, and a take-up unit. The sheet separator performs a sheet separating operation in which two sheets of a two-play sheet(S) are separated, where the two sheets are overlapped and bonded together at a bonding portion in a conveyance direction, and performs a sheet inserting operation in which a sheet medium (P) is inserted between the two sheets separated from each other. The positional deviation detector detects an amount of a positional deviation in a width direction of the two-ply sheet orthogonal to the conveyance direction of the two-ply sheet conveyed in the conveyance direction toward the sheet separator, and detects an amount of a positional deviation in a width direction of the sheet medium conveyed toward the sheet separator. The positional deviation adjuster adjusts the positional deviation in the width direction of the two-ply sheet, before the sheet separating operation, based on the amount of the positional deviation of the two-ply sheet detected by the positional deviation detector, and adjust the positional deviation in the width direction of the two-ply sheet, before the sheet separating operation, based on the amount of the positional deviation of the sheet medium. The take-up member takes up one of the two sheets of the two-ply sheet subjected to the sheet separating operation, and moves in sync with a movement of the positional deviation adjuster. The take-up unit moves the take-up member in the width direction of the two-ply sheet.

Aspect 2

In Aspect 2, in the sheet processing apparatus according to Aspect 1, the positional deviation adjuster includes a conveyor and a movement mechanism. The conveyor nips the two-ply sheet and the sheet medium and convey the two-ply sheet and the sheet medium. The movement mechanism moves the conveyor in the width direction.

Aspect 3

In Aspect 3, in the sheet processing apparatus according to Aspect 1 or 2, the take-up unit includes a take-up unit holder and a driver. The take-up unit holder rotatably holds the take-up member. The driver moves the take-up unit holder in the width direction of the two-ply sheet.

Aspect 4

In Aspect 4, in the sheet processing apparatus according to any one of Aspects 1 to 3, the take-up unit includes a take-up unit holder to rotatably hold the take-up member, and a spring mechanism to return the take-up unit holder to a given position.

Aspect 5

In Aspect 5, the sheet processing apparatus according to Aspect 1 or 2 further includes comprising a conveyor to nip the two-ply sheet and the sheet medium and convey the two-ply sheet and the sheet medium. The take-up unit moves the take-up member and the conveyor in the width direction of the two-ply sheet, as a single unit.

Aspect 6

In Aspect 6, in the sheet processing apparatus according to any one of Aspects 1 to 5, the take-up member includes a gripping mechanism changeable between an open state in which the gripping mechanism is open to allow an end of one of the two sheets of the two-ply sheet to be inserted and a gripped state in which the gripping mechanism is closed to grip the end of one of the two sheets of the two-ply sheet inserted to the gripping mechanism.

Aspect 7

In Aspect 7, in the sheet processing apparatus according to any one of Aspects 1 to 6, the positional deviation adjuster automatically adjust the positional deviation in the width direction of the two-ply sheet and the sheet medium to meet a center position of the sheet medium in the width direction with a center position of the two-ply sheet in the width direction.

Aspect 8

In Aspect 8, in the sheet processing apparatus according to any one of Aspects 1 to 7, the positional deviation adjuster changes an adjustment amount of a position in the width direction of the sheet medium to a value within a range of a length of the two-ply sheet in the width direction of the sheet medium.

Aspect 9

In Aspect 9, the sheet processing apparatus according to Aspect 8 further includes an operation panel via which a positional adjustment amount in the width direction of the sheet medium to be adjusted by the positional deviation adjuster is settable.

Aspect 10

In Aspect 10, in the sheet processing apparatus according to Aspect 8, the positional deviation detector includes a first detector and a second detector. The first detector detects the amount of the positional deviation in the width direction of the two-ply sheet. The second detector detects the amount of the positional deviation in the width direction of the sheet medium.

Aspect 11

In Aspect 11, in the sheet processing apparatus according to Aspect 10, the first detector includes an optical sensor detectable at at least one end in a main scanning direction of the sheet medium.

Aspect 12

In Aspect 12, in the sheet processing apparatus according to Aspect 10 or 11, the first detector moves in a main scanning direction to be detectable at opposite ends of the sheet medium in the main scanning direction.

Aspect 13

In Aspect 13, in the sheet processing apparatus according to Aspect 10, the second detector includes an optical sensor detectable at at least one end in a main scanning direction of the two-ply sheet.

Aspect 14

In Aspect 14, in the sheet processing apparatus according to any one of Aspects 1 to 13, the positional deviation adjuster moves to meet a center position in the width direction of the two-ply sheet with a center reference position of the sheet processing apparatus.

Aspect 15

In Aspect 15, the sheet processing apparatus according to any one of Aspects 1 to 14 further includes a guide to guide one of the two sheets, separated from each other, of the two-ply sheet to the take-up member.

Aspect 16

In Aspect 16, in the sheet processing apparatus according to Aspect 15, the take-up member includes a gripping mechanism, and the guide is movable and biases the gripping mechanism to change the gripping mechanism between an open state in which the gripping mechanism is open and a gripped state in which the gripping mechanism is closed to grip the two-ply sheet.

Aspect 17

In Aspect 17, the sheet processing apparatus according to Aspect 16 further includes a pressure lever rotatable about a rotary shaft of the guide and having one end to rotate with the guide. The guide is coupled to the pressure lever, and the pressure lever biases the gripping mechanism of the take-up member when the pressure lever rotates.

Aspect 18

In Aspect 18, in the sheet processing apparatus according to any one of Aspects 15 to 17, the take-up member is disposed inside of a rotation range of the guide.

Aspect 19

In Aspect 19, in the sheet processing apparatus according to Aspect 1 or 2, the take-up member has a cut-shaped holder, into which one end of the two-ply sheet is insertable.

Aspect 20

In Aspect 20, the sheet processing apparatus according to any one of Aspects 1 to 19 further includes a conveyor to nip and convey the two-ply sheet. The take-up member has a conveyance linear velocity equal to or greater than a conveyance linear velocity of the conveyor.

Aspect 21

In Aspect 21, the sheet processing apparatus according to any one of Aspects 1 to 20 further includes a feeler, a detector, and a coupler. The feeler is mounted on a rotary shaft of the take-up member to rotate with the rotary shaft of the take-up member. The detector detects a rotation of the feeler. The coupler couples the take-up member and a driver to drive the take-up member, to prevent a transmission of a driving force equal to or greater than a given torque. The take-up member stops a take-up of the two-ply sheet when the detector stops a detection of rotation of the feeler, after the take-up member has started the take-up of the two-ply sheet.

Aspect 22

In Aspect 22, a sheet laminator includes the sheet processing apparatus according to any one of Aspects 1 to 21, and a thermal presser disposed downstream from the sheet processing apparatus in a sheet conveyance direction to heat and press the two-ply sheet.

Aspect 23

In Aspect 23, an image forming apparatus includes an image former to form an image on a sheet, and the sheet processing apparatus according to any one of Aspects 1 to 21 or the sheet laminator according to Aspect 22.

Aspect 24

In Aspect 24, an image forming system includes an image forming apparatus to form an image on a sheet, and the sheet processing apparatus according to any one of Aspects 1 to 21 or the sheet laminator according to Aspect 22.

Aspect 25

In Aspect 25, an image forming system includes an image forming apparatus to form an image on a sheet, and the sheet processing apparatus according to any one of Aspects 1 to 21 or the sheet laminator according to Aspect 22, detachably attached to the image forming apparatus.

Aspect 26

In Aspect 26, a sheet processing apparatus includes a sheet separator, a positional deviation detector, a positional deviation adjuster, a take-up member, and a take-up assembly. The sheet separator separates two sheets of a two-play sheet, in which the two sheets are overlapped and bonded together at a bonding portion, to perform a sheet separating operation, and inserts a sheet medium between the two sheets separated from each other to perform a sheet inserting operation, the sheet medium to be conveyed in a conveyance direction toward the sheet separator. The position detector detects an amount of a positional deviation of the two-ply sheet in a width direction orthogonal to the conveyance direction, and detects an amount of a positional deviation of the sheet medium in the width direction. The position adjuster adjusts the positional deviation of the two-ply sheet in the width direction, before the sheet separating operation, based on the amount of the positional deviation of the two-ply sheet detected by the position detector. The take-up roller takes up one of the two sheets of the two-ply sheet subjected to the sheet separating operation. The take-up assembly moves to move the take-up roller in the width direction. The position adjuster causes the positional deviation of the two-ply sheet in the width direction to be adjustable based on the amount of the positional deviation of the sheet medium. The take-up assembly causes the take-up member to be movable in sync with a movement of the position adjuster.

Aspect 27

In Aspect 27, in the sheet processing apparatus according to Aspect 26, the position adjuster includes a conveyor and a movement mechanism. The conveyor nips the two-ply sheet and the sheet medium and convey the two-ply sheet and the sheet medium. The movement mechanism moves the conveyor in the width direction.

Aspect 28

In Aspect 28, the sheet processing apparatus according to Aspect 26 or 27, the take-up assembly includes a holder and a driver. The holder rotatably holds the take-up roller. The driver moves the holder in the width direction.

Aspect 29

In Aspect 29, the sheet processing apparatus according to any one of Aspects 26 to 28, the take-up assembly includes a holder and a spring. The holder rotatably holds the take-up roller. The spring returns the holder to an original position.

Aspect 30

In Aspect 30, the sheet processing apparatus according to Aspect 26 or 27 further includes a conveyor to nip the two-ply sheet and the sheet medium and convey the two-ply sheet and the sheet medium. The take-up assembly moves the take-up roller and the conveyor, as a single unit, in the width direction.

Aspect 31

In Aspect 31, in the sheet processing apparatus according to any one of Aspects 26 to 30, the take-up roller includes a gripper changeable between an open state in which the gripper is open to allow an insertion of an end of one of the two sheets of the two-ply sheet and a gripping state in which the gripper is closed to grip the end of one of the two sheets of the two-ply sheet inserted to the gripper.

Aspect 32

In Aspect 32, in the sheet processing apparatus according to any one of Aspects 26 to 31, the position adjuster adjust a center position the sheet medium in the width direction to match a center position of the two-ply sheet in the width direction.

Aspect 33

In Aspect 33, in the sheet processing apparatus according to any one of Aspects 26 to 32, the position adjuster changes an adjustment amount of a position in the width direction to a value within a range of a length of the two-ply sheet in the width direction.

Aspect 34

In Aspect 34, the sheet processing apparatus according to Aspect 33 further includes an operation panel via which a positional adjustment amount in the width direction to be adjusted by the position adjuster is settable.

Aspect 35

In Aspect 35, in the sheet processing apparatus according to any one of Aspects 26 to 34, the position detector includes a first detector and a second detector. The first detector detects the amount of the positional deviation in the width direction. The second detector detects the amount of the positional deviation in the width direction.

Aspect 36

In Aspect 36, in the sheet processing apparatus according to Aspect 35, the first detector includes an optical sensor detectable at at least one end in a main scanning direction of the sheet medium.

Aspect 37

In Aspect 37, in the sheet processing apparatus according to Aspect 35 or 36, the first detector moves in a main scanning direction to be detectable at opposite ends of the sheet medium in the main scanning direction.

Aspect 38

In Aspect 38, in the sheet processing apparatus according to Aspect 35, the second detector includes an optical sensor detectable at at least one end in a main scanning direction of the two-ply sheet.

Aspect 39

In Aspect 39, in the sheet processing apparatus according to any one of Aspects 26 to 38, the position adjuster moves to meet a center position in the width direction with a center reference position of the sheet processing apparatus.

Aspect 40

In Aspect 40, the sheet processing apparatus according to any one of Aspects 26 to 39 further includes a guide to guide one of the two sheets, separated from each other, of the two-ply sheet to the take-up roller.

Aspect 41

In Aspect 41, in the sheet processing apparatus according to Aspect 40, the take-up roller includes a gripper, and the guide is movable and biases the gripper to change the gripper between an open state in which the gripper is open and a gripped state in which the gripper is closed to grip the two-ply sheet.

Aspect 42

In Aspect 42, the sheet processing apparatus according to Aspect 41 further includes a pressure lever rotatable about a rotary shaft of the guide and having one end to rotate with the guide. The guide includes the pressure lever, and the pressure lever is configured to bias the gripper of the take-up roller when the pressure lever rotates.

Aspect 43

In Aspect 43, in the sheet processing apparatus according to any one of Aspects 40 to 42, the take-up roller is disposed inside of a rotation range of the guide.

Aspect 44

In Aspect 44, in the sheet processing apparatus according to Aspect 26 or 27, the take-up roller has a cut-shaped holder, into which one end of the two-ply sheet is insertable.

Aspect 45

In Aspect 45, the sheet processing apparatus according to any one of Aspects 26 to 44 further includes a conveyor to nip and convey the two-ply sheet. The take-up roller has a conveyance linear velocity equal to or greater than a conveyance linear velocity of the conveyor.

Aspect 46

In Aspect 46, the sheet processing apparatus according to any one of Aspects 26 to 45 further includes a feeler, a detector, and a coupler. The feeler is mounted on a rotary shaft of the take-up roller to rotate with the rotary shaft of the take-up roller. The detector detects a rotation of the feeler. The coupler couples the take-up roller and a driver to drive the take-up roller, to prevent a transmission of a driving force equal to or greater than a given torque. The take-up roller stops a take-up of the two-ply sheet when the detector stops a detection of rotation of the feeler, after the take-up roller has started the take-up of the two-ply sheet.

Aspect 47

In Aspect 47, a sheet laminator includes the sheet processing apparatus according to any one of Aspects 26 to 46, and a thermal presser disposed downstream from the sheet processing apparatus in a sheet conveyance direction to heat and press the two-ply sheet.

Aspect 48

In Aspect 48, an image forming apparatus includes an image former to form an image on a sheet, and the sheet laminator according to Aspect 47.

Aspect 49

In Aspect 49, an image forming system includes an image forming apparatus to form an image on a sheet, and the sheet laminator according to Aspect 47.

Aspect 50

In Aspect 50, an image forming system includes an image forming apparatus to form an image on a sheet, and the sheet laminator according to Aspect 47, detachably attached to the image forming apparatus.

Aspect 51

In Aspect 51, an image forming apparatus includes an image former to form an image on a sheet, and the sheet processing apparatus according to any one of Aspects 26 to 46.

Aspect 52

In Aspect 52, an image forming system includes an image forming apparatus to form an image on a sheet, and the sheet processing apparatus according to any one of Aspects 26 to 46.

Aspect 53

In Aspect 53, an image forming system includes an image forming apparatus to form an image on a sheet, and the sheet processing apparatus according to any one of Aspects 26 to 46, detachably attached to the image forming apparatus.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus comprising:
a sheet separator device configured to:
separate two sheets of a two-ply sheet, in which the two sheets are overlapped and bonded together at a bonding portion, to perform a sheet separating operation; and
insert a sheet medium between the two sheets separated from each other to perform a sheet inserting operation, the sheet medium to be conveyed in a conveyance direction toward the sheet separator device;
a position detector device configured to:
detect an amount of a positional deviation of the two-ply sheet in a width direction orthogonal to the conveyance direction; and
detect an amount of a positional deviation of the sheet medium in the width direction;
a position adjuster device configured to adjust the positional deviation of the two-ply sheet in the width direction, before the sheet separating operation, based on the amount of the positional deviation of the two-ply sheet detected by the position detector device;
a take-up roller configured to take up one of the two sheets of the two-ply sheet subjected to the sheet separating operation; and
a take-up assembly mechanism configured to move the take-up roller in the width direction,
wherein the position adjuster device is further configured to cause the positional deviation of the two-ply sheet in the width direction to be adjustable based on the amount of the positional deviation of the sheet medium, and
the take-up assembly mechanism is further configured to cause the take-up roller to be movable in sync with a movement of the position adjuster device.

2. The sheet processing apparatus according to claim 1, wherein the position adjuster device includes:
a conveyor configured to nip the two-ply sheet and the sheet medium and convey the two-ply sheet and the sheet medium; and
a movement mechanism configured to move the conveyor in the width direction.

3. The sheet processing apparatus according to claim 1, wherein the take-up assembly mechanism includes:
a holder device configured to rotatably hold the take-up roller; and
a driver configured to move the holder device in the width direction.

4. The sheet processing apparatus according to claim 1, wherein the take-up assembly mechanism includes:
a holder device configured to rotatably hold the take-up roller; and

a spring configured to return the holder device to an original position.

5. The sheet processing apparatus according to claim 1, further comprising:
a conveyor configured to nip the two-ply sheet and the sheet medium and convey the two-ply sheet and the sheet medium,
wherein the take-up assembly mechanism is further configured to move the take-up roller and the conveyor, as a single unit, in the width direction.

6. The sheet processing apparatus according to claim 1, wherein the take-up roller includes a gripper configured to change between:
an open state in which the gripper is open to allow an insertion of an end of one of the two sheets of the two-ply sheet; and
a gripping state in which the gripper is closed to grip the end of one of the two sheets of the two-ply sheet inserted to the gripper.

7. The sheet processing apparatus according to claim 1, wherein the position adjuster device is further configured to adjust a center position of the sheet medium in the width direction to match a center position of the two-ply sheet in the width direction.

8. The sheet processing apparatus according to claim 1, wherein the position adjuster device is further configured to change an adjustment amount of a position in the width direction to a value within a range of a length of the two-ply sheet in the width direction.

9. The sheet processing apparatus according to claim 8, further comprising:
an operation panel configured to receive at least one user input, the at least one user input indicating a positional adjustment amount of the position adjuster device in the width direction.

10. The sheet processing apparatus according to claim 1, wherein the position detector device includes:
a first detector configured to detect the amount of the positional deviation in the width direction; and
a second detector configured to detect the amount of the positional deviation in the width direction.

11. The sheet processing apparatus according to claim 10, wherein the first detector includes an optical sensor configured to detect at least one end of the sheet medium in a main scanning direction of the sheet medium.

12. The sheet processing apparatus according to claim 10, wherein the first detector is configured to move along a main scanning direction of the sheet medium in order to detect opposite ends of the sheet medium.

13. The sheet processing apparatus according to claim 10, wherein the second detector includes an optical sensor configured to detect at least one end of the two-ply sheet in a main scanning direction of the two-ply sheet.

14. The sheet processing apparatus according to claim 1, wherein the position adjuster device is configured to move to meet a center position in the width direction with a center reference position of the sheet processing apparatus.

15. The sheet processing apparatus according to claim 1, further comprising:
a guide device configured to guide one of the two sheets, separated from each other, of the two-ply sheet to the take-up roller.

16. The sheet processing apparatus according to claim 15, wherein the take-up roller includes a gripper, and
the guide device is configured to move and bias the gripper to change the gripper between an open state in which the gripper is open and a gripped state in which the gripper is closed to grip the two-ply sheet.

17. The sheet processing apparatus according to claim 16, further comprising:

a pressure lever configured to rotate about a rotary shaft of the guide device and having one end to rotate with the guide device, wherein the guide device includes the pressure lever, and the pressure lever is configured to bias the gripper of the take-up roller in response to the pressure lever rotating.

18. The sheet processing apparatus according to claim 15, wherein the take-up roller is inside of a rotation range of the guide device.

19. The sheet processing apparatus according to claim 1, wherein the take-up roller includes a cut-shaped holder device configured to receive one end of the two-ply sheet.

20. The sheet processing apparatus according to claim 1, further comprising:

a conveyor configured to nip and convey the two-ply sheet, wherein the take-up roller has a conveyance linear velocity equal to or greater than a conveyance linear velocity of the conveyor.

21. The sheet processing apparatus according to claim 1, further comprising:

a feeler mounted on a rotary shaft of the take-up roller, the feeler configured to rotate with the rotary shaft of the take-up roller;

a detector configured to detect a rotation of the feeler; and a coupler coupling the take-up roller and a driver, the driver configured to drive the take-up roller, the take-up roller configured to prevent a transmission of a driving force equal to or greater than a given torque, wherein the take-up roller is further configured to stop a take-up of the two-ply sheet in response to the detector detecting a stopping of rotation of the feeler, after the take-up roller has started the take-up of the two-ply sheet.

22. A sheet laminator comprising:

the sheet processing apparatus according to claim 1; and a thermal presser downstream from the sheet processing apparatus in a sheet conveyance direction, the thermal presser configured to heat and press the two-ply sheet.

23. An image forming apparatus comprising:

an image former configured to form an image on a sheet; and the sheet laminator according to claim 22.

24. An image forming system comprising:

an image forming apparatus configured to form an image on a sheet; and the sheet laminator according to claim 22.

25. An image forming system comprising:

an image forming apparatus configured to form an image on a sheet; and the sheet laminator according to claim 22, detachably attached to the image forming apparatus.

26. An image forming apparatus comprising:

an image former configured to form an image on a sheet; and the sheet processing apparatus according to claim 1.

27. An image forming system comprising:

an image forming apparatus configured to form an image on a sheet; and the sheet processing apparatus according to claim 1.

28. An image forming system comprising:

an image forming apparatus configured to form an image on a sheet; and the sheet processing apparatus according to claim 1, detachably attached to the image forming apparatus.

* * * * *